:

US012081216B1

(12) United States Patent
Kandele et al.

(10) Patent No.: US 12,081,216 B1
(45) Date of Patent: Sep. 3, 2024

(54) PRNG-BASED CHIPLET TO CHIPLET SECURE COMMUNICATION USING COUNTER RESYNCHRONIZATION

(71) Applicant: Ceremorphic, Inc., San Jose, CA (US)

(72) Inventors: Suyash Kandele, Chhattisgarh (IN); Sumant Kumar Singh, Jharkhand (IN); Mohammed Sumair, Uttarakhand (IN); Ananya Shrivastava, Chhattisgarh (IN); Joydeep Kumar Devnath, Assam (IN); Govardhan Mattela, Telangana (IN)

(73) Assignee: Ceremorphic, Inc., San Jose, CA (US)

( * ) Notice: Subject to any disclaimer, the term of this patent is extended or adjusted under 35 U.S.C. 154(b) by 288 days.

(21) Appl. No.: 17/749,057

(22) Filed: May 19, 2022

(51) Int. Cl.
    *H04L 9/06* (2006.01)
    *H03K 19/17768* (2020.01)
    *H03K 19/21* (2006.01)
    *H04L 9/08* (2006.01)

(52) U.S. Cl.
    CPC ....... *H03K 19/17768* (2013.01); *H03K 19/21* (2013.01); *H04L 9/0656* (2013.01); *H04L 9/0825* (2013.01)

(58) Field of Classification Search
    CPC ..... H04L 9/0656; H04L 9/0825; H03K 19/21; H03K 19/17768
    See application file for complete search history.

(56) References Cited

U.S. PATENT DOCUMENTS

| 10,187,200 | B1* | 1/2019 | Firestone | H04L 63/0435 |
| 2012/0195426 | A1* | 8/2012 | White | G09G 3/2085 |
| | | | | 380/210 |
| 2022/0309190 | A1* | 9/2022 | Gopal | G06F 21/72 |
| 2023/0244821 | A1* | 8/2023 | Driscoll | H04L 9/0841 |
| | | | | 713/193 |

\* cited by examiner

*Primary Examiner* — Vu V Tran
(74) *Attorney, Agent, or Firm* — File-EE-Patents.com; Jay A. Chesavage

(57) ABSTRACT

A method is performed with a group of chiplets. The method includes: (1) parsing a message into at least a group of ordered message blocks associated with a group of index values, which are indicative of positions of individual message blocks relative to one another; (2) generating two or more substitution values based at least in part on execution of two or more pseudo-random number generators (PNRG's) using seeds associated with the bits of blocks of the group of message blocks; (3) generating two or more sequencing values based at least in part on execution of two or more PNRG's using seeds associated with index values of the group of index values; (4) generating a group of ciphertext blocks at least in part with XOR operations using at least the substitution values and the sequencing values; (5) concatenating the group of ciphertext blocks; and (6) transmitting.

20 Claims, 27 Drawing Sheets

TX and RX Circuits in a Chiplet.

Resource - Constrained Device (Smart Camera)

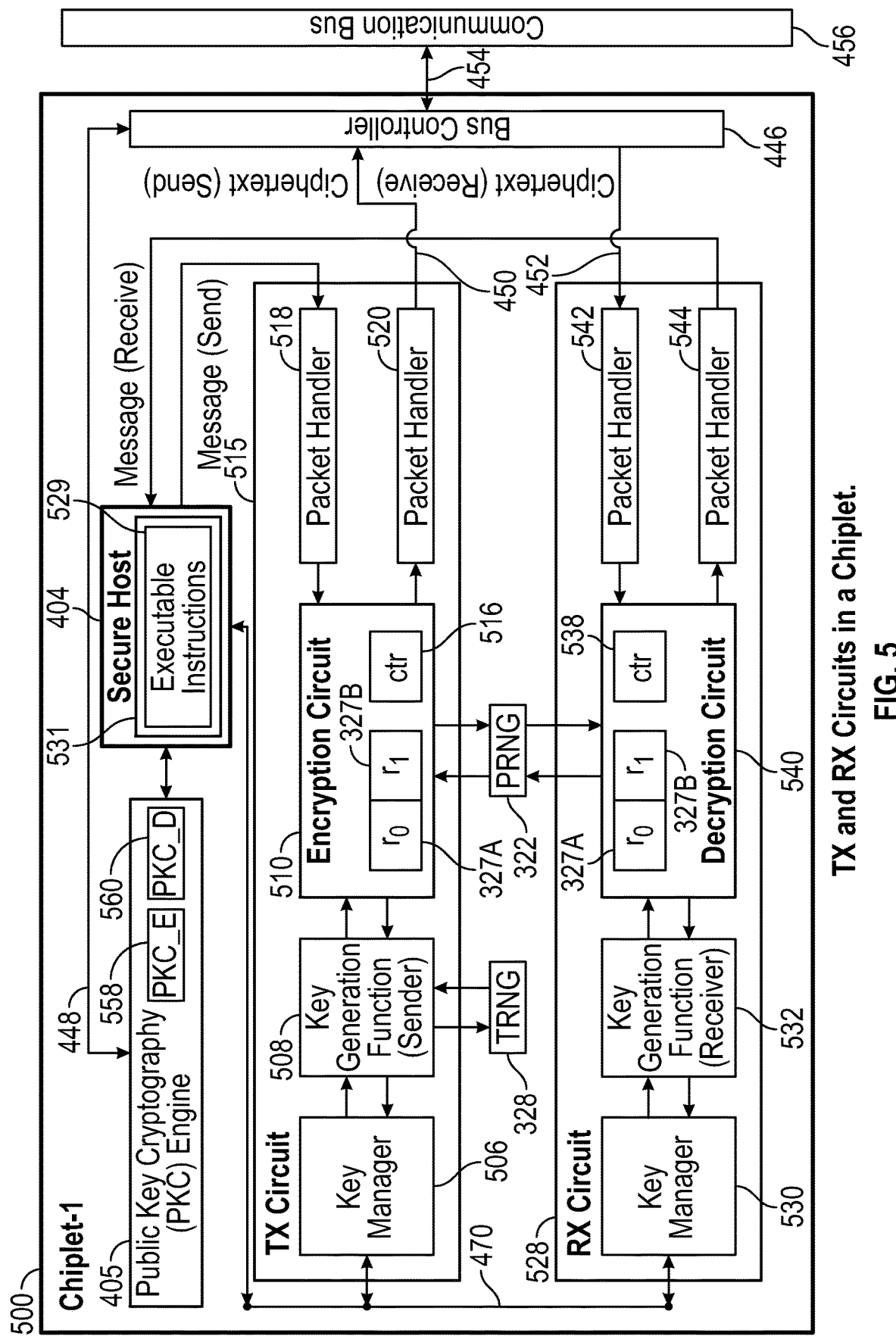
FIG. 5 TX and RX Circuits in a Chiplet.

Receiver Key Generation

PRNG - Based Encryption CBC Mode

PRNG - Based Encryption Counter Mode

PRNB-based Decryption - Counter mode

FIG. 18 TX and RX Circuits For Basic Half-Duplex Mode.

Basic Half-Duplex Mode of Operation.

TX and RX Circuits For Full-Duplex Mode.

FIG. 22 TX and RX Circuits For No-Delay Half-Duplex Mode.

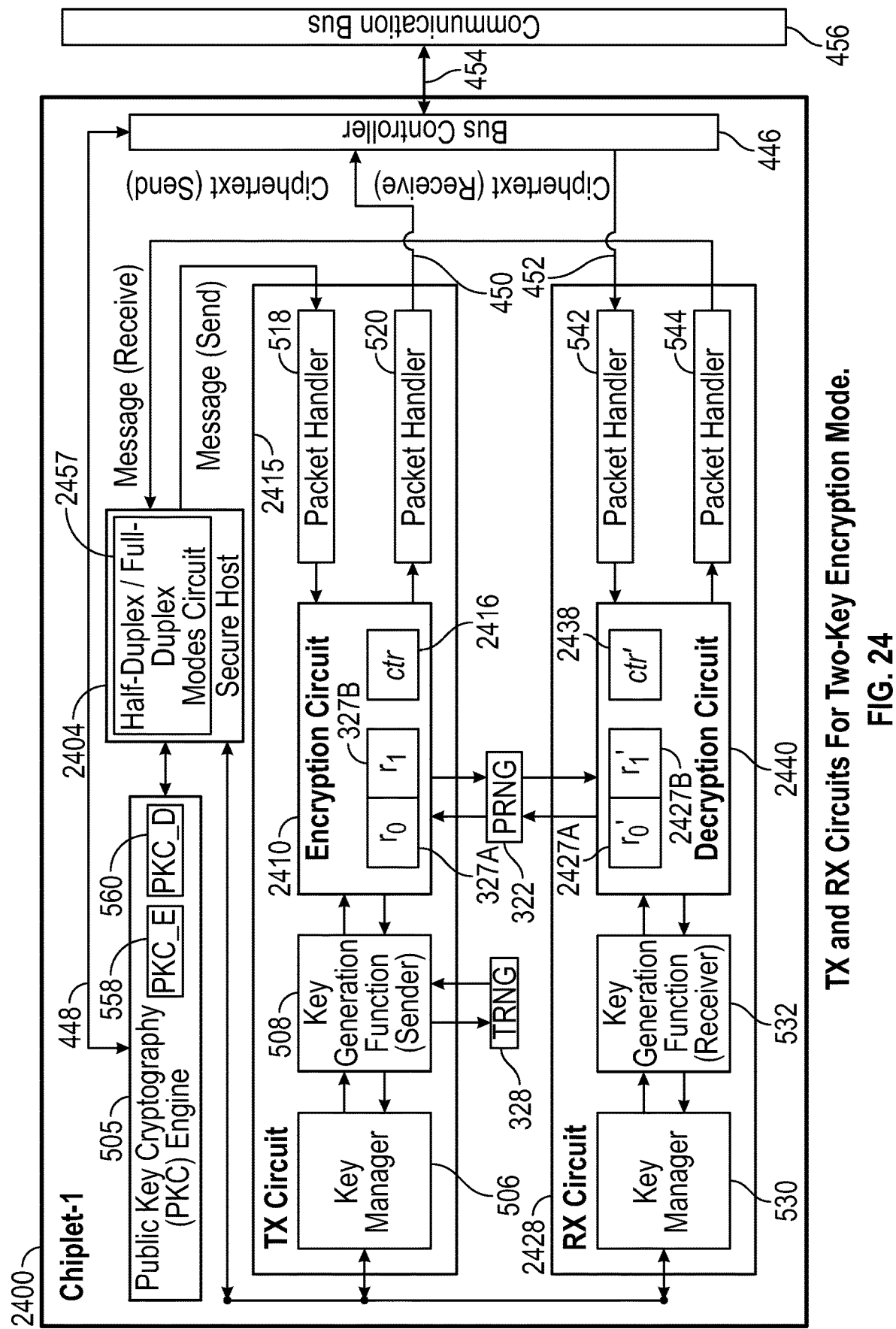
FIG. 24 TX and RX Circuits For Two-Key Encryption Mode.

PRNG-based Chiplet-to-Chiplet Secure Communication

Comparison Table: '-' stands for the operation is not applicable

| Property | AES-GCM | | | | | PRNG-based IDE | | | | | |
|---|---|---|---|---|---|---|---|---|---|---|---|
| Message Size: M (bits) | 128 | | | | | 128 | | | | | |
| Associated Data: A (bits) | 128 | | | | | 128 | | | | | |
| Output Size: C+T (bits) | 128+128 | | | | | 128+128 | | | | | |
| Key Size: K (bits) | 128 | | | | | 256 | | | | | |
| Security (bits) | 64 | | | | | 128 | | | | | |
| Implementation | Parallel | Serial | | 16-bit Parallel | | 32-bit Parallel | | 64-bit Parallel | | 128-bit Parallel | |
| 1-bit Shift | Very High | Low | 45 x | Low | 45 x | Low | 45 x | Low | 45 x | Low | 45 x |
| 1-bit AND | High | - | - | - | - | - | - | - | - | - | - |
| 1-bit XOR | High | VeryLow | 120 x | Very Low | 120 x | Very Low | 120 x | Very Low | 120 x | Very Low | 120 x |
| 1-bit Rotate | Medium | - | - | - | - | - | - | - | - | - | - |
| Total Operations | Very High | Medium | 50 x | Medium | 50 x | Medium | 50 x | Medium | 50 x | Medium | 50 x |
| Clock Cycles | 160 | 1,280 | 8 x Slower | 80 | 2 x Faster | 40 | 4 x Faster | 20 | 8 x Faster | 10 | 16 x Faster |
| Area (in nm²) | 1,400 | 5 | 280 x Smaller | 80 | 17 x Smaller | 160 | 8.5 x Smaller | 320 | 4.2 x Smaller | 640 | 2.1 x Smaller |

Comparison: AES-GCM Versus PRNG-based Chiplet-to-Chiplet Secure Communication

FIG. 25

PRNG-BASED CHIPLET TO CHIPLET SECURE COMMUNICATION USING COUNTER RESYNCHRONIZATION

RELATED APPLICATIONS

This application is related to U.S. patent application "LOOKUP TABLE (LUT) BASED CHIPLET TO CHIPLET SECURE COMMUNICATION" with application Ser. No. 17/683,089 and with U.S. filing date Feb. 28, 2022 and to U.S. patent application "LOOKUP TABLE (LUT) BASED ENCRYPTION WITH TAG-BASED VERIFICATION" with application Ser. No. 17/683,087 and with U.S. filing date Feb. 28, 2022. Both of the above applications are hereby incorporated by reference in their entireties.

FIELD OF TECHNOLOGY

Some embodiments pertain to systems and methods that utilize one or more pseudo-random number generators (PRNG's) to provide encryption and decryption for chiplet-to-chiplet secure communication. In particular, some embodiments pertain to systems and methods for PRNB-based encryption and decryption for secure chiplet-to-chiplet communication utilizing dynamic substitution strings, keystream strings, and counter synchronization.

BACKGROUND

A chiplet is an integrated circuit that is designed to be part of a larger whole. In some implementations, a chiplet is an independent unit for processing and computing. A chiplet may be a part of a package. In some implementations, a package may contain multiple homogenous or identical chiplets. A package may contain multiple heterogenous chiplets. A chiplet may also contain one or more sub-chiplets. A sub-chiplet is a dedicated hardware for a specific purpose, such as for example, an artificial intelligence engine, a machine learning engine, a communication circuit, or other fixed purpose. A chiplet may also be part of a larger integrated circuit, such as a computer processor.

Recently chiplets are part of a trend toward modular design of processors and other large integrated circuits. One reason for this is reduced cost if there is a defect. If there is a defect in a monolithic computer processor, the entire computer processor may have to be discarded. In contrast if there is a defect is a chiplet that forms part of a modular computer processor, only that one defective chiplet need be discarded.

Chiplets communicate with other chiplets via communication channels. Traditionally the security of these chiplet-to-chiplet communication channels has been given minimal importance. Yet, it is often important that chiplet-to-chiplet communication be as stable and error-free as possible. Applications where this is true include applications for detecting abnormal behavior in other applications and for transmitting sensitive data. Therefore, secure communication between chiplets is desirable.

One challenge for secure chiplet-to-chiplet communication has been secure communication in resource-constrained devices. Resource-constrained devices include devices that are constrained in at least one of computing power, memory resources, or power supply. Examples of resource-constrained devices include, without limitation, smart cameras, smart home devices, smart telephones, routers and switches, and automotive devices. Another example is Internet-of-things (IoT) devices.

The above examples of resource-constrained devices have a variety of practical applications. For example, smart cameras have application in surveillance. Smart home devices may be useful for saving energy, home automation, and for convenience and comfort. Smart devices, such as telephones, have practical applications for monitoring health and for customized user experiences. Improved routers and switches may provide safer and quicker communication. And automotive computing devices have practical applications for safer transportation and for reliable communication among automotive components.

Many resource-constrained devices include chiplets and packages composed of chiplets. Secure and reliable communication between these chiplets is desirable for realizing the maximum practical benefits of these resource-constrained devices. Because these devices are resource-constrained, they need to have secure communication provided via lightweight protocols and technologies. Lightweight protocols and technologies are those that require at least one of fewer computer power, fewer memory resources, or less electrical power compared to a device that is not resource-constrained, such as for example, a server, a cloud computer, or a desktop computer.

SUMMARY

In some embodiments, a cryptographic method is performed with one or more chiplets of a first group of two or more chiplets. The method includes at least parsing at least a message into one or more groups of ordered message blocks including at least a first group of two or more ordered message blocks, the first group of message blocks associated with at least a first group of index values indicative of one or more positions of individual message blocks of the first group of blocks relative to one another.

The method further includes at least generating, in parallel with the first group of chiplets, two or more substitution values for the first group of ordered message blocks, a given substitution value of the two or more substitution values being generated to be associated with a given message block of the first group of ordered message blocks, the given substitution value being generated at least in part with an activation of a pseudo-random number generator seeded with a seed generated at least in part with (i) a first random or pseudo-random number and (ii) one or more numerical values associated with content of the given message block.

The method further includes at least generating, in parallel, two or more sequencing values for the first group of ordered message blocks, a given sequencing value of the two or more sequencing values being generated to be associated with the given message block and being generated at least in part with an activation of a pseudo-random number generator seeded with a seed generated at least in part with (i) a second random or pseudo-random number and (ii) a given index value that is one of the first group of index values and that is associated with the given message block.

The method further includes at least generating, in parallel, a first group of ciphertext blocks for the first group of message blocks based at least in part on two or more XOR operations, a given XOR operation of the two or more XOR operations including at least a first operand derived at least in part from the given substitution value and a second operand derived at least in part from the given sequencing value;

The method further includes at least concatenating at least the first group of ciphertext blocks to form at least a portion of a ciphertext.

And the method further includes at least transmitting the at least a portion of ciphertext to a second chiplet.

In some other embodiments, a cryptographic method is performed with one or more chiplets of a first group of two or more chiplets. The method includes at least parsing at least a ciphertext into one or more groups of ciphertext blocks including at least a first group of two or more ciphertext blocks, the first group of ciphertext blocks associated with at least a first group of index values indicative of one or more positions of individual ciphertext blocks of the first group of ciphertext blocks relative to one another.

The method further includes at least generating, in parallel, two or more sequencing values for the first group of two or more ciphertext blocks, a given sequencing value of the two or more sequencing values being generated to be associated with a given ciphertext block of the first group of two or more ciphertext blocks, the generating of the given sequencing value including at least an activation of a pseudo-random number generator seeded with a seed generated at least in part with (i) a random or pseudo-random number and with at least (ii) a given index value of the first group of index values, the given index value being associated with the given ciphertext block;

The method further includes at least generating, in parallel, two or more substitution values, at least in part, with at least two or more XOR operations, a given substitution value of the two or more substitution values being generated by a given XOR operation of the two or more XOR operations being performed with a first operand of at least the given ciphertext block and a second operand of the given sequencing value;

The method further includes at least generating, in parallel, a first group of message blocks decrypted from the first group of cipher blocks based at least in part on the two or more substitution values.

And the method further includes at least concatenating at least the first group of message blocks to form at least a portion of a message.

BRIEF DESCRIPTION OF THE DRAWINGS

Representative embodiments are illustrated by way of example and not by limitation in the accompanying figures, in which:

FIG. 5 is a simplified block diagram of an exemplary chiplet consistent with some embodiments, showing a transmission circuit and a reception circuit.

FIG. 24 is a simplified block diagram of a chiplet configured for a two-key encryption mode, consistent with some embodiments.

FIG. 25 a chart showing test results of trials performed between AES-GCM versus PRNG-based IDE.

DETAILED DESCRIPTION

Figure 1:
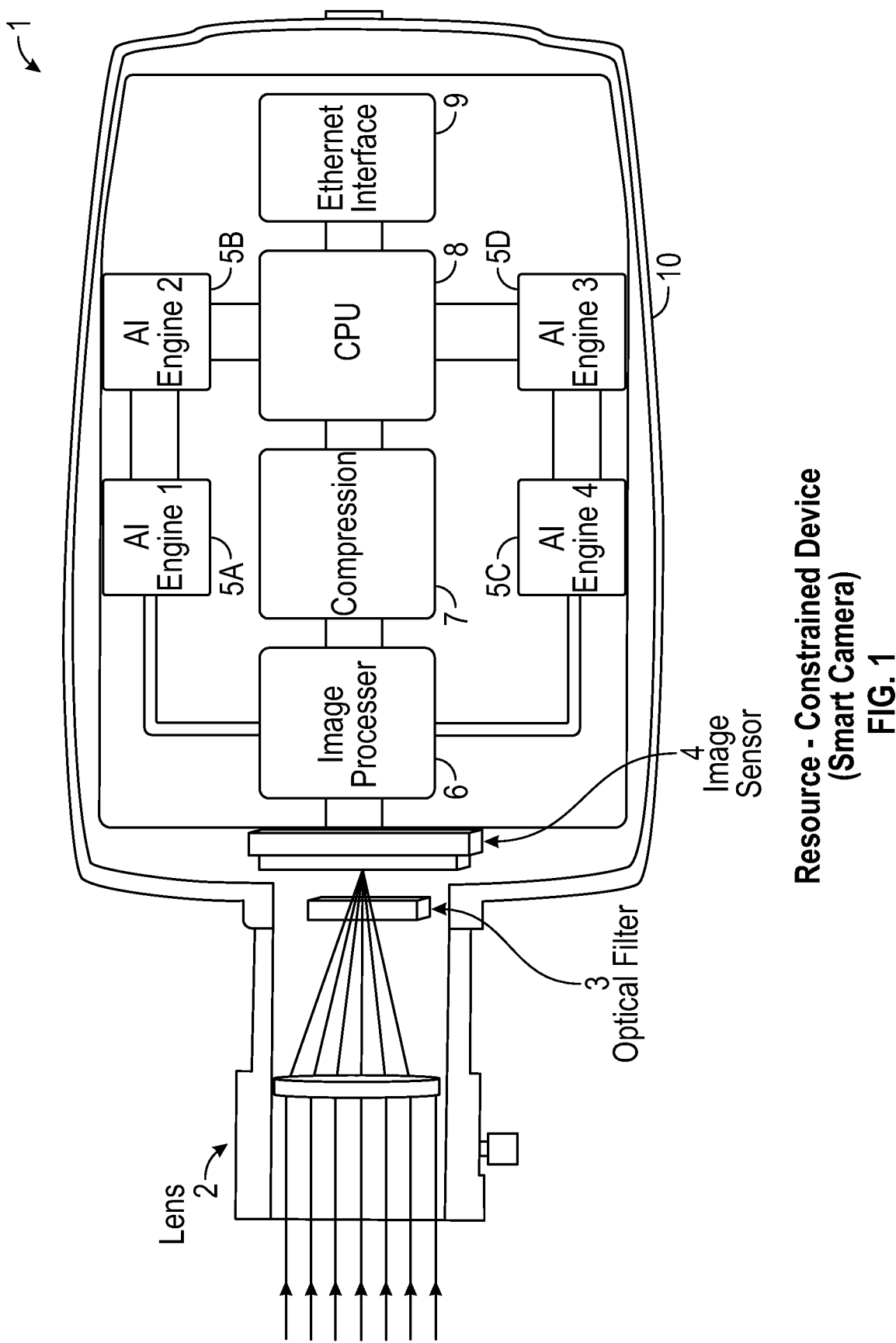
FIG. 1 is a simplified block diagram of a resource-constrained device—a smart camera—in which some embodiments may be practiced.

In the above-described drawings, certain features are simplified to avoid obscuring the pertinent features with extraneous details. The above drawings are not necessarily to scale.

It is to be understood that the disclosed embodiments are merely exemplary of the invention, which may be embodied in various forms. It is also to be understood that multiple references to "some embodiments" are not necessarily referring to the same embodiments.

As used in this document "secure lightweight chiplet-to-chiplet communication" includes chiplet-to-chiplet communication that is secure but uses at least one of less computing power, less memory resources, or less electrical power as compared with at least some alternative modes of secure communication.

This document refers to various types of strings. Although the term "string" has a variety of meanings in computer technology, as used in this document the word string refers to a sequence of binary digits, such as bits. In some embodiments, a string is a random or pseudo-random sequence of bits. In particular embodiments a string is a random number generated by a true random number generator (TRNG). In other particular embodiments a string is a pseudo-random number generated by a pseudo-random number generator (PRNG).

In the discussion below, "r0" refers to a first random or pseudo-random sequence of bits and "r1" refers to a second random or pseudo-random sequence of bits. Both r0 and r1 may be generated with either a TRNG or a PRNG. At least some algorithms discussed below use both r0 and r1 because it is important in some algorithms to have two separate random or pseudo-random numbers for the security of various operations.

In some embodiments, TRNG's are hardware-based true random number generators. A hardware-based true random number generator generates random numbers based on physical phenomena rather than based on algorithms. Some examples of these physical phenomena are thermal noise, random noise signals, photoelectric effects, quantum effects, and other physical phenomena.

In some embodiments, PRNG's are deterministic random number generators that generate pseudo-random numbers based on an algorithm. In some embodiments they are seeded at least in part with a random number or a pseudo-random number such as r0 or r1. In some further embodiments, a PRNG is additionally seeded with additional values which may be combined in various ways with a random number or a pseudo-random number. PRNG's are sometimes used instead of true random number generators because of reduced computational overhead.

In some embodiments described in this document, a PRNG accepts input that includes at least a seed and a length parameter. Because PRNG's are deterministic, executing a PRNG with the same seed will result in the same pseudo-random number being output. The PRNG therefore provides a mapping between a seed and a specific output. The length parameter specifies the size in bits of the PRNG output. For example, a length parameter may specify a 16 bit, a 32 bit, a 64 bit or other size of output. In particular, three variables used in document may serve as length parameters are b, w and w-b. Where b is a length in bits of message blocks (and other values), w is a length in bits of at least ciphertext blocks, and w-b is a length of some and other values. The variables b, w, and w-b are also used to indicate a length of bits of other structures discussed below, including, for example, partial tags, nonces, keystream strings, and others.

As used in this document, a "dynamic" structure or event is a structure or event that is constructed or performed by executing programs during runtime or "on the fly." In contrast, a static structure refers to a structure that is constructed at compile-time, before runtime.

This document refers to dynamic substitution strings (DSS's), which in some embodiments are generated with a PRNG, seeded with bits representing a message block and optionally with at least one of a random or pseudo-random number or optional additional values. When a PRNG is used to generate a DSS, one result is that message bits are replaced with substitution bits. Thus, a DSS is a specific type of substitution string in which the bits of a message block are replaced with other substitution bits. That is, there is a mapping between a message block and the substitute pseudo-random number generated by a PRNG. This mapping is provided by a PRNG that in response to being seeded a particular seed outputs a particular pseudo-random number. Thus, a PSRB may be used for substitutions. Further details of a DSS are discussed below relative to FIG. 6.

This document refers to keystream strings (KSS's), which in some embodiments, are generated with a PRNG seeded with bits representing an index value of a message block and optionally with at least one of a random or pseudo-random number or with optional additional values. When a PRNG is used to generate a KSS, one result is that the resulting KSS is dependent on the index value of the message block. An index value represents a message block's position in a group of ordered message blocks. A further result is that a KSS enforces a sequence for an ordered group of message blocks because the KSS associated with a given message block is dependent on the position of the given message block within the group of ordered message blocks. That is, a KSS provides sequencing. Further details of a KSS are discussed below relative to FIG. 6. This document interchangeably refers to either keystream string or KSS.

This document uses the term "tag" includes its ordinary meaning and includes one or more values for verifying the correctness of a decryption. Examples of a tag include one or more of a cyclic redundancy check (hereinafter "CRC"), a hash function, or another type of value for verifying the correctness of a decryption. In some embodiments discussed herein, a tag is computed (perhaps with a PRNG) according to one or more algorithms disclosed herein. In some embodiments at least a partial tag is computed at least in part with associated data.

As used in this document "associated data" is data that is associated with a message to be encrypted and/or a ciphertext to be decrypted. In some embodiments, the associated data is itself not encrypted, rather it is transmitted over the channel as a plaintext. In some embodiments the associated data is metadata.

This document frequently refers to the term counter, often designated as "ctr."

This document uses the term "session key" to refer to a concatenation of two random or pseudorandom bits designated $r_0$ and $r_1$, the concatenation being $r_0\|r_1$. In some of the embodiments discussed below, a session key is used to generate a DSS and a KSS. These and related concepts are described in more detail below. In some of that discussion, the letter "K" is used to refer to a session key.

In describing some embodiments, this document uses the term "encryption key" to refer to a collection of data structures and data. For example, with respect to some embodiments, an encryption key is a tuple that includes r0, r1, and a ctr. In describing some embodiments, this document uses the term decryption key similarly. Specifics of the contents of an "encryption key" or a "decryption key" are discussed below with reference to specific embodiments.

Some mathematical expressions used in this document are:
 a. $\lambda$ (lambda) which in this document refers to a security parameter; and
 b. $\oplus$ which indicates a bitwise XOR operation.

There is a need for secure lightweight chiplet-to-chiplet communication. In particular, there is a need for encryption and decryption technologies that avoid or minimize use of resource-intensive multiplication operations. And there is a need for technologies for verifying the integrity and authenticity of messages while avoiding or minimizing resource-intensive hash functions.

This need for secure lightweight chiplet-to-chiplet communication is especially relevant for resource-constrained devices, which as used herein, refers to a computing device that is constrained in at least one of computing power, memory resources, or power supply. One example of a resource-constrained device is an Internet-of-Things (IoT). Other examples of resource-constrained devices include, without limitation, smart cameras, smart home devices, smart telephones, routers and switches, and automotive devices. Examples of computing devices that are not resource-constrained, for purposes of this document, are servers, powerful cloud-based computers, and desktop computers.

Practical applications for resource-constrained devices with secure lightweight chiplet-to-chiplet communication include, for example, surveillance, energy efficiency, home automation, health monitoring, secure and efficient communication, and better functioning machines, such as automobile engines.

Embodiments described herein provide such secure lightweight chiplet-to-chiplet communication. For example, some embodiments provide for communication between a pair of chiplets linked by a communication link. In some embodiments, the pair of chiplets are part of numerous chiplets, and corresponding communication links, in a package. In some embodiments a pair of chiplets are on the same die. In some embodiments, a pair of chiplets reside on different dies and are linked by a series of network communication links. In some embodiments, two chiplets may communicate with each other across a network.

Embodiments described herein may provide a variety of services, such as for example, one or more of the following services:
 a. Lightweight methods of encryption and decryption of messages;
 b. Tag computation and verification; and
 c. Support for various modes of communication between chiplets.

Not all embodiments provide all of the above services. For example, in some embodiments, chiplets communicate via a communication link that does not support encryption or decryption. In some embodiments, tag computation and verification are not performed. And some embodiments are limited in their modes of communication.

Turning first to lightweight methods of encryption and decryption, some embodiments described herein use a DSS. In contrast to a static substitution string such as that created by a static substitution box, a DSS is computed at runtime, for example, during execution of an encryption or decryption function.

Some embodiments additionally use a KSS. As discussed above, a KSS may be a pseudo random string of bits generated with a PNRG dependent at least in part on numerical index values (e.g. blocks of bits) organized in numerical order. A KSS thus is the result of a mapping between at least numerical index values and a pseudo-random string of bits This mapping is provided by a PRNG that in response to being seeded a particular seed outputs a particular pseudo-random number. At least some embodiments described below use both a DSS and a KSS for encryption. The DSS and the KSS are also used for decryption.

Use of the DSS and of the KSS may result in replacing computationally expensive multiplication operations used in some encryption and decryption protocols. Thus, encryption and decryption are less computationally expensive for resource-constrained devices.

Some embodiments also replace computationally-expensive hash-based functions, which are commonly used to verify data integrity, with a lightweight Tag which in some embodiments is concatenated with and encrypted along with the message. Computation of a Tag may, in some embodiments, be less computationally-expensive than computing a hash function. Replacing hash functions with computationally-light-weight tags in many cases causes computationally-expensive multiplication to be replaced by less computationally-expensive shift and XOR operations.

Some embodiments provide one or more of three new modes of communication between chiplets. As compared with traditional half duplex and full duplex, these new modes of communication provide one or more of faster communication with fewer waiting times, reduced data storage requirements, higher security, or higher performance. More details on these are provided below.

Referencing FIG. 1, a resource-constrained device, such as smart camera 1 provides an environment in which some embodiments may be at least partially practiced. Smart camera 1 includes lens 2 coupled or integral with housing 10. Housing 10 includes a processing device such as CPU 8. Housing 10 further includes artificial intelligence resources such as for example AI engines 5A-5D, ethernet interface 9, compression circuitry 7, and image processor 6, each of which is communicably linked with CPU 8. An optical filter 3 and an image sensor 4 are provided and are positioned to capture and process light entering lens 2. As has been discussed above, smart camera 1 is just one example of a resource-constrained device.

Figure 2A:
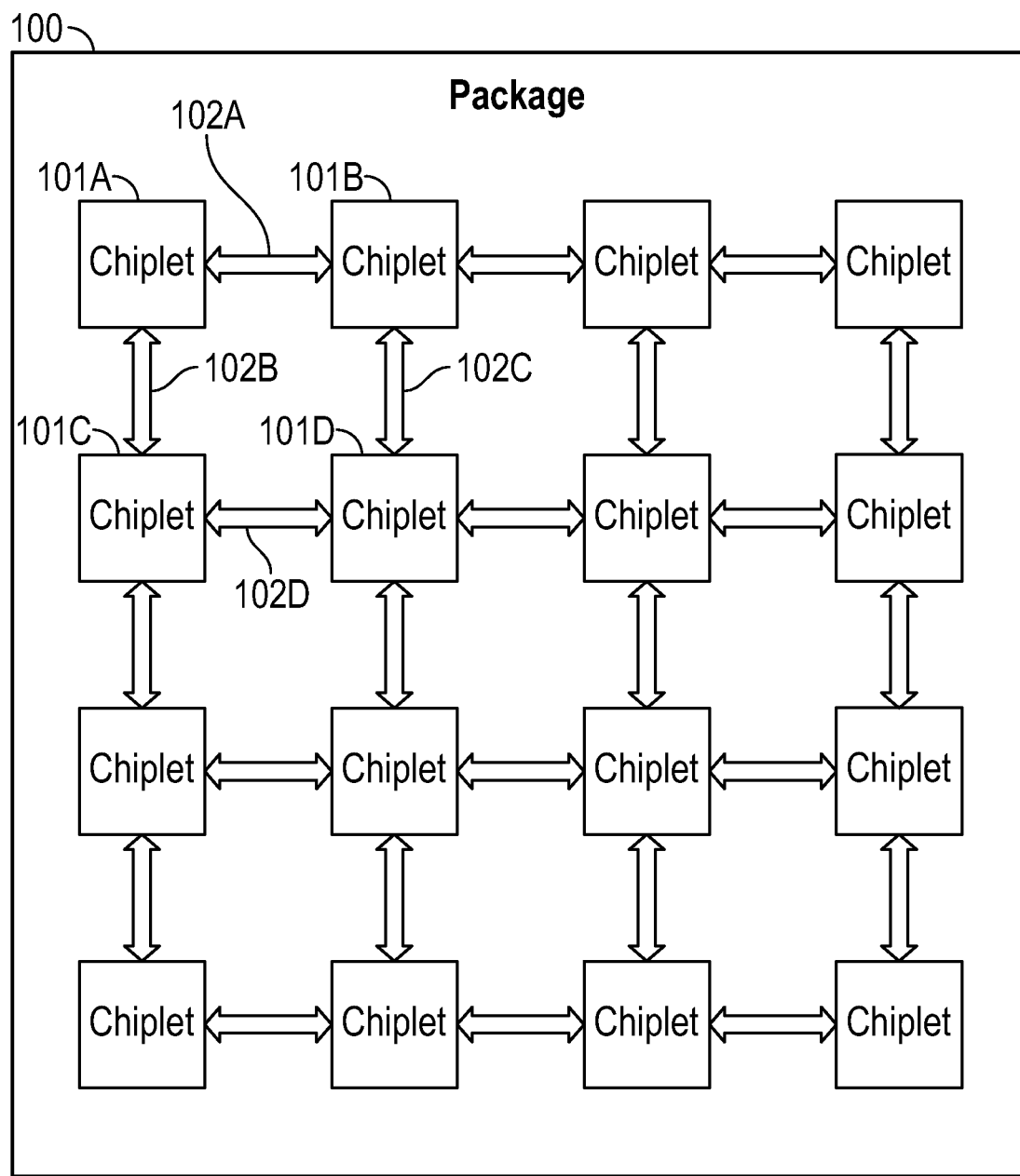
FIG. 2A is a simplified block diagram of a package with which some embodiments may be practiced, showing the package as including a plurality of chiplets communicably linked with a plurality of communication channels.

Referencing FIG. 2A, a package 100 includes a plurality of chiplets, including for example chiplets 101A-101D. In some embodiments, package 100 is a component of a processor, such as for example CPU 8 of FIG. 1. The various chiplets, for example chiplets 101A-101D, are communicably linked with one or more other chiplets via communication links, such as communication links 102A-102D.

Figure 2B:
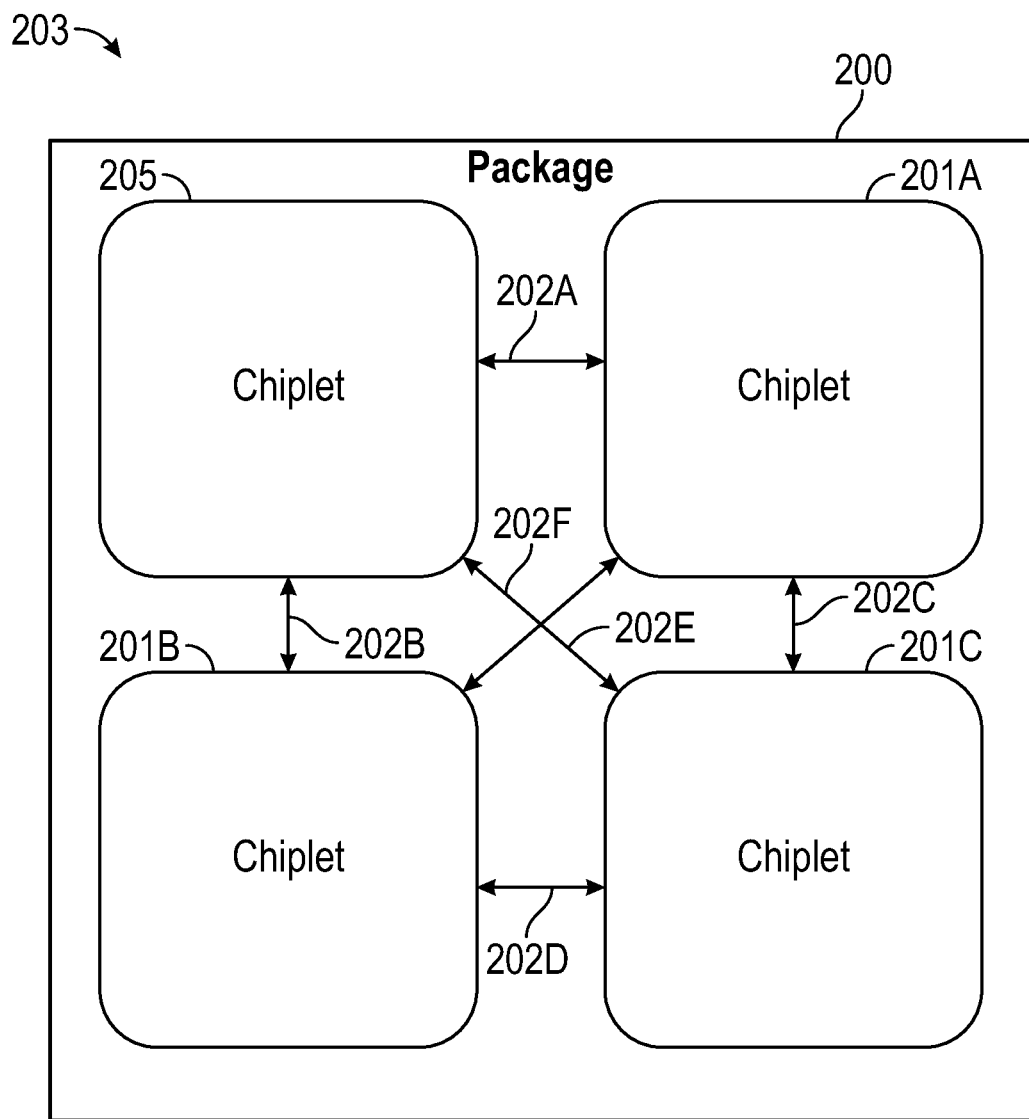
FIG. 2B is a simplified block diagram of a network of chiplets on a package, consistent with some embodiments, showing a lead chiplet and a plurality of follower chiplets.

Referencing FIG. 2B, a chiplet network 203 is located on a package 200. The chiplet network includes a leader chiplet 205 (for coordinating the work of other chiplets) and follower chiplets 201A-201C (for example, for parallel execution). Leader chiplet 205 and follower chiplets 201A-201C are in communication via communication links 202A-202F. In some embodiments, leader chiplet 205 executes operations that are performed sequentially and follower chiplets 201A-201C perform operations in parallel.

Figure 3:
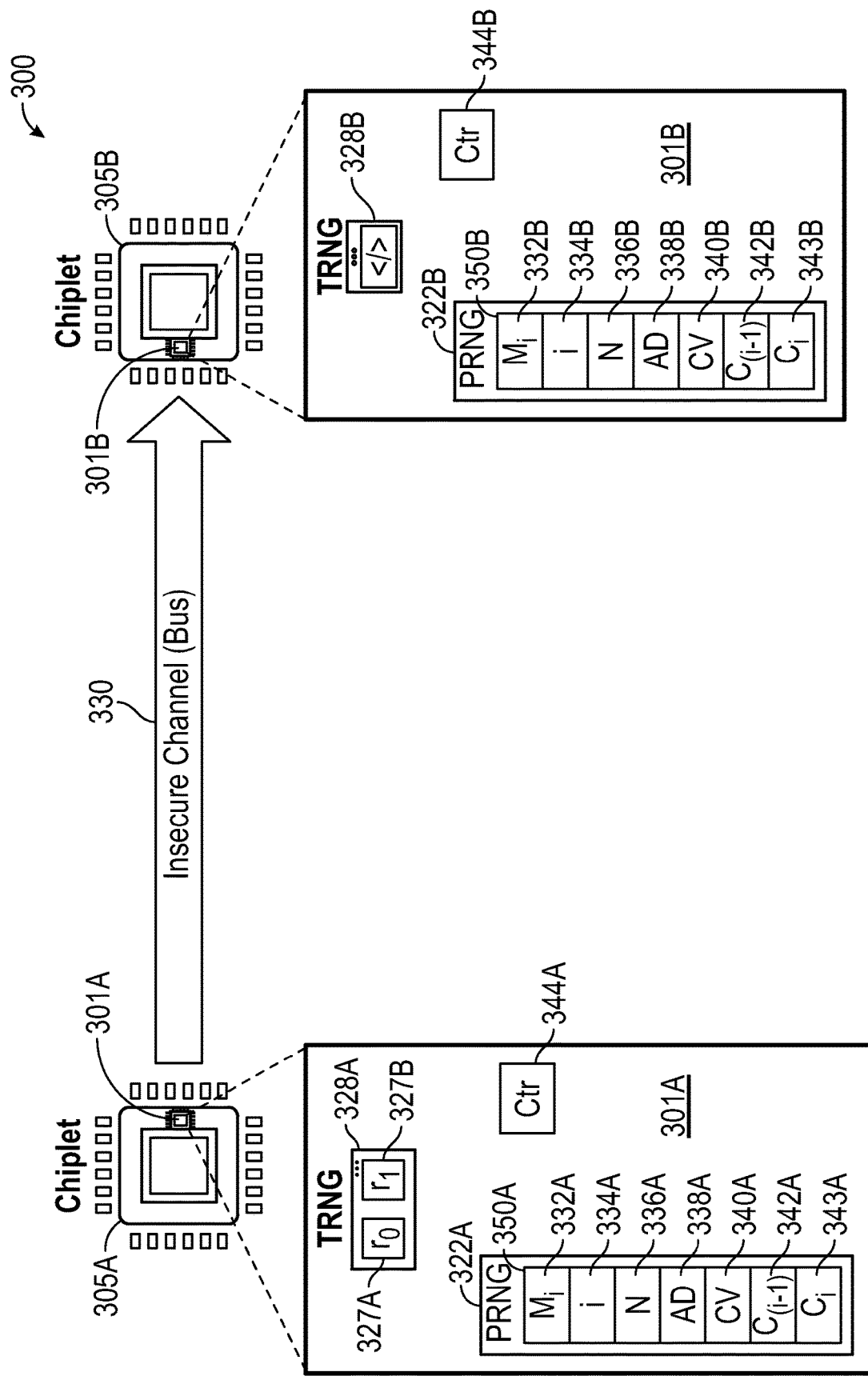
FIG. 3 is a simplified block diagram of a first chiplet and a second chiplet that are communicably linked via an insecure channel, showing various components of both chiplets, consistent with some embodiments.

Referencing FIG. 3, a network 300 includes chiplets 305A, 305B and an insecure channel 330 (e.g. a bus) communicably linking chiplets 305A and 305B. Chiplet 305A includes communication sub-chiplet 301A (same as the transceiver circuit 413 of FIG. 4 which is implemented as a communication sub-chiplet) which includes TRNG 328A (a true random-number generator), PRNG 322A (a pseudo-random number generator), and a counter (ctr) 344A. TRNG 328A is configured to output true random numbers, such as for example, true random numbers r0 (327A) and r1 (327B). In this embodiment, r0 and r1 are true random numbers generated by TRNG 328A. In other embodiments, r0 and r1 are pseudo random numbers generated with a PRNG.

PRNG 322A also contains a memory 350A (e.g. a cache memory, a flash memory, a volatile memory, and/or a non-volatile memory) storing a message block ($M_i$) 332A, an index value (i) 334A, a nonce value (N) 336A, associated data (AD) 338A, a counter value (CV) 340A, (if available) a ciphertext for a previous message block ($C_{i-1}$) 342A, and for decryption purposes a message block ciphertext (Ci) 343A. The function of each of elements is discussed below in connection with specific algorithms.

Similarly, Chiplet 305B includes communication sub-chiplet 301B which includes TRNG 328B (a true random-number generator), PRNG 322B (a pseudo-random number generator), a counter (ctr) 344B, and a memory 350B storing a message block ($M_i$) 332B, an index value (I) 334B, a nonce value (N) 336B, associated data (AD) 338B, a counter value (CV) 340B, (if available) a ciphertext for a previous message block ($C_{i-1}$) 342B, and for decryption purposes a message block ciphertext (Ci) 343B.

In some embodiments, communication sub-chiplet 301A is configured to send an encrypted message (not shown) to communication sub-chiplet 301B via insecure channel 330. Communication sub-chiplet 301A encrypts the message at least in part with r0 and r1. Communication sub-chiplet 301B receives the encrypted message (ciphertext) and decrypts it at least in part with r0 and r1.

In some embodiments, communication sub-chiplet 301A generates a session key K (not shown) by generating and then concatenating r0 and r1. Communication sub-chiplet 301A uses public key cryptography (e.g. PKC Engine 405 of FIG. 4) to provide the true random numbers r0 (327A) and r1 (327B) via insecure channel 330 to communication sub-chiplet 301B, which then provides the true random numbers r0 (327A) and r1 (327B) to PRNG 322B for use as at least a portion of a seed.

Figure 4:
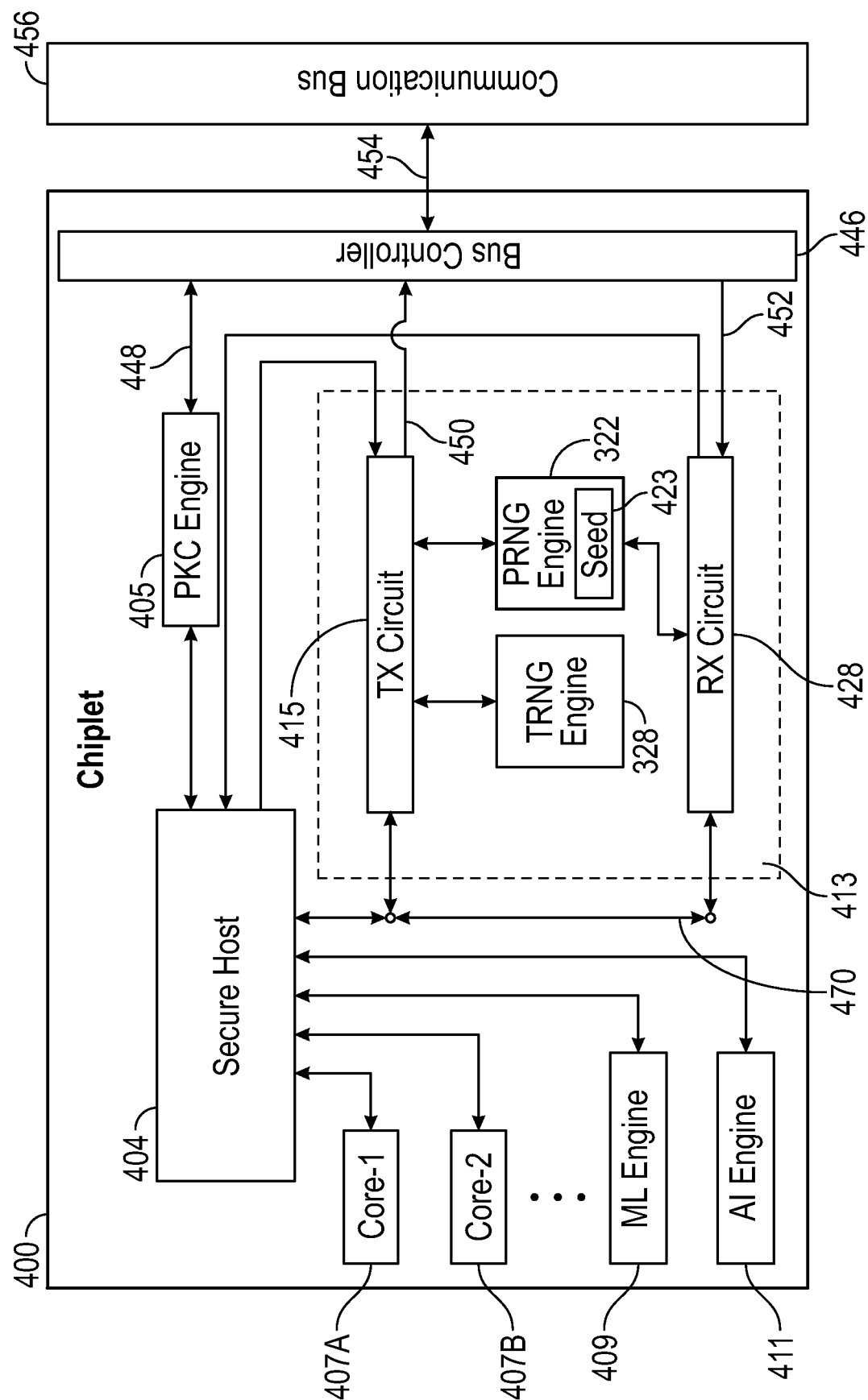
FIG. 4 is a simplified block diagram of an exemplary chiplet consistent with some embodiments, showing first and second cores and various additional components.

Referencing FIG. 4, a chiplet 400 is disclosed in which some embodiments may be practiced. Chiplet 400 includes a secure host 404 (e.g. secure processing circuitry such as for example one or more processors). Consistent with some embodiments, chiplet 400 further includes at least core-1 (407A) and core-2 (407B), an ML engine 409 (a machine-learning engine), and an AI engine 411 (an artificial intelligence engine), all of which are communicably linked with secure host 404. Chiplet 400 further includes transceiver circuit 413 that is communicably linked with secure host 404. Transceiver circuit 413 includes TX Circuit 415 (a transmission circuit), an RX Circuit 428 (a receiver circuit), a TRNG engine 328 (a true random number generator engine) and a PRNG engine 322 (a pseudo-random number generator engine), at least temporarily storing seed 322.

Although TX Circuit 415 and RX Circuit 428 are at least similar, respectively, to communication sub-chiplet 301A (sender) and to communication sub-chiplet 301B (receiver), there are some differences. For example, in FIG. 3, communication sub-chiplet 301A includes PRNG 322A and TRNG 328A. And similarly, communication sub-chiplet 301B includes PRNG 322B and TRNG 328B. That is, communication sub-chiplets 301A, 301B do not share the foregoing internal components. In contrast, TX Circuit 415 and RX Circuit 428 share (e.g. in a shared memory—not shown) TRNG engine 328 and PRNG engine 322.

TRNG engine 328 and PRNG engine 322 are each communicably linked with, and therefore accessible to, both TX circuit 415 and RX circuit 428. Each of TX circuit 415 and RX circuit 428 are communicably linked with secure host 404 via communication link 470. Chiplet 400 further includes a public key cryptography engine 405 ("PKC engine") that is communicably linked with secure host 404.

Continuing with reference to FIG. 4, Chiplet 400 further includes a bus controller 446 and a communication link 454 that communicably links bus controller 446 with a communication bus 456. Bus controller 446 is communicably linked with PKC engine 405 via communication link 448, with TX circuit 415 via communication link 450, and with RX circuit 428 via communication link 452.

Referencing FIG. 5, a chiplet 500 includes a public key cryptography engine 405 (PKC engine), a secure host 404, a TX circuit 515 (a transmission circuit), and an RX circuit 528 (a receiving circuit). Chiplet 500 is communicably coupled via communication links 450 and 452 with a bus controller 446, and via communication link 454 with a communication bus 456. TX circuit 515 and RX circuit 528 are communicably linked with secure host 404 via communication link 470, and thus may receive commands, instructions, and data from secure host 404.

Secure host 404 contains computer-readable medium 531 bearing executable instructions 529 (e.g. executable code, applications, etc.). In some embodiments, secure host 404 is a central processing unit 404 (CPU) and computer-readable medium (e.g. machine-readable medium) includes at least one of cache, RAM, or persistent memory storing the executable instructions 529. In some embodiments, executable instructions 529 contain executable instructions that when executed cause a chiplet, such as for example, chiplet 500 to perform any of the key generation, encryption and decryption methods described with reference to FIGS. 7-16. In some embodiments, executable instructions 529 provide the logic for other components of FIG. 5, such as for example PRNG 322, encryption circuit 510, decryption circuit 540, and/or other components. That is, in some embodiments these other components may be embodied at least partly in executable instructions 529. In some other embodiments, the other components contain their own executable logic and/or instructions. In some alternative embodiments, instead of or in addition to executable instructions 529. a field programmable gate array (FPGA), a application-specific circuit (ASIC), or other type of hardware or software logic is provided.

PKC engine 405 includes a public key encryption circuit PKC_E 558 which uses the public key of a receiver chiplet to encrypt a message, and a public key decryption circuit PKC_D 560 which uses the private key of the chiplet 500 to decrypt a ciphertext. PKC engine 405 is communicably coupled with bus controller 446 via communication link 448. PKC engine 405 is also communicably linked with secure host 404 (e.g. one or more processing devices, such as for example, one or more CPU's).

TX circuit 515 includes a key manager 506, a key generation function (sender) 508, an Encryption Circuit 510, a packet handler 518 for receiving transmissions from secure host 404 and a packet handler 520 for transmitting to bus controller 446 via communication link 450.

Encryption Circuit 510 includes a random number r0 (327A) and random number r1 (327B). In some alternative embodiments, r0 and r1 are pseudo-random numbers generated with a PNRG. The key generation function (sender) 508 is communicably linked for sending and receiving with TRNG 328 (a true random number generator). Encryption Circuit is communicably linked for sending and receiving with PRNG 322 (a pseudo-random number generator). Encryption circuit 510 includes a counter, namely ctr 516. PRNG 322 utilizes a seed 423 (generated, transiently stored, and utilized on the fly) for generating pseudo-random numbers.

RX circuit 528 includes a key manager 530, a key generation function (receiver) 532, a Decryption Circuit 540, a packet handler 544 for sending transmissions to secure host 404 and a packet handler 542 for receiving communications from bus controller 446 via communication link 452. Decryption circuit 540 includes random number r0 (327A) and random number r1 (327B), which in some embodiments are the same as r0 327A and r1 327B of TX circuit 515, and counter 538, which in some embodiments is the same as counter ctr 516 of TX circuit 515. The decryption circuit 540 is communicably linked for sending and receiving with PRNG 322 (a pseudo-random number generator).

A process is now described in which Chiplet 500 (a first chiplet) generates a session key K and transmits K to a second chiplet for use by the second chiplet in performing encryption. Consistent with some embodiments, the chiplet 500 may perform the following steps with the indicated components: (1) key generation function (sender) 508 computing a session key K consistent with method 700 of FIG. 7 (discussed below), (2) the key generation function (sender) 508 sending K to key manager 506 of the TX Circuit 515, (3) the key manager 506 receiving K and further sending K to the Secure Host 404, (4) Secure Host 404 configured for receiving K and further sending K to public key cryptography (PKC) engine 405 with a request for encryption operation on K and for transmission to a second chiplet, (5) PKC engine 405 receiving and then sending K along with the public key of the second chiplet to public key encryption module PKC_E 558, (6) public key encryption module PKC_E 558 receiving K and public key of second chiplet, (7) public key encryption module PKC_E 558 encrypting K to obtain encrypted session key KEnc, the encryption including at least one or more operations that include at least some public key cryptography method, (8) public key encryption module PKC_E 558 further configured for sending KEnc to the PKC Engine 405, and (9) PKC engine 405 receiving key KEnc and transmitting KEnc to the second chiplet via the communication link 448 to bus controller 446 and then via communication link 454 to the communication bus 456 for delivery to the second chiplet.

The second chiplet then continues the process with the following steps by the indicated components: (1) a PKC engine receiving KEnc from the first chiplet via the communication link via a bus controller and a communication bus, (2) the PKC engine sending key KEnc along with the private key of the second chiplet to a public key decryption module PKC_D, (3) the public key decryption module PKC_D receiving KEnc and the private key of second chiplet, (4) the public key decryption module PKC_D decrypting KEnc to obtain session key K, the decryption including at least one or more operations that include at least some public key cryptography method, (5) the public key decryption module PKC_D sending K to a PKC Engine of the second chiplet, (6) the PKC engine receiving K and then sending K to the Secure Host of the second chiplet, (7) the Secure Host receiving K and sending K to a key manager of the RX circuit of the second chiplet, (8) the key manager receiving K and sending K to the key generation function (receiver), (9) the key generation function (receiver) receiving K from key manager of the RX Circuit of the second chiplet, and (10) key generation function (receiver) 832 computing the decryption key (r0, r1, ctr) consistent with method 800 of FIG. 8 (discussed below).

Figure 6A:
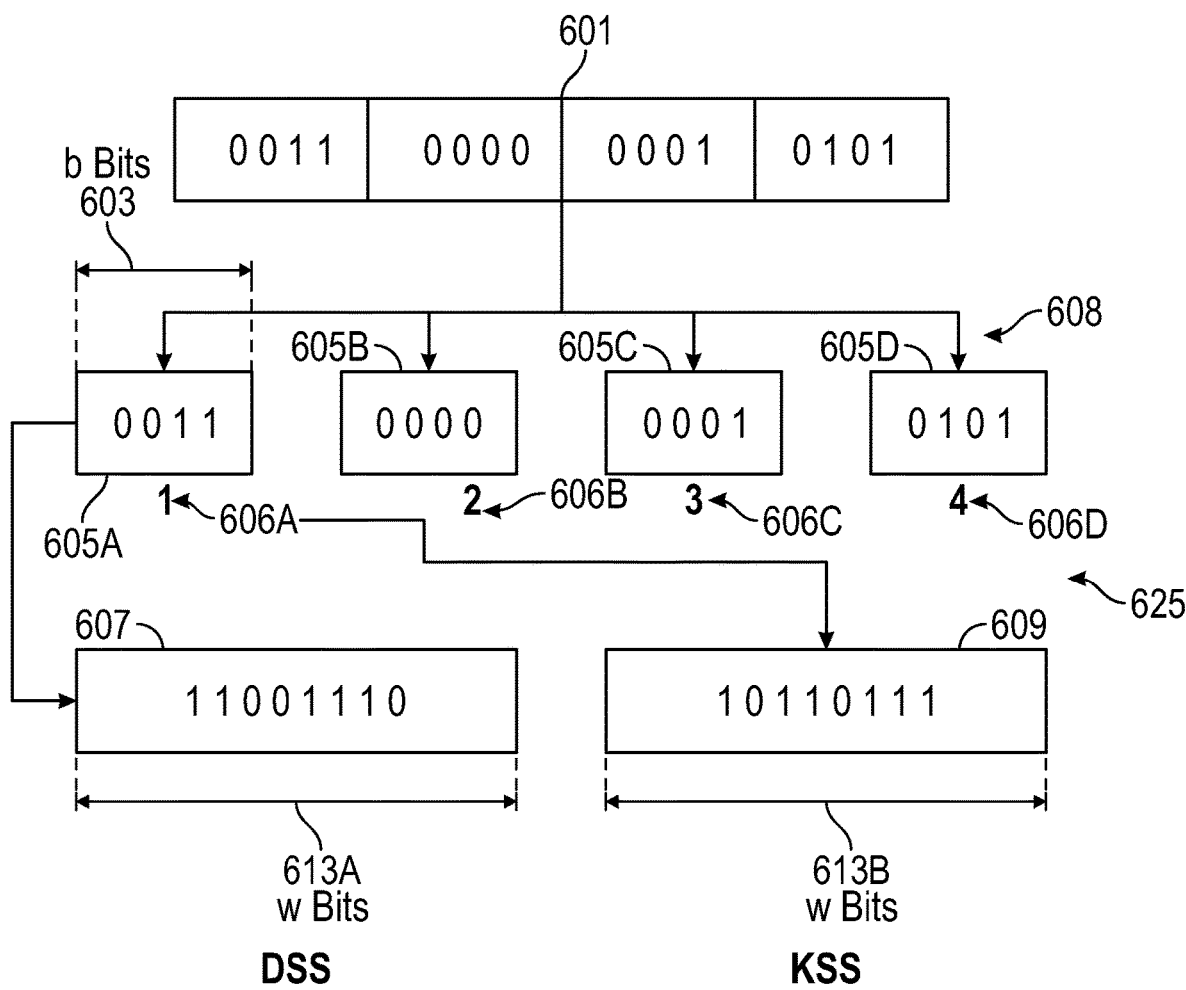
FIG. 6A is a block diagram of various data structures consistent with some embodiments, including a message, ordered message blocks, a dynamic substitution string (DSS) and a keystream string (KSS).

Referencing FIG. 6A, some exemplary data structures are discussed. A message 601 consists of bits 0011000000010101. Because this is an unencrypted message, it may be referred to as plaintext. In preparation for encryption, message 601 is parsed into ordered message blocks 605A with bits 0011, 605B with bits 0000, 605C with bits 0001, and 605D with bits 0101, which collectively are a group 608 of ordered message blocks. These message blocks have a length in bits, which is represented by the variable b (603). In this example, b is equal to 4 because each of message blocks 605A-605D has 4 bits.

As noted above, message blocks 605A-605D are ordered message blocks. And in this example, from left to right, the bits are in the same order as they were in message 601. Each of the message blocks 605A-605D is associated with an index value, namely index values 606A-606D, which are collective a group 625 of index values. That is, message block 605A is associated with index value 1 (606A), message block 605B is associated with index value 2 (606B), message block 605C is associated with index value 3 (606C), and message block 605D is associated with index value 4 (606D). And these index values are indicative of a given message block's position relative to the other message blocks within group 608. For example message block 605B with an index value of 2 is the second block from the left. And message block 605D with an index value of 4 is the furthest block on the right. The above is a simple example in that the value of b is 4. In some embodiments b is 16, 32, 64, or some other value.

Further referencing FIG. 6A, message block 605A is associated with a dynamic substitution string (DSS) 607. DSS 607 has bits 11001110 and has a length 613A represented by variable w. In this simple example, w is 8, so DSS 607 has 8 bits. It will be recalled that the message blocks are b bits wide, 4 in this example. In embodiments discussed in this document w is typically greater than b and in some embodiments, w is a multiple of b. For example, in some embodiments b is 16 and w is 32 or 64. In another example, b is 32 and w is 64, 128, or 256. In a further example, b is 64 and w is 512 or 1024. In some algorithms a DSS 607 is intermediate ciphertext and a longer value for w is associated with greater security. In some embodiments, the values of b and w are security parameters that are either entered explicitly by a user or that are part of a security parameter.

In some embodiments, b or w are used as a length parameter for a PRNG to set the length of the output of the PRNG. That is the variable b or w when used as a parameter for a PRNG sets the desired length of a pseudo-random number to be output by the PRNG to b bits or w bits. Other length parameters may also be used. Both b and w are discussed with respect to specific algorithms below.

In some embodiments DSS 607 is at least partly derived from message block 605A with a PRNG, such as PRNG 322. In these embodiments PRNG may be seeded at least partly with a seed comprising the numerical bits representing message block 605A, namely bits 0011. In some further embodiments, PRNG is seeded with a seed that further includes a first random or pseudo-random number such as r0 concatenated with the bits representing message block 605A. As discussed in more detail below relative to specific algorithms, other values may also be used to generate DSS 607. If the seed includes the numerical bits representing message block 605A, then the resulting DSS is dependent on the numerical bits representing message block 605A. Another way of viewing this is that DSS is at least partly a substitution string that is substituted for message block 605A.

Further referencing FIG. 6A, message block 605A is also associated with a keystream string (KSS) 609. KSS 609 has bits 10110111 and has a length 613B that is also represented by the variable w. That is, DSS 607 and KSS 609 have the same length in bits indicated by w. This may be a result of function because in some algorithms DSS 607 and KSS 609 are XOR'd together and therefore have the same number of bits.

In some embodiments KSS 609 is at least partly derived from index value 606A associated with message block 605A with a PRNG, such as PRNG 322. In these embodiments PRNG may be seeded at least partly with a seed comprising the index value associated with block 605A, namely the number 1 which can be expressed as bits 0001. In some further embodiments, PRNG is seeded with a seed that further includes a second random or pseudo-random number such as r1 concatenated with the bits representing the index value associated with block 605A. As discussed in more detail below relative to specific algorithms, other values may also be used to generate KSS 609. If the seed includes the index value associated with message block 605A, then the resulting KSS is dependent on that index value associated with the position of message block 605A relative to the other ordered message blocks 605B-605D. Another way of viewing this is that KSS is at least partly a sequencing string that enforces the sequence of the ordered message blocks. For example, KSS 609 is intermediate ciphertext that may be used to generate a ciphertext. The ciphertext may then be parsed into ordered ciphertext blocks. If the order of the ciphertext blocks is different from the order of the original message blocks, then when used for decryption KSS can be used to detect that change in order and signal an error.

Figure 6B:
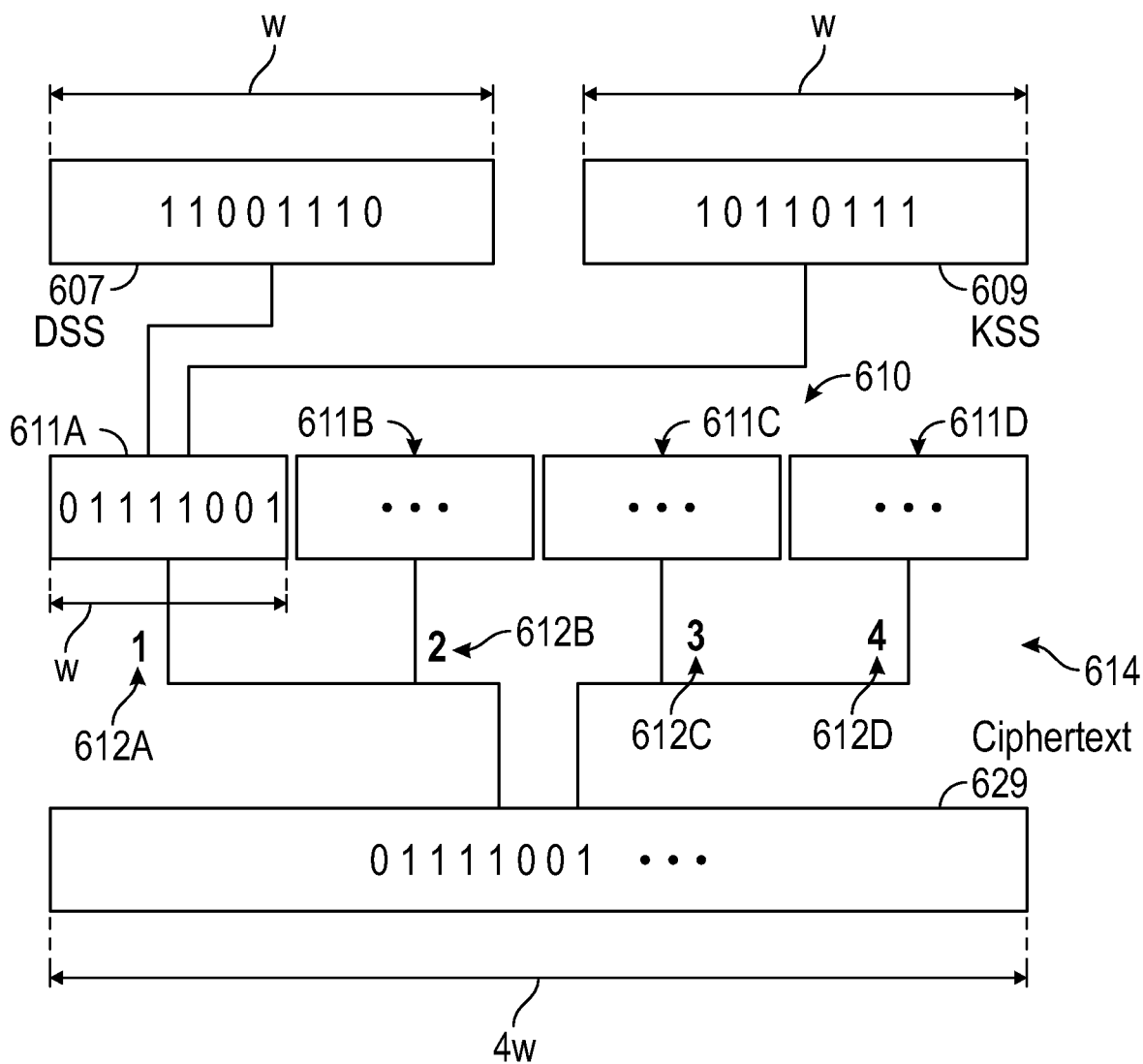
FIG. 6B is a block diagram of various data structures consistent with some embodiments, including ciphertext, ordered ciphertext blocks, a dynamic substitution string (DSS) and a keystream string (KSS).

Referencing FIG. 6B, additional data structures related to those of FIG. 6A are presented. DSS 607 and KSS 609, which are discussed above relative to FIG. 6A, are associated with ciphertext block 611A, which includes bits 01111001. Ciphertext block 611A is one of a group 610 of ciphertext blocks that includes ciphertext blocks 611A, 611B, 611C, and 611D. All of blocks 611A, 611B, 611C, and 611D have a length w, the same as the length of DSS 607 and KSS 609. For simplicity, the bits of ciphertext blocks 611B, 611C, and 611D are not shown in FIG. 6B.

Index values for the above ciphertext blocks are indicated, including index value 1 (612A) for ciphertext block 611A, index value 2 (612B) for ciphertext block 611B, index value 3 (612C) for ciphertext block 611C, and index value 4 (612D) for ciphertext block 611D. Collectively, these index values define a group 614 of index values. As with the group 608 of ordered message blocks discussed above, the index values of group 614 are indicative of the positions of the ciphertext blocks with the group 610 of ordered cipher text blocks. And the index value also indicates the message block that a given ciphertext block was at least partly derived from. For example, ciphertext block 611A was derived at least in part from message block 605A with index number 1, ciphertext block 611B was derived at least in part from message block 605B with index number 2, and so on.

In some embodiments, ciphertext block 611A is derived at least partly from DSS 607 and KSS 609. In some particular embodiments, block 611A is derived by a process that includes at least one XOR operation with DSS 607 and KSS 609 as operands. Specifics of some exemplary processes and algorithms are discussed below.

Further referencing FIG. 6B, ciphertext 629 is a concatenation (maintaining the same order) of the group of 610 or ordered ciphertext blocks 611A, 611B, 611C, and 611D. Ciphertext 629 has a length of 4w (4×w).

Figure 6C:
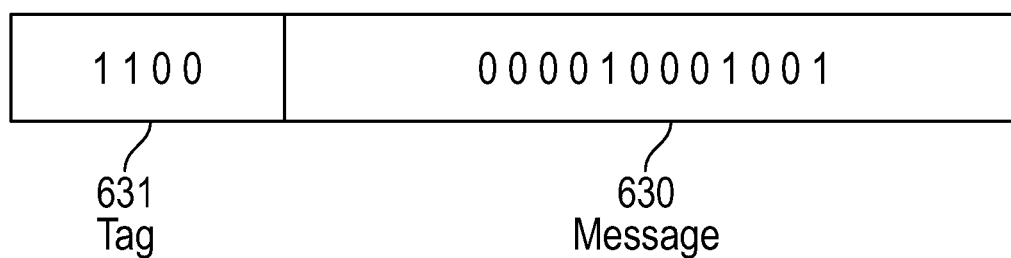
FIG. 6C is a block diagram of a tag concatenated with a message to form a concatenation, consistent with some embodiments.

Referencing FIG. 6C, a tag 631 with 4 bits 1100 is concatenated with a message 630 with 12 bits 000010001001 to form a concatenation 620. If the concatenation is parsed into 4 bit blocks, the tag would be the first block, and in this document, would be considered the first message block.

Figure 7:
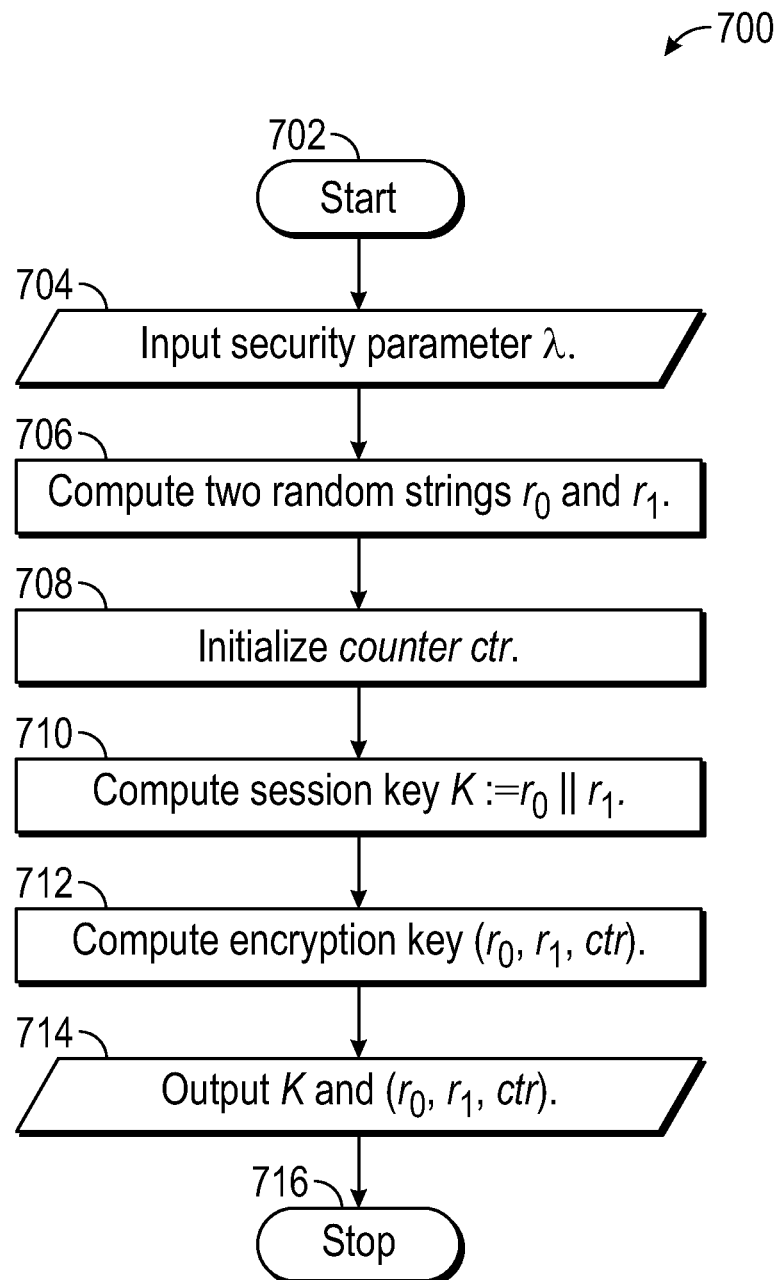
FIG. 7 is a flow chart illustrating an exemplary method of key generation performed at a sending device, consistent with some embodiments.

FIG. 7 and some subsequent drawings illustrate exemplary methods that are capable of being performed in one or more of the physical environments (e.g. chiplets) illustrated in other drawings. However, the exemplary methods are not limited to the disclosed physical environments and may be performed in a variety of other physical environments. In addition, although the exemplary methods have steps or operations that are illustrated as being performed in certain orders or sequences, it should be understood that at least some of the illustrated steps and orders may be performed in different orders or sequences or may be performed concurrently. Thus, the sequences of operations shown are not intended to be limiting unless the context requires otherwise. Additionally, not all embodiments require all steps or operations, as will be apparent to those of skill in the art, some steps or operations are optional in some embodiments. Further, the designation of one or more operations or elements as optional should not be construed as implying that operations or elements not so designated are required.

Referencing FIG. 7, a method 700 of initializing a sender (e.g. TX circuit 515) for encryption is illustrated. The input is a security parameter λ (lambda). The output is a session key (K), and the encryption key (r0, r1, ctr) comprising of the random or pseudo-random numbers r0 and r1 and a counter (ctr). Method 700 will be referred to at times as the Sender's Key Generation Function ("K_Gen_Sender").

After a start operation 702, control proceeds to operation 704 which inputs the security parameter λ. The λ controls various security matters such as the size of b and w from FIG. 6A above (b bits 603 and w bits 613A, 613B). In addition to controlling message block size, the value b in some embodiments, also controls a nonce size. The nonce is important for security and is discussed further below.

Other matters set dependent on λ may include the size of the counter ctr (setting parameter len_ctr), the maximum size of a message (setting parameter max_mess_size), the maximum number of message blocks in a session (setting parameter max_blk_cnt), the refresh rate for the session keys (setting parameter ref_rate). Other start-up items include initializing the true random number generator TRNG 328, initializing the pseudo-random number generators, such as PRNG 322, and initializing the counter ctr (discussed below).

Control proceeds to operation 706 which computes random numbers $r_0$ and $r_1$. In some embodiments, operation 706 is performed with a TRNG 328. The number of bits (e.g. the length) of r0 and r1 is a security setting controlled by 2. Having been generated by, for example, TRNG 328, r0 and r1 are true random numbers. In some alternative embodiments, r0 and r1 are generated with a pseudo-random number generator, such as for example PRNG 322.

Control proceeds to operation 708 which initializes counter ctr. In some embodiments, counter ctr is initialized at zero. In other embodiments, the counter ctr can be initialized to a random number that is dependent on one or more of r0 or r1, generated using PRNG 322, or other mathematical function.

Control proceeds to operation 710 which computes a session key, designated K. In some embodiments, K=r0||r1, that is, r0 concatenated with r1. After this, in operation 712, the Control proceeds to compute the encryption key, designated (r0, r1, ctr), consisting of random or pseudo-random numbers r0 and r1 and the counter ctr. And in operation 714, the following are output: (1) the session key K, and (2) the encryption key (r0, r1, ctr) consisting of r0, r1 and counter ctr. Operation 716 is a stop operation.

Figure 8:
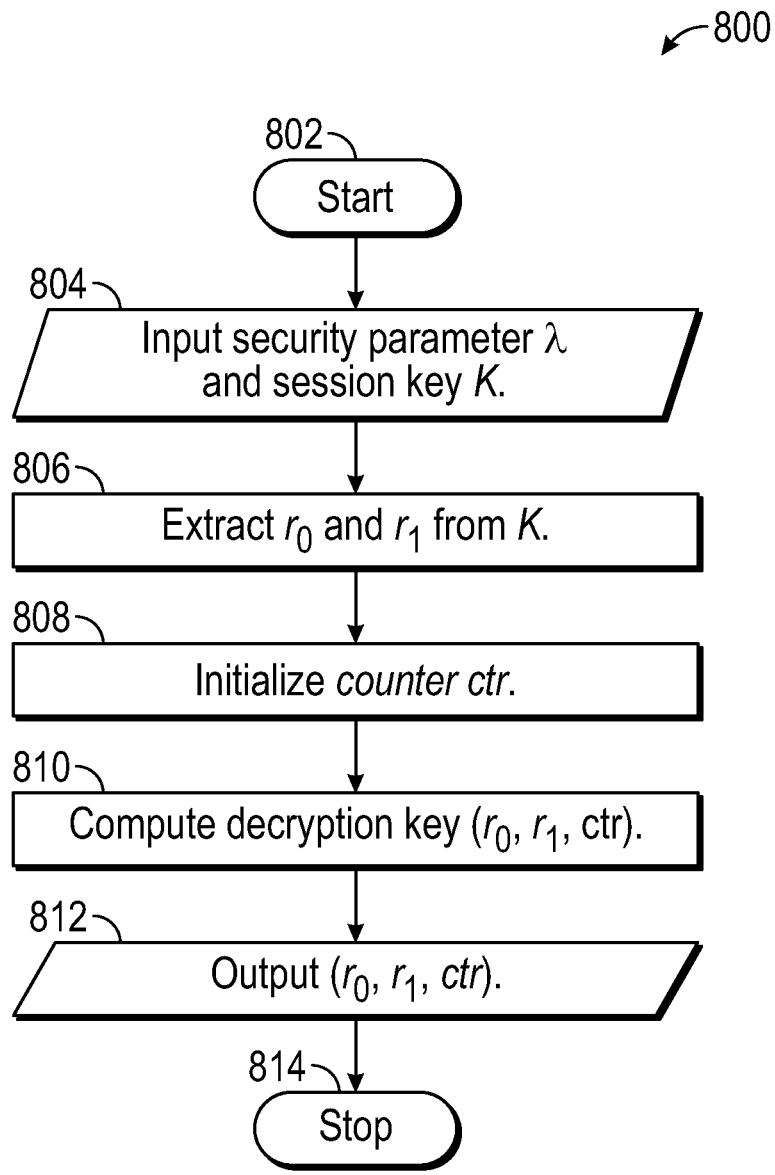
FIG. 8 is a flow chart illustrating an exemplary method of key generation performed at a receiving device, consistent with some embodiments.

Referencing FIG. 8, a method 800 of initializing a receiver (e.g. RX circuit 528) for decryption is illustrated. The input is the security parameter λ and the session key K computed in method 700. The output is the decryption key (r0, r1, ctr) comprising of r0, r1, and the counter ctr. Method 800 will be referred to at times as the Receiver's Key Generation Function ("K_Gen_Receiver").

After start operation 802, control moves to operation 804 which inputs the security parameter λ and session key K. The session key, K was computed in method 700 discussed above. The discussion of λ above regarding method 700 is fully applicable.

Control moves to operation 806 which extracts random or pseudo-random numbers r0 and r1 from K. The computation of r0 and r1 and how they are concatenated to form K is all discussed above relative to method 700.

Control moves to operation 808 which initializes a counter ctr. In some embodiments, ctr is initialized to zero. Some other methods of computation of ctr are discussed above relative to method 700.

After this, in operation 810, the control proceeds to compute the decryption key, designated (r0, r1, ctr), consisting of r0 and r1 and the counter ctr.

Control moves to operation 812 which outputs the decryption key (r0, r1, ctr). Control then moves to stop operation 814.

In the methods described below with reference to FIGS. 9 thru 16, some embodiments use encryption and decryption with cipher-block-chaining (CBC) and some other embodiments use counter mode. In CBC, the encryption of some blocks is performed at least partly dependent on a previous blocks ciphertext. For example, to encrypt a second block, the ciphertext generated for the first block is used. In counter mode the decryption of a second block does not depend on the ciphertext generated for the first block. That is, in counter mode each message block is encrypted independently of any other message block. CBC mode and counter mode have their advantages and disadvantages. A comparison of CBC and counter mode yields the following:

a. Parallel versus sequential encryption: CBC mode requires that encryption be performed sequentially, block-by-block. In contrast counter mode allows for encryption to be performed in parallel. Decryption may be performed in parallel regardless of CBC versus counter mode.

b. Error propagation: For CBC mode, a one-bit error in a ciphertext block affects two ciphertext blocks: the current and the following ciphertext blocks. In counter mode, a one-bit error in a ciphertext block affects that one block only.

c. Decryption with incorrect Nonce: In CBC mode, an error in the Nonce affects only the decryption of the first ciphertext block. That is, the decryption of all except the first ciphertext block is dependent only on the ciphertext received. In counter mode an incorrect nonce affects the decryption of all ciphertext blocks because the decryption of all ciphertext blocks is dependent on the Nonce.

d. Applications: CBC mode is recommended for lossless communications, such as for example emails, file sharing, and similar communications. Counter mode is recommended for lossy communications such as for example video conference, radio transmission, Bluetooth® (wireless) speakers, and other similar communications.

Figure 9:
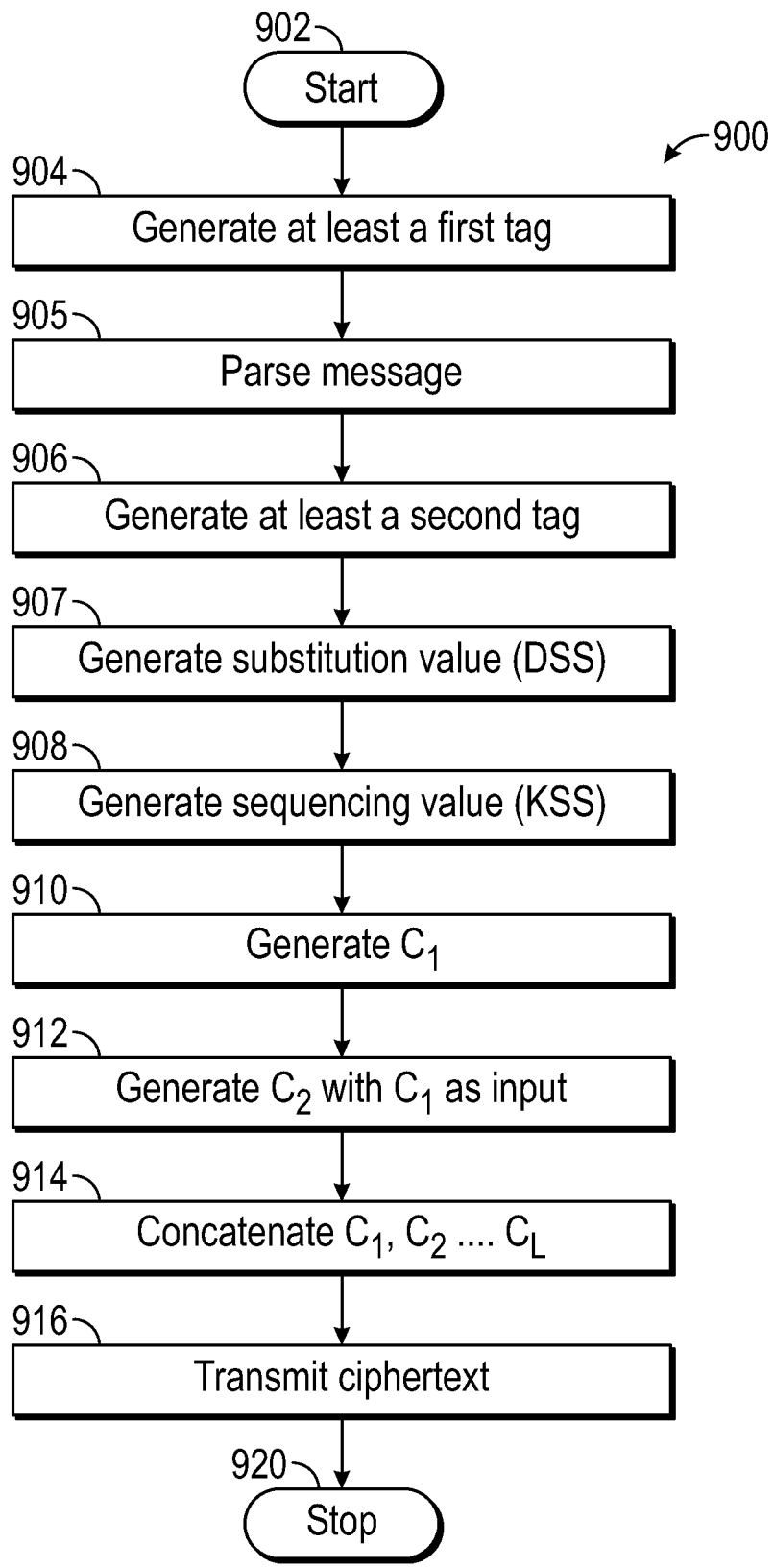
FIG. 9 is a flow chart illustrating an exemplary method of PRNG-based encryption using cipher block chaining (CBC) mode, consistent with some embodiments.

Referencing FIG. 9, a method 900 includes encrypting a message with PRNG-based encryption using CBC mode. In discussing method 900, it is assumed that both of methods 700 and 800 have been performed. That is, it is assumed that method 900 has access to r0, r1, and ctr. In some embodiments, method 900 is performed with a first chiplet (e.g. chiplet 305A of FIG. 3).

After a start operation 902, in some embodiments, one or more operations optionally generate at least one tag that is associated with the message. For example, operation 904 optionally computes at least a first tag. The first chiplet may generate the first tag based at least in part on at least one of associated data (for example metadata associated with the message) or a message block. That is, the first tag could be computed based at least partly on the associated data, based at least partly on a message block (e.g. in some embodiments a first message block), or both. In some embodiments, first chiplet generates the first tag based at least in part on the associated data, including at least computing the tag at least in part via an execution of a pseudo-random number generator utilizing a seed that is based at least in part on one or more portions of the associated data. In some embodiments, the first chiplet may generate at least the first tag based at least in part on at least one of the associated data, a nonce, or a message block. In some embodiments, the first tag is encrypted with the message and then utilized during decryption for verifying the decryption.

In some further embodiments, the first tag is incorporated into the one or more ordered message blocks to be encrypted. For example, the first tag is concatenated with the message and then in operation 905 below the concatenation of the first tag and the message is parsed to obtain one or more ordered message blocks, with the one or more ordered message blocks including the tag in one or more blocks. In some further embodiments, a given message block (e.g. message block 605A) is or includes at least part of the first tag.

Control moves to operation 905 which parses the message. In some embodiments the first chiplet parses a message, such as for example, message 601, into one or more ordered message blocks, such as for example ordered message blocks 605A, 605B, 605C, and 605D. The one or more ordered message blocks are associated with one or more index values, such as for example index values 606A-606D. A given first message block (such as for example message block 605A) and a given second message block (such as for example message block 605B) are associated respectively with a first index value (such as for example index value 1 (606A)) and a second index value (such as for example index value 2 (606B)). The first index value and the second index value are indicative of respective positions of the first message and the second message block among the one or more ordered message blocks. For example, the index value 1 and the index value 2 are indicative, respectively, of the positions of message block 605A and of message block 605B within the ordered message blocks 605A-605D.

As discussed above, in some embodiments, one or more operations optionally generate at least one tag that is associated with the message. For example, operation 906 generates at least a second tag. In some embodiments, the first chiplet generates the second tag based at least in part on a message block and generating of the substitution value for the message block includes generating the second tag. In these embodiments the second tag is generated as an intermediate value between the message block and the corresponding substitution value. As discussed above, in some embodiments method 900 includes operation 904, operation, 906, both operation 904 and operation 906, or neither operation 904 nor operation 906.

Control moves to operation 907 which generates a substitution value, such as for example DSS 607. In some embodiments the first chiplet generates a substitution value at least in part by executing a pseudo random number generator (such as for example PRNG 322) using a seed (such as for example seed 423). In some embodiments seed 423 is computed based on at least (i) a first random or pseudo-random number (such as for example r0) and at least (ii) one or more numerical values (such as for example numerical bits 0011 of message block 605A) associated with the first message block (such as for example message block 605A). In some particular embodiments, the random or pseudo-random number and the one or more numerical values are concatenated to form the seed. In some particular embodiments, the seed is computed based at least on (i) the first random or pseudo-random number, (ii) one or more numerical values associated with the first message block XOR'd with a number derived at least in part from a nonce value. In some particular embodiments the seed is computed based at least on (i) the random or pseudo-random number and (ii) the output of an XOR operation in which the operands are the one or more numerical values associated with the first message block and a number derived at least in part from a nonce value (see for example nonce 336A).

Control moves to operation 908 which generates a sequencing value, such as for example KSS 609. In some embodiments the first chiplet generates the sequencing value at least in part by executing a pseudo random number generator (such as for example PRNG 322) using a seed (such as for example seed 423). In some embodiments, the seed is computed based at least in part on (i) a second random or pseudo-random number (such as for example r1) and at least (ii) one or more numerical values associated with the first index value (such as for example index value 1 associated with message block 605A). In some particular embodiments, the first chiplet computes the seed by concatenating the second random or pseudo-random number with the index value. In some particular embodiments, the first chiplet computes the seed value based on at least (i) the second random or pseudo-random number (e.g. r1) and (ii) a sum of the index value for the first message block added with a counter value (e.g. counter value 340A). In some particular embodiments, the first chiplet computes the seed value at least in part by concatenating (i) the second random or pseudo-random number and (ii) a sum of the index value for the first message block added with a counter value (such as for example counter value 340A).

Control moves to operation 910 which generates a first ciphertext block $C_1$ (such as for example ciphertext block 611A). In some embodiments the first chiplet generates a first ciphertext block for the first message block (such as for example message block 605A) with one or more computations that include at least an XOR operation with the substitution value and the sequencing value. In some particular embodiments, the first chiplet generates the first ciphertext block for the first message block at least in part with an XOR operation with operands that include at least the substitution value and the sequencing value.

Control moves to operation 912 which generates a second ciphertext block C2 (such as for example ciphertext block 611B) with previous ciphertext block C1 as at least a portion of the input. In some embodiments, the first chiplet generates the second ciphertext block at least in part with one or more computations performed at least in part with the first ciphertext block. In some embodiments, operation 912 includes at least one of: (1) generating a second substitution value (e.g. a second DSS) at least in part by executing a first pseudo-random number generator using a seed value that is computed based at least in part on (i) the first random or pseudo-random number (for example r0) and (ii) one or more numerical values associated with the second message block (for example, message block 605B) XOR'd with a number derived at least in part from the first ciphertext block (for example ciphertext block 611A); (2) generating a second sequencing value (for example, a second KSS) at least in part by executing a second pseudo-random number generator using a seed value that is computed based at least in part on (i) the second random or pseudo-random number (for example r1) and (ii) a sum of the index value for the second message block (for example index 606B) added with a counter value (for example counter value 304A); or (3) generating the second ciphertext block for the second message block at least in part with an XOR operation with operands that include at least the second substitution value and the second sequencing value. The above operations may be applied to generate subsequent message blocks to eventually generate a complete sequence of ciphertext blocks C1, C2, . . . CL, where L is the number of message blocks to be encrypted.

Control moves to operation 914 of concatenating the ciphertext blocks to form a ciphertext (such as for example ciphertext 629). In some embodiments the first chiplet performs operation 914 by concatenating at least the first ciphertext block and the second ciphertext block. In some embodiments in which ciphertext blocks C1, C2, . . . CL have been generated, these are all concatenated to form the ciphertext.

Control then moves to operation 916 of transmitting the ciphertext. In some embodiments, first chiplet performs operation 916 by transmitting at least the ciphertext to a second chiplet. Control then moves to stop operation 920.

The above method 900 may include additional or optional operations. For example, in some embodiments method 900 further includes at least one of (1) generating the at least the first random or pseudo-random number (e.g. r0) and the second random or pseudo-random number (r1) and (2) concatenating the first random or pseudo-random number and the second random or pseudo-random number to form a session key K. In these embodiments operation 918 further includes at least transmitting at least the session key K to the second chiplet with at least the ciphertext. In embodiments in which a session key K is generated, method 900 may optionally further include further encrypting another message, including at least determining whether to renew the session key based at least in part on one or more counter values. For example, a counter value may be used to keep track of the number of message blocks that have been encrypted. The counter value may then be compared to a predetermined maximum value to determine if the session key should be renewed (for example, computing new values for r0 and r1).

Figure 10:
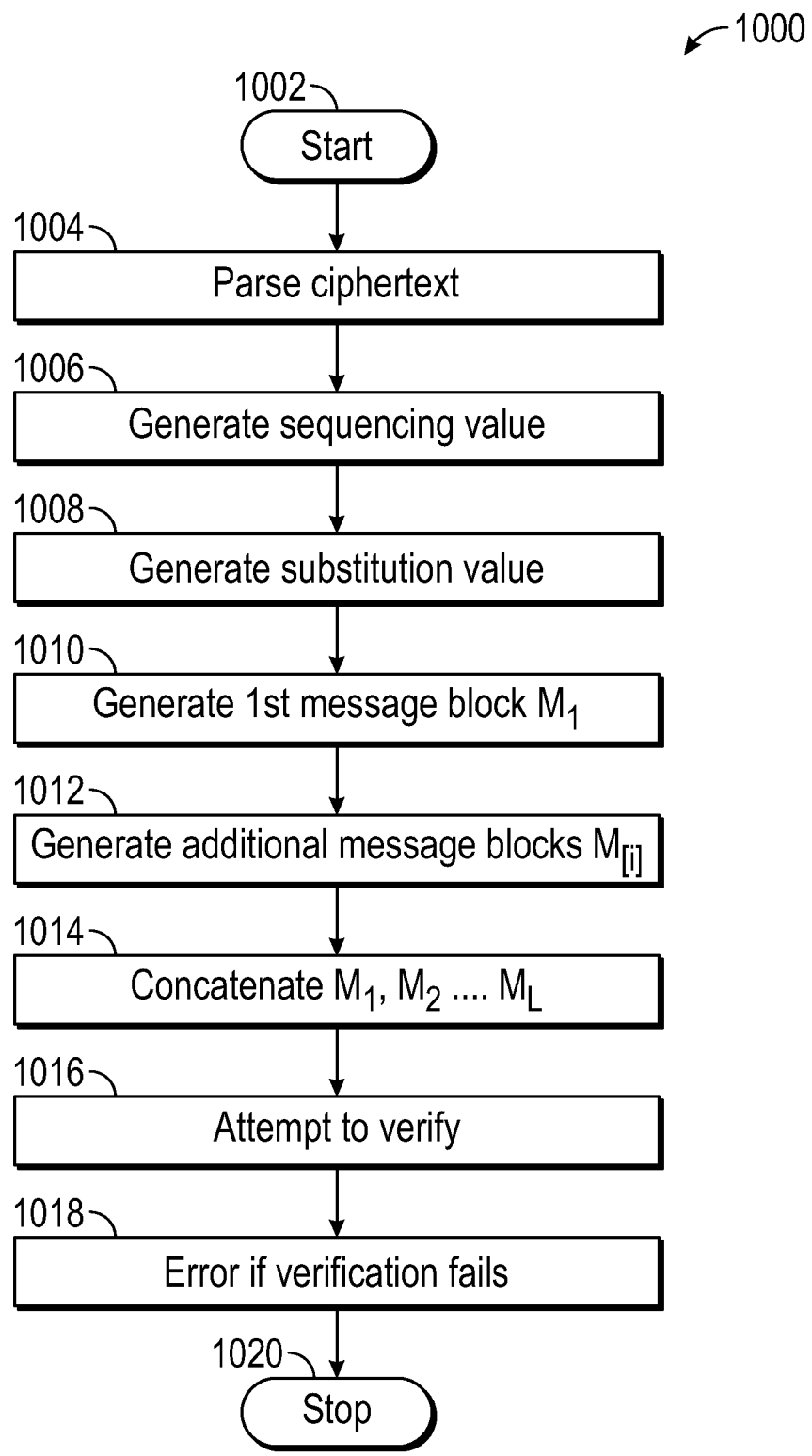
FIG. 10 is a flow chart illustrating an exemplary method of PRNG-based decryption using CBC mode, consistent with some embodiments.

Referencing FIG. 10, a method 1000 of decryption includes PRNG-based decryption using cipher-block chaining. Method 1000 assumes a ciphertext, such as from method 900, has been received. The method could be performed with a second chiplet that receives the ciphertext from a first chiplet. Method 1000 assumes that method 900 has been performed.

After a start operation 1002, control moves to operation 1004 which parses a ciphertext, such as for example ciphertext 629. In some embodiments the second chiplet performs operation 1004 by at least parsing at least a ciphertext (for example ciphertext 629) into at least one or more ordered ciphertext blocks (for example, parsing ciphertext 629 back into ordered ciphertext blocks 611A-611D) that are associated with one or more index values. For example, a first ciphertext block and a second ciphertext block of the one or more ordered ciphertext blocks may be associated respectively with first and second index values of the one or more index values. And the first and second index values are indicative of respective positions of the first ciphertext block and the second ciphertext block among the one or more ordered ciphertext blocks.

Control moves to operation 1006 which generates a sequencing value, such as for example KSS 609. In some embodiments second chiplet performs operation 1006 by at least calculating a sequencing value at least in part by executing a pseudo-random number generator (for example PRNG 322) seeded with a seed value (for example seed 423) that is calculated at least in part with a random or pseudo-random random number (for example r1), the first index value (for example index value 612A), and a counter value (for example 340A). In some particular embodiments the second chiplet generates the sequencing value at least in part by executing a first pseudo-random number generator seeded with a seed value that includes at least a concatenation of (i) the first random or pseudo-random number with (ii) a sum of the first seed value and a counter value.

Control moves to operation 1008 which generates a substitution value, such as for example DSS 607. In some embodiments the second chiplet performs operation 1008 by at least calculating a substitution value with at least an XOR operation with operands of at least the first ciphertext block (for example ciphertext block 611A) and the sequencing value (for example KSS 609). In some particular the XOR operation at least partly reverses an earlier XOR operation performed at a first chiplet (for example operation 910 of method 900) in which the operands were the substitution value and the sequencing value and the output was the first ciphertext block.

Control moves to operation 1010 which generates a first message block M1, for example message block 605A. In some embodiments the second chiplet performs operation 1010 by at least calculating a first message block corresponding to the first ciphertext block by performing at least an XOR operation with operands derived at least in part from the substitution value.

Control moves to operation 1012 of generating one or more additional message blocks. In some embodiments, to generate each given additional message block that is associated with a given ciphertext block, operations 1006 thru 1010 are repeated with respect to the given ciphertext block to generate the given additional message block.

Control moves to operation 1014 of concatenating at least the first message block and the one or more additional message blocks to obtain a message.

Control moves to operation 1016 of attempting to verify at least one tag. In some embodiments, a second chiplet receives associated data from a first chiplet, calculates a calculated tag at least in part from the associated data, extracts the tag from at least one of the message or the substitution value. The second chiplet then attempts to verify the extracted tag by at least determining if the extracted tag is equal to the calculated tag. The second chiplet issues an error if the attempted verification fails. In some embodiments a second chiplet extracts the at least one tag from the substitution value and attempts to verify the at least one tag by comparison to a calculated tag. For example, in some embodiments, the first chiplet generates a calculated tag based at least in part on an output of a pseudo-random number generator seeded with at least one of the message block or a value derived from a nonce value or a value derived from the previous ciphertext block. Meanwhile an extracted tag is extracted from a substitution value. Then the second chiplet attempts to verify the at least one tag by at least determining if the extracted tag is equal to the calculated tag. The second chiplet issues an error if the attempted verification fails. In some embodiments this this further includes aborting further decryption of the ciphertext if the attempted verification fails.

Control moves to operation 1018 of issuing an error if verification fails. For example, in some embodiments, the second chiplet issues an error and aborts further decryption of the ciphertext if the attempted verification fails. Control then moves to stop operation 1020.

Figure 11:
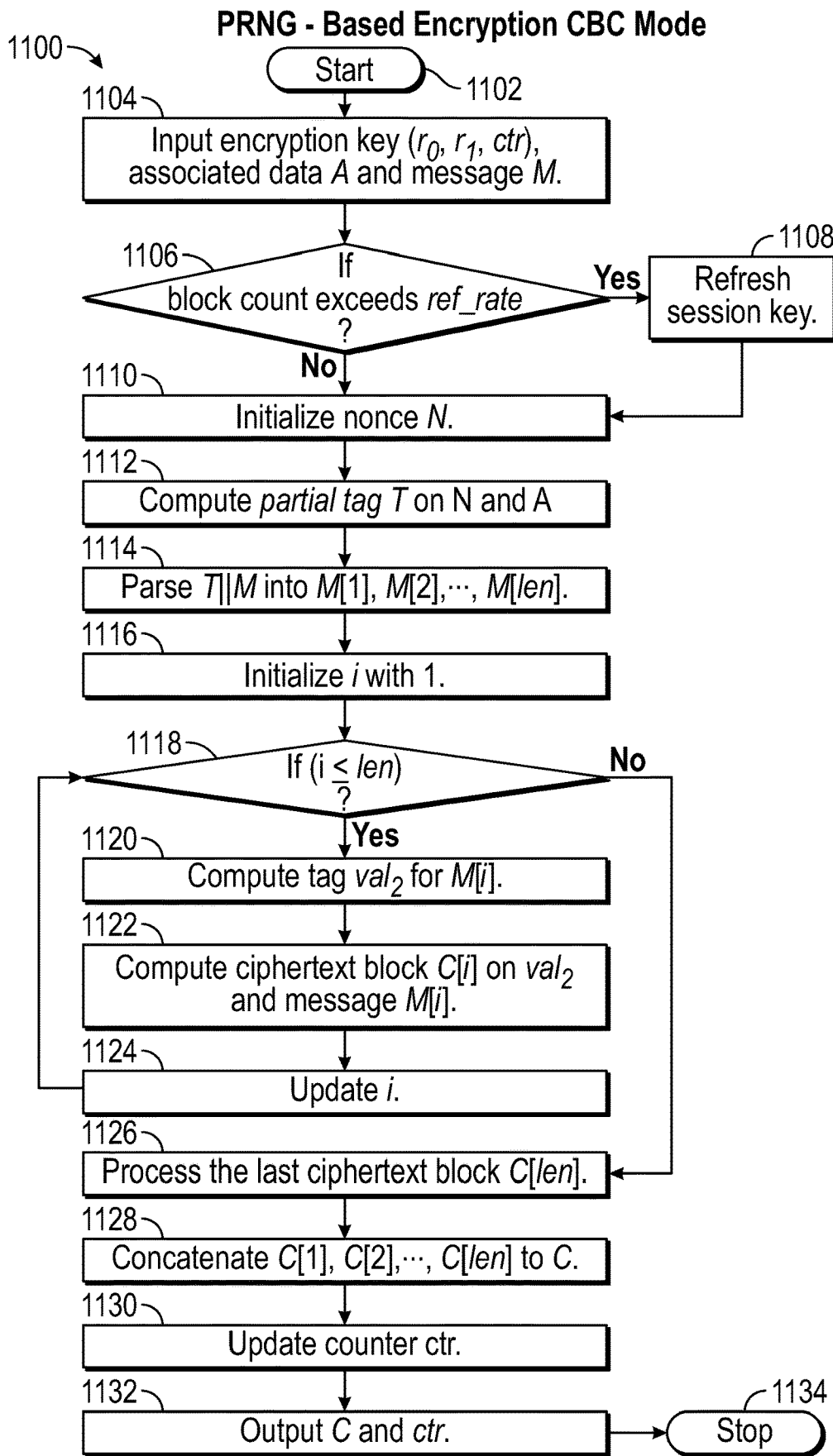
FIG. 11 is a flow chart illustrating an exemplary method of PRNG-based encryption using CBC mode, showing tag generation, consistent with some embodiments.

A PRNG-based method 1100 of encryption using cipher block chaining is now discussed relative to FIG. 11. The input for method 1100 is the encryption key (r0, r1, ctr), consisting of a first random or pseudo-random number r0, a second random or pseudo-random number r1, and the counter ctr. Other inputs include some associated data A and a message M to encrypt. The output is a ciphertext and an updated counter ctr. This method may be performed in a first chiplet (sender) that is in communication a second chiplet (receiver).

The associated data A refers to data that is not encrypted but that is incorporated into a partial tag. The associated data A and its use is discussed further below.

The following discussion of FIG. 11 references an encryption algorithm A. Encryption algorithm A embodies a particular embodiment within the scope of method 1100. Those with skill in the art, once appraised of the principles discussed herein, will be aware of more alternatives to those stated below.

ENCRYPTION ALGORITHM A
Enc(($r_0$, $r_1$), ctr), A, M)

1. If (ctr + len + 2 ≥ ref_rate) *
    a. Refresh Session Key (Execute Key Exchange Protocol.)
2. Compute nonce as N := PRNG ($r_1$ || ctr, b) †.
3. Compute partial tag on associated data A as:
    a. Parse A[1] || A[2] || ⋯ || A[len'] := A.
    b. Assign T := N.
    c. For i := 1,2, ⋯ , len'
        i. Compute T := PRNG (T || A[i], b).
4. Parse M[1] || M [2] || ⋯ || M [len] := T || M♦.
5. Initialize the temporary variable, temp := N || $0^{w-b}$.
6. For i := 1,2, ⋯ , len
    a. Parse $t_1$ || $t_2$ || ⋯ || $t_m$ := temp.
    b. Compute $val_1$ := $t_1 \oplus t_2 \oplus \cdots \oplus t_m$♦.

-continued

ENCRYPTION ALGORITHM A
Enc((r_0, r_1), ctr), A, M)

c. Compute val$_2$ := PRNG (r$_0$ || (M[i] ⊕ val$_1$), w - b).
 d. For j := 0,1, ⋯ , b - 1
  i. Compute val$_2$'[bit$_j$] := val$_2$[bit$_{(m-1)j}$] ⊕ val$_2$[bit$_{(m-1)j+1}$] ⊕ ⋯ ⊕ val$_2$[bit$_{(m-1)j+(m-2)}$]
 e. Compute val$_2$" := val$_2$'[bit$_0$] || val$_2$'[bit$_1$] ⋯ || val$_2$'[bit$_{b-1}$].
 f. Compute val$_3$ := val$_2$" ⊕ M[i].
 g. Parse val$_2$[1] || val$_2$[2] || ⋯ || val$_2$[b] := val$_2$.
 h. Parse val$_3$[1] || val$_3$[2] || ⋯ || val$_3$[b] := val$_3$.
 i. Compute DSS := val$_2$[1] || val$_3$[1] || val$_2$[2] || val$_3$[2] || ⋯ || val$_2$[b] || val$_3$[b].
 j. Compute KSS := PRNG(r$_1$ || (ctr + i), w).
 k. Compute C[i] := temp := DSS ⊕ KSS.
7. Compute C[len] := C[len] ⊕ PRNG(r$_1$ || (ctr + len + 1), w).
8. Compute ciphertext C := C[1] || C[2] || ⋯ || C[len].
9. Update counter ctr := ctr + len + 2.
10. Return C and ctr.

*: If counter is initialized as ctr := PRNG(r$_1$ || 0, b), then, depending on the implementation, the condition will be:
 a. (blk_ctr + len + 2 ≥ ref_rate), or
 b. (ctr + len + 2 - PRNG (r$_1$ || 0, b) ≥ ref_rate).
†: Nonce can also be randomized as:
 a. Compute rb := N & 0x01. (For the first value, N := PRNG(r$_0$, b))
 b. Compute idx := idx + 1. (For the first value, idx := 0)
 c. Compute N := PRNG (r$_{rb}$ || idx, b).
♦: The positions of T and M can be interchanged.
♣: For some Integer s, variable val$_1$ can also be computed using some operation□ as:
val$_1$ := t$_1$ ⊕ (t$_2$□ s) ⊕ ⋯ ⊕ (t$_m$□ s(m - 1))

Again referencing FIG. 11, after a start operation 1102, control moves to operation 1104 which inputs the encryption key (r0, r1, ctr), associated data A, and a message M to be encrypted.

Control moves to operation 1106 which determines if a block count exceeds a parameter ref_rate. Ref_rate is a refresh rate for session keys. The block count is ctr+len+2. In the embodiments of encryption algorithm A, it is determined if this block count (ctr+len+2) is greater than or equal to the ref_rate. In the block count, len is the number of blocks to be encrypted and the number 2 is related to the computing of the nonce in process block 1110 and of a last block of ciphertext in process block 1126, discussed below.

If the block count does not exceed the ref_rate, the control moves to operation 1110, discussed below.

If the block count does exceed the ref_rate, then control moves to operation 1108 which refreshes the session key K. In some embodiments, this is performed by executing a key exchange protocol that includes at least:
 a. A first chiplet (sender) executes the Sender's Key Generation Function (method 700). This function, is described above relative to FIG. 7. As noted above, the input is the security parameter λ and the outputs are a session key K and an encryption key (r0, r1, ctr).
 b. The first chiplet sends the session key K to a second chiplet. In some embodiments, this step includes at least:
  i. A public key of the second chiplet is used to encrypt session key K.
  ii. The encrypted session key KEnc is transmitted to the second chiplet.
 c. The second chiplet (receiver) uses its private key to decrypt the encrypted session key KEnc and thereby obtain the session key K.
 d. The second chiplet executes the Receiver's Key Generation Function (method 800). This function is described above relative to FIG. 8. As noted above, the inputs are the session key K and the security parameter λ. The output is the decryption key (r0, r1, ctr).

It is important to regularly execute the key exchange protocol because XOR operations produce identical output for a large set of input values. For example: 0⊕3=3, 1⊕2=3, 4⊕7=3, 5⊕6=3 and so on. This is called collision. The probability of collision increases with an increase in the number of input sets. For an XOR with b-bit inputs, after $2^{b/2}$ input sets, the probability of collision becomes significant. To avoid collision, the r0 and r1 must be modified. Therefore, after a specified number of encryptions of message blocks, as defined by the parameter ref_rate, the session key is refreshed by invoking the key exchange protocol. The value of ref_rate, in some embodiments, is less than $2^{b/2}$. In some further embodiments, ref_rate is $2^{(b/2-1)}$.

Control moves to operation 1110 which initializes a nonce N. In some embodiments, the value b, set with security parameter λ, determines the length of nonce N. Generally, a longer length of nonce N is associated with increased security relative to a shorter length of Nonce N. Consistent with some embodiments, in encryption Algorithm A, the initialization of nonce N may be performed by setting Nonce N equal to PRNG(r1∥ctr, b), where r1∥ctr is the seed and b is a parameter setting the length in bits of the output of PRNG.

Nonce N has a high degree of randomness because under Encryption Algorithm A it is initialized as PRNG(r1∥ctr, b) and in some embodiments r1 is computed with TRNG. In those embodiments, r1 is a true random number. Nonce N therefore has a high degree of randomness. This high degree of randomness of nonce N helps prevent nonce forgery and nonce-reuse attacks.

Control moves to operation 1112 which computes a partial tag T on N and A, where N is nonce N and A is associated data. T is a partial tag because it is not computed on the message M to be encrypted. The specific steps of this particular algorithm are shown in lines 3a-3c of Encryption Algorithm A. After the tag T is computed, it is concatenated with the message M to be encrypted, that is T∥M.

Control moves to operation 1114 which parses T∥M into message blocks, such as M[1], M[2], M[3], ..., M[len], where len is the total number of blocks. In some embodiments, M[1] will contain tag T. In other embodiments tag T may be contained in others of the message blocks. The size of the blocks in bits is governed by the value b, discussed above.

Control moves to operation 1116 which initializes a counter variable i to 1. In some embodiments, a temp variable is initialized to the value of nonce N concatenated with a sufficient number of zero's to extend the length of N to w bits. That is, temp is initialized to be w bits long.

A loop is executed that includes the following operations:
 a. Operation 1118 determines if the variable i (the index for the current block) is less than or equal to len, the number of message blocks to be encrypted. If i is greater than len, then the loop is exited and control moves to operation 1126 below.
 b. Operation 1120 computes val2 for M[i]. Val2 functions as a tag which will be utilized in decryption to verify the ciphertext block. Val2 is also an input to the computation of the ciphertext (below). The computation of val2 includes:
  i. Parse t1∥t2∥ . . . ∥tm:=temp, where, in some embodiments, m is the number of b-bit blocks in temp and computed as "m=w/b". That is, temp is parsed into w/b blocks of length b bits each. It will be recalled that temp was initialized as w bits in length. This value of temp is for the first time through the loop. As indicated below, for subsequent loops, temp is set to the value of C[i]. Thus, C[i] will be temp for the generation of $C_{[i+1]}$. This keeps some continuity between blocks of the ciphertext C.

ii. Compute $val_1:=t1 \oplus t2 \oplus \ldots \oplus tm$, where $\oplus$ is the symbol for a bitwise XOR operation. This equation XOR's the w/b blocks of b bits of temp together and stores the result in the variable val1.

iii. Compute $val2:=PRNG(r0\|(M[i] \oplus val_1), $ w-b). In this equation, val2 is computed to have a length w-b. Val2 is also dependent on M[i], r0, and $val_1$.

c. Operation 1122 computes ciphertext C[i] for M[i]. Referencing Encryption Algorithm A, in some specific embodiments, computing C[i] includes at least:

i. Compute a $val_2''$ which is a derived from val2, but is b bits in length. For details of this computation, reference is made to lines 6d-6e of Encryption Algorithm A.

ii. Compute $val3:=val_2'' \oplus M[i]$ (all values b bits). Subsequently, both $val_2''$ and val3 are parsed into their individual bits. For details reference is made to lines 6g-6h of Encryption Algorithm A.

iii. Compute DSS as equal to the interleaved bits of val2 and val3. That is $DSS:=val_2[1]\|val_3[1]\|val_2[2]\|val_3[2]\| \ldots \|val_2[b]\|val_3[b]$. DSS has a length of w bits.

iv. Compute $KSS:=PRNG(r1\|(ctr+i), w)$, which gives KSS a length of w bits.

v. Compute $C[i]:=temp:=DSS \oplus KSS$ (all w bits in length). This computation computes the ciphertext for block i and copies the ciphertext to temp for use in the next iteration of the loop.

d. Operation 1124 updates i incrementing by one. Control then returns to operation 1118 and the loop then repeats until in operation 1118, i is greater than len. When i is greater than len, the loop terminates and control moves to operation 1126.

Operation 1126 computes the value for the last block of ciphertext C[len]. Referencing encryption algorithm A, in some specific embodiments, computing C[len] includes at least computing $C[len]:=C[len] \oplus PRNG(r1\|(ctr+len+1), w)$. Turning to this equation and moving from the left, the last ciphertext block C[len] is equal to a mathematical expression on the right. Moving to the mathematical expression, the left subexpression C[len] is the ciphertext for the last block computed as explained regarding operation 1122. C[len] is XOR'd with the right subexpression which is the output of executing a PRNG with a seed that include r1 concatenated with a subexpression of counter ctr+len+1. The w parameter instructs that C[len] is w bits in length. This operation prevents the length-extension attacks on the cryptosystem.

Control moves to operation 1128 which calculates the ciphertext by concatenating the ciphertext blocks C[1], C[2], . . . C[len].

Control moves to operation 1130 which updates the counter ctr. Referencing encryption algorithm A, in some specific embodiments, updating ctr includes ctr:=ctr+len+2. This updates ctr by adding the number of message blocks encrypted, len. And by adding the number two, which accounts for the additional processing of the nonce in operation 1110 and the operation 1126, we ensure that no random number block is repeated.

Control then moves to operation 1132 which outputs C and ctr as the outputs of the method 1100. Control then moves to Stop operation 1134.

The above method 1100 is subject to a variety of implementations. For example, in some implementations it is desired to disable one of more of authentication or encryption. In those embodiments one of more flags may be used to enable or disable at least one of authentication or encryption.

Figure 12:
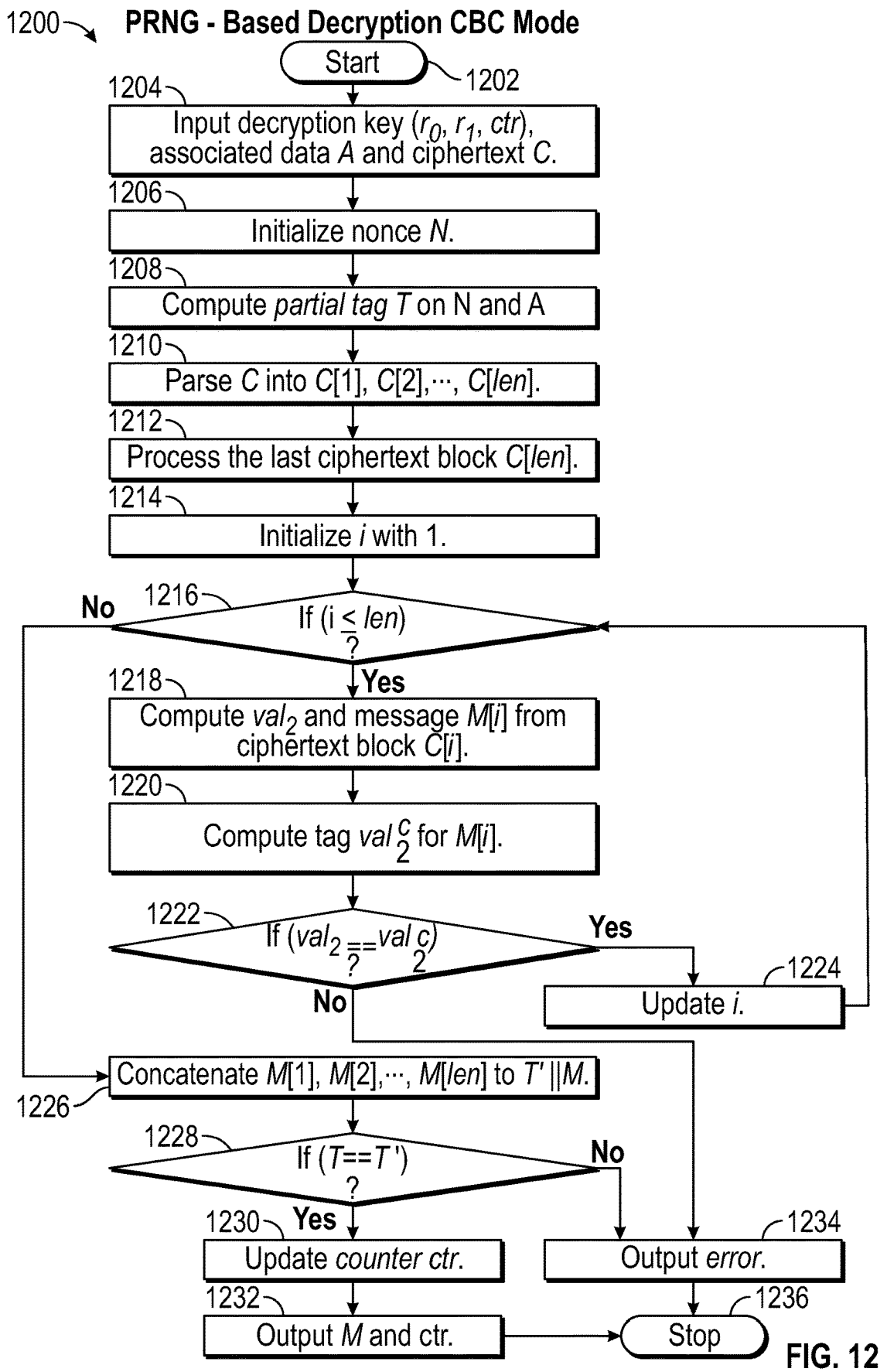
FIG. 12 is a flow chart illustrating an exemplary method of PRNG-based decryption using CBC mode, showing tag-based verification, consistent with some embodiments.

Referencing FIG. 12, decryption method 1200 decrypts ciphertext C created with method 1100. Method 1200 includes as inputs the decryption key (r0, r1, ctr), associated data A, and the ciphertext C output by method 1100. The outputs are the decrypted message M and an updated counter ctr. In discussing method 1200, it is assumed that methods 700 and 1100 have been performed at a first chiplet, that method 800 has been performed at a second chiplet and that the first chiplet has transmitted ciphertext C to the second chiplet. Decryption method 1200 is performed at the second chiplet.

The discussion of FIG. 12 references decryption algorithm B. Decryption algorithm B embodies specific embodiments within the scope of method 1200 of FIG. 12. Those with skill in the art, once appraised of the principles discussed herein, will be aware of more alternatives to those stated below.

---

DECRYPTION ALGORITHM B
Dec(($r_0$, $r_1$, ctr), A, C)

1. Compute nonce as $N := PRNG (r_1 \| ctr, b)$ †.
2. Compute partial tag on associated data A as:
   a. Parse $A[1] \| A[2] \| \cdots \| A[len'] := A$.
   b. Assign T := N.
   c. For i := 1,2, $\cdots$, len'
      i. Compute $T := PRNG (T \| A[i], b)$.
3. Parse $C[1] \| C[2] \| \cdots \| C[len] := C$.
4. Compute $C[len] := C[len] \oplus PRNG(r_1 \| (ctr + len + 1), w)$.
5. Initialize the temporary variable, temp := $N \| 0^{w-b}$.
6. For i := 1,2, $\cdots$, len
   a. Parse $t_1 \| t_2 \| \cdots \| t_m$ = temp.
   b. Compute $val_1 := t_1 \oplus t_2 \oplus \cdots \oplus t_m$ ♣.
   c. Compute temp := C[i].
   d. Compute $KSS := PRNG(r_1 \| (ctr + i), w)$.
   e. Compute $DSS := C[i] \oplus KSS$.
   f. Parse $val_2[1] \| val_3[1] \| val_2[2] \| val_3[2] \| \cdots \| val_2[b] \| val_3[b] := DSS$.
   g. Compute $val_2 := val_2[1] \| val_2[2] \| \cdots \| val_2[b]$.
   h. Compute $val_3 := val_3[1] \| val_3[2] \| \cdots \| val_3[b]$.
   i. For j := 0,1, $\cdots$, b − 1
      i. Compute $val_2'[bit_j] := val_2[bit_{(m-1)j}] \oplus val_2[bit_{(m-1)j+1}] \oplus \cdots \oplus val_2[bit_{(m-1)j+(m-2)}]$
   j. Compute $val_2'' := val_2'[bit_0] \| val_2'[bit_1] \| \cdots \| val_2'[bit_{b-1}]$.
   k. Compute $M[i] := val_2'' \oplus val_3$.
   l. Compute $val_2^c := PRNG (r_0 \| (M[i] \oplus val_1), w - b)$.
   m. If ($val_2^c \neq val_2$), then Return Error.
7. Compute message $T' \| M := M[1] \| M[2] \| \cdots \| M[len]$ ♦.
8. If (T' ≠ T), then Return Error.
9. Update counter ctr := ctr + len + 2.
10. Return M and ctr.

†: Nonce can also be randomized as:
  d. Compute rb := N & 0x01. (For the first value, N := PRNG ($r_0$, b))
  a. Compute idx := idx + 1. (For the first value, idx := 0)
  b. Compute N := PRNG ($r_{rb} \|$ idx, b).

♣: For some Integer s, variable $val_1$ can also be computed using some operation□ as:
$val_1 := t_1 \oplus (t_2^{\square} s) \oplus \cdots \oplus (t_m^{\square} s(m-1))$ ♦: The positions of T' and M can be interchanged.

---

Again referencing FIG. 12 and method 1200, after a start operation 1202, control moves to operation 1204 which receives as input the decryption key (r0, r1, ctr), associated data A, and the ciphertext C to be decrypted.

Control moves to 1206 which initializes nonce N. This operation 1206 is unchanged from operation 1110 of method 1100. Reference is made to the discussion of operation 1110.

Control moves to operation 1208 which compute a partial tag T on N and A, associated data. This operation is unchanged from operation 1112 of method 1100. Reference is made to the discussion of operation 1112.

Control moves to operation 1210 which parses C into ciphertext blocks C[1], C[2], . . . , C[len], where len is the total number of ciphertext blocks. The parameter w, discussed above, governs the size of the ciphertext blocks.

Control moves to operation 1212 which processes the last ciphertext block C[len]. In some specific embodiments, decryption Algorithm C uses the following equation C[len]:=C[len] $\oplus$ PRNG(r1||(ctr+len+1)). The same XOR operation with the same operands that was performed in operation 1126 of method 1100. Performing an XOR operation twice results in the original values as they existed before the first XOR. Thus, operation 1212 of method 1200 reverses the processing of operation 1126. The result is that C[len] is the last ciphertext block as it existed prior to the processing of operation 1126.

Control moves to operation 1214 which initializes a counter variable i to 1. In some embodiments, operation 1214 also initializes a "temp" variable. In some embodiments, temp is initialized identically as in operation 1116 of method 1100, which results in temp being w bits long. That is, temp is initialized to have a length of w bits. Reference is made to the discussion of operation 1116.

A loop is executed that includes the following operations:
a. Operation 1216 determines if the variable i is less than or equal to the parameter len, the number of ciphertext blocks to be decrypted. If i is greater than len, then the loop is exited and control moves to operation 1226 below. Otherwise, control moves to operation 1218.
b. Operation 1218 computes a value val2 and message block M[i]. Val2 functions both as a tag for verifying the decryption and as an intermediate value for computing M[i]. Referencing decryption algorithm B, in some specific embodiments, computing val2 and M[i] includes at least:
 i. Parse t1||t2|| . . . ||tm:=temp, where, in some embodiments, m is the number of b-bit blocks in temp and computed as "m=w/b". Temp is parsed into w/b blocks of length b bits each. Operation 1214 initialized temp using the value of Nonce N. For subsequent loops, step iii (below) sets temp is set to the value of C[i].
 ii. Compute $val_1$=t1$\oplus$t2$\oplus$ . . . $\oplus$tm. That is, the b-bit w/b blocks of temp are XOR'd together and the result is stored in the variable $val_1$.
 iii. Assign temp:=C[i]. temp is set to equal C[i] for second and subsequent iterations of the loop.
 iv. Compute KSS:=PRNG(r1||(ctr+i), w). That is KSS is set to the output of PRNG with PRNG seeded by r1 concatenated with the sum of ctr and i, the index of the current ciphertext block being decrypted.
 v. Compute DSS:=C[i]$\oplus$KSS. That is DSS is set to the value of the current ciphertext block C[i] XOR'd with KSS. In Encryption Algorithm A, C[i] was computed as C[i]:=DSS $\oplus$ KSS. The current computation at least partly reverses that previous computation to obtain DSS.
 vi. Extract val2 and val3 from DSS. In the embodiments of Encryption Algorithm A, DSS was computed by an alternation of the bits of val2 and val3 (See line 6i of Encryption Algorithm A). Now, in Decryption Algorithm B, the alternating bits of val2 and val3 are extracted from DSS. These are used to reconstitute val2 and val3. Below, val2 is used to verify the decryption.
 vii. $val_2$" is computed from val2. In this computation 1-bit values are utilized in a series of computations to eventually derive $val_2$". For details, reference is made to lines 6f-6j of Decryption Algorithm B.
 viii. Compute M[i]:=$val_2$"$\oplus$ val3. This computes M[i], decrypted from C[i].
c. In operation 1220, a calculated tag $val_2^c$ is computed for verification of the decryption of C[i]. $Val_2^c$ is computed as $val_2^c$:=PRNG(r0||(M[i]$\oplus val_1$), w-b). $val_2^c$ is a computed tag that is computed by PRNG with a seed that includes r0 concatenated with M[i] XOR'd with $val_1$. The length of $val_2^c$ is w-b. The computation of $val_2^c$ uses PRNG with the same seed as was used in Encryption Algorithm A (line 6c) to compute val2. Therefore the val2 extracted from DSS should match the computed $val_2^c$.
d. Operation 1222 determines whether val2 is equal to $val_2^c$. That is, tags are used to verify the decryption. If the verification fails an error is returned and method 1200 is aborted. Thus, if verification of the first block of ciphertext fails, then decryption of the ciphertext, including all the remaining blocks of ciphertext is avoided.
e. If the verification succeeds, in operation 1224, counter variable i is incremented and control returns to operation 1216.

Once the loop terminates, control moves to operation 1226, which concatenates M[1], M[2] . . . M[len] to obtain T'||M, which should be the same as T||M, which was originally computed in operations 1112 and 1208 of methods 1100 and 1200 respectively. That is, the first block M[1] is or contains a tag T'. This assumes T' was concatenated to M in position to be the first block.

As an additional verification, in operation 1228, it is determined if T' is equal to T, as computed in operation 1208. If not, operation 1234 outputs an error before control proceeds to stop operation 1236.

If T' is equal to T, then operation 1230 updates counter ctr (e.g. ctr:=ctr+len+2) and operation 1232 outputs M and ctr before control moves to stop operation 1236.

The above method 1200 is an exemplary embodiment. Various implementations are possible. For example, in another implementation, flags are provided to enable/disable authentication/verification and to enable/disable encryption.

Figure 13:
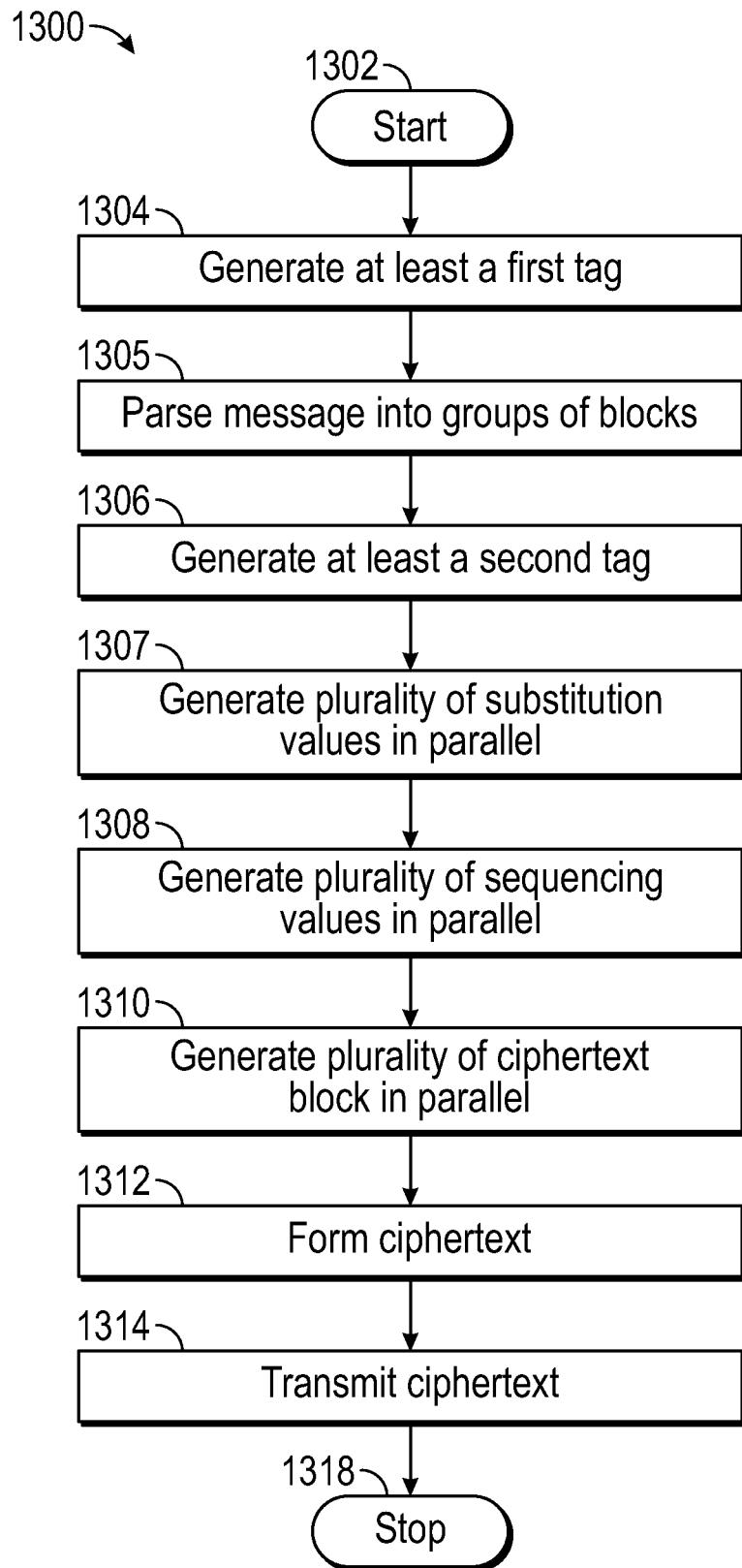
FIG. 13 is a flow chart illustrating an exemplary method of PRNG-based encryption using counter mode, performed in parallel, consistent with some embodiments.

Referencing FIG. 13, a PRNG-based method 1300 of encryption uses counter (ctr) mode in which the encryption of each message block is independent of the encryption of other message blocks. Unlike in CBC mode, there is no chaining together of blocks. For encryption in counter mode, some operations may be performed in parallel. Other operations are performed sequentially. For example, in some embodiments, at least operations 1304, 1305, 1306, 1312, and 1314 may be performed sequentially by a leader chiplet (for example by leader chiplet 205). In these embodiments, at least operations 1307, 1308, and 1310 may be performed in parallel. For example, a leader chiplet (for example leader chiplet 205) directs follow chiplets 201A—201C in performing parallel encryption operations. For example, in a simplified example, a message M may be divided into three groups: group 1 of M[1] through M[5], group 2 of M[6] through M[10], and group 3 of M[11] through M[15]. Leader chiplet 205 may lead chiplet 201A in performing parallel operations with group 1, chiplet 201B in performing parallel operations with group 2, and chiplet 201C in performing parallel operations with group 3. In some alternative embodiments, all operations are performed sequentially by a single chiplet.

After a start operation 1302, some embodiments of method 1300 optionally generate at least one tag. For example, operation 1304 optionally generates at least a first tag associated with a message M (e.g. a message to be encrypted). In some embodiments, a leader chiplet receives associated data (e.g. data associated with the message) as input and the first tag is generated at least in part from the associated data. In some particular embodiments the associated data is metadata associated with the message. In some embodiments, the leader chiplet generates the first tag at least in part with at least one of the associated data, a nonce, or a message block. In some embodiments, the first tag is encrypted with the message M and then utilized during decryption for verifying the decryption.

Control moves to operation 1305 which parses the message M into groups of blocks, such as, group 1 M[1] through M[5], group 2 M[6] through M[10], group 3 M[11] through M[15] etc. Another example of a group of message blocks is group 608 of FIG. 6A. The message blocks of group 608 are associated as shown, with respective index values 606A-606D of a group of index values 625. In some embodiments, operation 1304 is performed by a leader chiplet (such as leader chiplet 205).

Thus, in some embodiments, a leader chiplet parses at least a message M into one or more groups of ordered message blocks including at least a first group of two or more ordered message blocks, the first group of message blocks associated with at least a first group of index values indicative of one or more positions of individual message blocks of the first group of blocks relative to one another.

As discussed above, in some embodiments, one or more operations of method 1300 generate at least one tag. For example, operation 1306 of method 1300 generates at least a second tag. In some embodiments, the second tag is generated at least in part from a given message block. In some further embodiments, the second tag is generated as an intermediate value between the given message block and a given substitution value for the given message block. In some embodiments, method 1300 includes operation 1304, operation 1306, both operation 1304 and operation 1306, or neither operation 1304 nor operation 1306.

Control then moves to operation 1307 which generates a plurality of substitution values in parallel. This operation may be performed in parallel by a first group of chiplets, for example the network 203 of chiplets that includes leader chiplet 205 and follower chiplets 201A—201C. For example, in some embodiments the first group of chiplets generates in parallel two or more substitution values (for example, two or more DSS's) for the first group of ordered message blocks, a given substitution value of the two or more substitution values being generated to be associated with a given message block of the first group of ordered message blocks, the given substitution value being generated at least in part with an activation of a pseudo-random number generator (for example PRNG 322) seeded with a seed generated at least in part with (i) a first random or pseudo-random number (for example r0) and (ii) one or more numerical values associated with content of the given message block (for example bits of message block 605A). In some particular embodiments, a given seed is generated at least in part with (i) the first random or pseudo-random number, with (ii) a result of an XOR operation in which a first operand includes one or more numerical values associated with content of the given message block and in which a second operand includes a value derived at least in part from a nonce, and with (iii) a tag (e.g. tag 631). In some embodiments, operation 1306 is performed by a single chiplet sequentially generating one or more substitution values.

Control moves to operation 1308 of generating a plurality of sequencing values in parallel. For example, in some embodiments the first group of chiplets (e.g. network 203) generates, in parallel, two or more sequencing values (for example KSS's) for the first group of ordered message blocks (e.g. 608), a given sequencing value (e.g. 609) of the two or more sequencing values being generated to be associated with the given message block and being generated at least in part with an activation of a pseudo-random number generator seeded with a seed generated at least in part with (i) a second random or pseudo-random number (e.g. r1) and (ii) a given index value (e.g. 606A) that is one of the first group of index values (for example group 625) and that is associated with the given message block. In some particular embodiments, the seed is generated at least in part with (i) the second random or pseudo-random number and with (ii) a result of an XOR operation in which a first operand includes an index value associated with the given message block and in which a second operand includes a counter value. In some embodiments, operation 1308 is performed by a single chiplet sequentially generating one or more sequencing values.

Control moves to operation 1310 of generating a plurality of ciphertext blocks in parallel. For example, in some embodiments the first group of chiplets generates, in parallel, a first group of ciphertext blocks (e.g. ciphertext blocks 611A-611D) for the first group of message blocks based at least in part on two or more XOR operations, a given XOR operation of the two or more XOR operations including at least a first operand derived at least in part from the given substitution value and a second operand derived at least in part from the given sequencing value. In some embodiments, operation 1310 is performed by a single chiplet sequentially generating a one or more ciphertext blocks.

Control moves to operation 1312 of forming a ciphertext. For example, in some embodiments the a leader chiplet (e.g. chiplet 205) concatenates at least the first group of ciphertext blocks to form at least a portion of a ciphertext.

Control moves to operation 1314 of transmitting ciphertext. For example, in some embodiments the first group of chiplets transmits the at least a portion of ciphertext to a second chiplet, for example in a second group of chiplets. Control moves to stop operation 1318.

Figure 14:
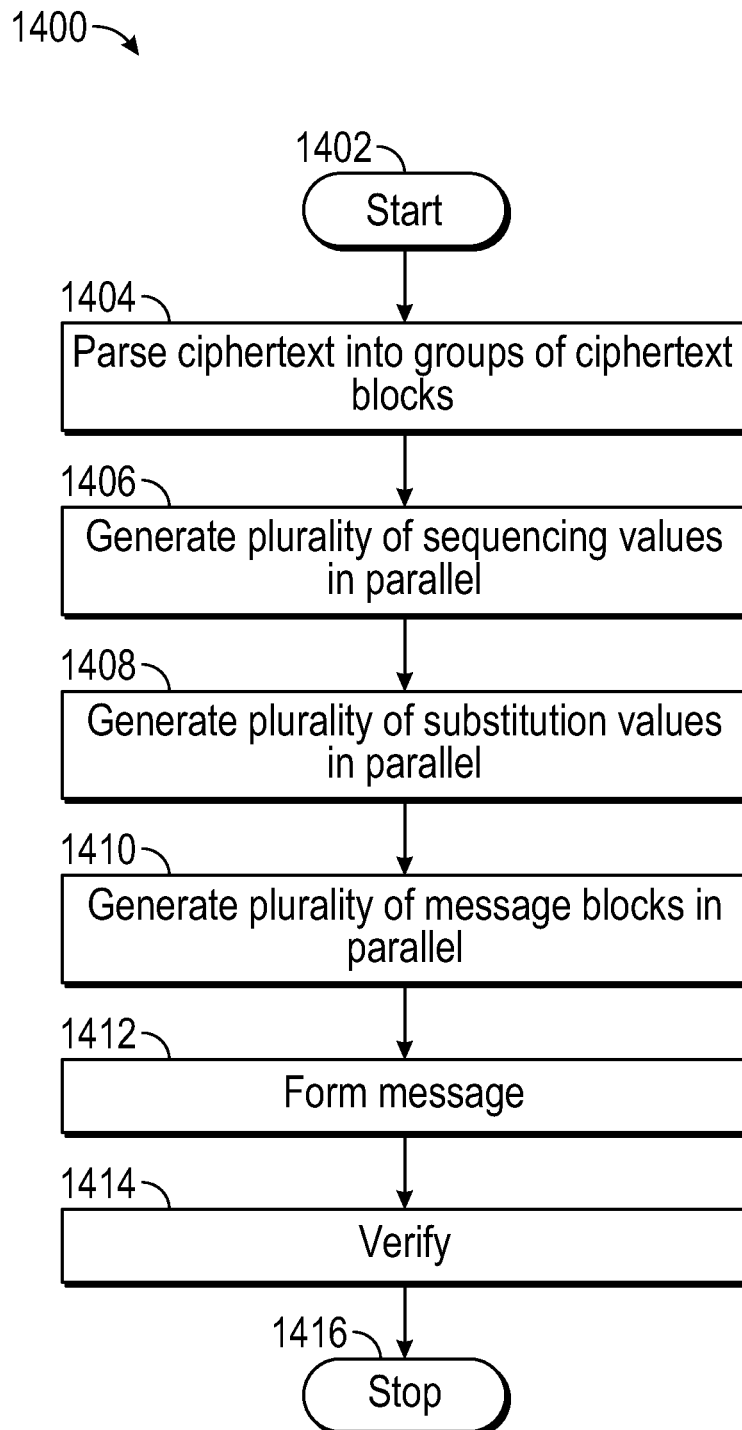
FIG. 14 is a flow chart illustrating an exemplary method of PRNG-based decryption using counter mode, performed in parallel, consistent with some embodiments.

Referencing FIG. 14, a PRNG-based method of decryption using counter mode is described. Some of the operations described may be performed in parallel by, for example, a second group of chiplets (for example, at least similar to network 203) that have received ciphertext from a first group of chiplets that have executed method 1300 of FIG. 13. In some embodiments, at least operations 1404, and 1412, are performed sequentially by a leader chiplet. In these embodiments, at least operations 1406, 1408, and 1410 are performed in parallel by follower chiplets under direction of a leader chiplet. In some alternative embodiments, all operations are performed sequentially by a single chiplet.

After a start operation 1402, control moves to operation 1404 of parsing a ciphertext into groups (for example group 610) of ciphertext blocks (for example ciphertext blocks 611A-611D). For example, a leader chiplet parses at least a ciphertext into one or more groups of ciphertext blocks including at least a first group of two or more ciphertext blocks, the first group of ciphertext blocks associated with at least a first group of index values (for example index values 612A-612D) indicative of one or more positions of individual ciphertext blocks of the first group of ciphertext blocks relative to one another. For example index value 3 (612C) is indicative of ciphertext block 611C being third from the left end of the group of ordered ciphertext blocks 611A-611D.

Control moves to operation 1406 of generating a plurality of sequencing values (for example KSS's) in parallel. For example, in some embodiments the second group of chiplets generates, in parallel, two or more sequencing values for the first group of two or more ciphertext blocks, a given sequencing value of the two or more sequencing values being generated to be associated with a given ciphertext block of the first group of two or more ciphertext blocks, the generating of the given sequencing value including at least an activation of a pseudo-random number generator seeded with a seed (for example r1) generated at least in part with (i) a random or pseudo-random number and with at least (ii) a given index value of the first group of index values (for example index values 612A—612D), the given index value being associated with the given ciphertext block. In some particular embodiments, generating the given seed at least in part with (i) the random or pseudo-random number concatenated with (ii) a sum from addition of the given index value, and the counter value. In some particular embodiments, the given seed is generated at least in part with (i) the random or pseudo-random number, (ii) the given index value, and (iii) a counter value. In some alternative embodiments, operation 1406 is performed by a single chiplet sequentially generating a one or more sequencing values.

Control moves to operation 1408 of generating a plurality of substitution values (for example KSS's) in parallel. For example, in some embodiments the second group of chiplets generates, in parallel, two or more substitution values, at least in part, with at least two or more XOR operations, a given substitution value of the two or more substitution values being generated by a given XOR operation of the two or more XOR operations being performed with a first operand of at least the given ciphertext block and a second operand of the given sequencing value. In some particular embodiments, the given XOR operation at least partly reverses an earlier XOR operation performed at a first chiplet in which the first operand was the given substitution value and the second operation was given sequencing value and in which the output of the earlier XOR operation was the given ciphertext block. In some alternative embodiments, operation 1408 is performed by a single chiplet sequentially generating a one or more substitution values.

Control moves to operation 1410 of generating a plurality of message blocks in parallel. For example, in some embodiments the second group of chiplets generates, in parallel, generating, in parallel, a first group of message blocks decrypted from the first group of cipher blocks based at least in part on the two or more substitution values. In some particular embodiments, a given message block of the first group of message blocks is generated at least in part by performing at least an XOR operation with operands derived at least in part from the given substitution value. In some alternative embodiments, operation 1410 is performed by a single chiplet sequentially generating a one or more message blocks.

Control moves to operation 1412 of forming a message. For example, in some embodiments a leader chiplet of the second group of chiplets concatenates at least the first group of message blocks to form at least a portion of a message. Control moves to optional operation 1414 of verifying before moving to stop operation 1416. In some embodiments, operation 1414 includes extracting a tag from the given substitution value (e.g. from a DSS), attempting to verify the tag by comparing the tag to a computed tag, and if the attempt to verify the tag fails, aborting the decryption of the ciphertext. In some further embodiments, operation 1414 further includes receiving associated data with the ciphertext, computing at least a partial tag on at least the associated data, and computing the computed tag based at least in part on the partial tag and on message data. Control then moves to stop operation 1416.

Figure 15:
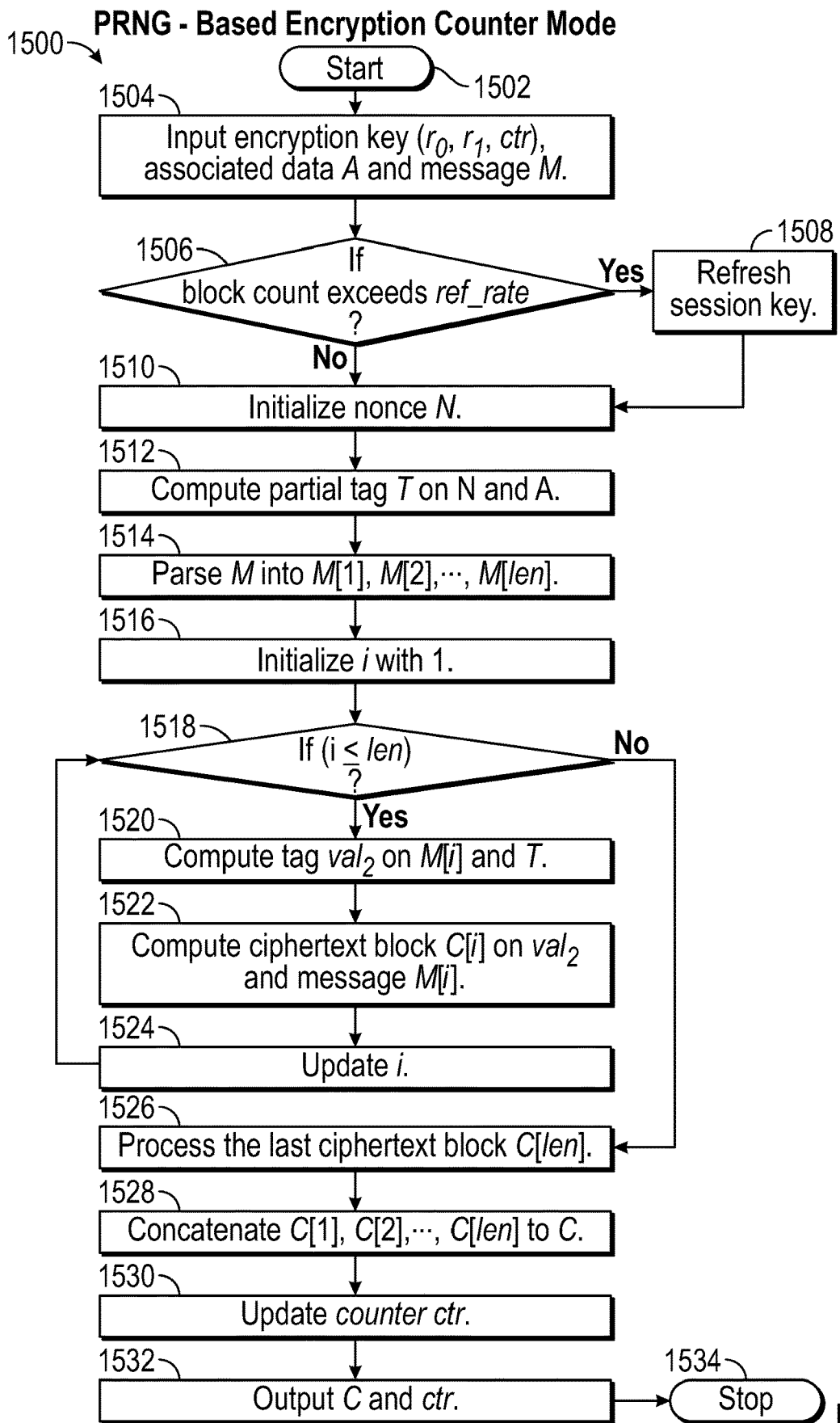
FIG. 15 is a flow chart illustrating an exemplary method of PRNG-based encryption using counter mode, showing tag computation, consistent with some embodiments.

A PRNG-based method 1500 of encryption using counter mode is now discussed relative to FIG. 15. The input for method 1500 is the encryption key (r0, r1, ctr), consisting of a first random or pseudo-random number r0, a second random or pseudo-random number r1, and the counter ctr. Other inputs include some associated data A and a message M to encrypt. The output is a ciphertext and an updated counter ctr. This method may be performed in a first chiplet (sender) that is in communication with a second chiplet (receiver).

The following discussion of FIG. 15 references an encryption algorithm C. Encryption algorithm C embodies a particular embodiment within the scope of method 1500. Those with skill in the art, once appraised of the principles discussed herein, will be aware of more alternatives to those stated below.

---

ENCRYPTION ALGORITHM C
Enc(($r_0$, $r_1$), ctr), A, M)

1. If (ctr + len + 2 ≥ ref_rate) *
   a. Refresh Session Key (Execute Key Exchange Protocol.)
2. Compute nonce as N := PRNG ($r_1$ || ctr, b) †.
3. Compute partial tag on associated data A as:
   a. Parse A[1] || A[2] || ··· || A[len'] := A.
   b. Assign T := N.
   c. For i := 1,2, ··· , len'
      i. Compute T := PRNG (T || A[i], b).
4. Parse M[1] || M [2] || ··· || M [len] := M.
5. For i := 1,2, ··· , len
   a. Compute $val_2$ := PRNG ($r_0$ || (M[i] ⊕ N) || T, w − b).
   b. For j := 0,1, ··· , b − 1
      i. Compute $val_2'[bit_j]$ := $val_2[bit_{(m-1)j}]$ ⊕ $val_2[bit_{(m-1)j+1}]$ ⊕ ··· ⊕ $val_2[bit_{(m-1)j+(m-2)}]$
   c. Compute $val_2''$ := $val_2'[bit_0]$ || $val_2'[bit_1]$ || ··· || $val_2'[bit_{b-1}]$.
   d. Compute $val_3$ := $val_2''$ ⊕ M[i].
   e. Parse $val_2[1]$ || $val_2[2]$ || ··· || $val_2[b]$ := $val_2$.
   f. Parse $val_3[1]$ || $val_3[2]$ || ··· || $val_3[b]$ := $val_3$.
   g. Compute DSS := $val_2[1]$ || $val_3[1]$ || $val_2[2]$ || $val_3[2]$ || ··· || $val_2[b]$ || $val_3[b]$.
   h. Compute KSS := PRNG($r_1$ || (ctr + i), w).
   i. Compute C[i] := DSS ⊕ KSS.
6. Compute C[len] := C[len] ⊕ PRNG($r_1$ || (ctr + len + 1), w).
7. Compute ciphertext C := C[1] || C[2] || ··· || C[len].
8. Update counter ctr := ctr + len + 2.
9. Return C and ctr.

*: If counter is initialized as ctr := PRNG($r_1$ || 0, b), then, depending on the implementation, the condition will be:
a. (blk_ctr + len + 2 ≥ ref_rate), or
b. (ctr + len + 2 − PRNG ($r_1$ || 0, b) ≥ ref_rate).
†: Nonce can also be randomized as:
e. Compute rb := N & 0x01. (For the first value, N := PRNG($r_0$, b))
f. Compute idx := idx + 1. (For the first value, idx := 0)
g. Compute N := PRNG ($r_{rb}$ || idx, b).
♠: For some Integer s, variable $val_1$ can also be computed using some operation⊡ as:
$val_1$ := $t_1$ ⊕ ($t_2$⊡ s) ⊕ ··· ⊕ ($t_m$⊡ s(m − 1))

---

Again referencing FIG. 15, after a start operation 1502, control moves to operation 1504 which inputs the encryption key (r0, r1, ctr), associated data A, and a message M to be encrypted.

Control moves to operation 1506 which determines if a block count exceeds a parameter ref_rate. Block count equals ctr+len+2. Ref_rate is a refresh rate for session keys.

In the embodiments of encryption algorithm C, it is determined if the block count, ctr+len+2 is greater than or equal to the ref_rate. Operation 1506 is unchanged from operation 1106 of method 1100. Reference is made to the discussion of operation 1106.

If the block count does not exceed the ref_rate, the control moves to operation 1510, discussed below.

If the block count does exceed the ref_rate, then control moves to operation 1508 which refreshes the session key K, which is r0∥r1. Operation 1508 is unchanged from operation 1108 of FIG. 11. Reference is made to that discussion regarding the details of refreshing a session key.

Control moves to operation 1510 which initializes a nonce N. Operation 1510 is unchanged from operation 1110 of FIG. 11. Reference is made to that discussion.

Control moves to operation 1512 which computes a partial tag T on N and A, where N is nonce N and A is associated data. T is a partial tag because it is not computed on the message M to be encrypted. The specific steps of this particular algorithm are shown in lines 3a-3c of Encryption Algorithm C. Unlike in method 1100, after the tag T is computed, it is not concatenated with the message M to be encrypted.

Control moves to operation 1514 which parses M into message blocks, such as M[1], M[2], M[3], . . . , M[len], where len is the total number of blocks. The size of the blocks in bits is governed by the value b, discussed above. As discussed above, unlike in operation 1100, none of the message blocks is a tag because the tag T was not concatenated with message M.

Control moves to operation 1516 which initializes a counter variable i to 1.

A loop is executed that includes the following operations:
a. Operation 1518 determines if the variable i (the index for the current block) is less than or equal to len, the number of message blocks to be encrypted. If i is greater than len, then the loop is exited and control moves to operation 1526 below.
b. Operation 1520 computes val2 based at least partly on M[i] and T. Val2 functions as a verification value, essentially like a tag, which is utilized in decryption to verify the decryption of a ciphertext block. In the embodiments of Encryption Algorithm C, val2:=PRNG(r0∥(M[i]⊕Nonce)∥T, w-b). That is, val2 is equal to the output of PRNG seeded with r0 concatenated with the XOR of the current message block M[i] and the Nonce, concatenated with partial tag T. Thus, val2 is dependent upon the current message block M[i], the Nonce, and the partial tag T. In the embodiments of Algorithm C, val2 is not used for directly computing the ciphertext C[i]. But val2 is used indirectly to compute DSS, which is used to compute C[i] (see lines 5a-5g. Val2 is also used for verification during decryption of C[i]. Also, because of the "w-b" parameter, val2 is w-b bits in length. For example if w is 64 bits and b is 16 bits, then val2 is 48 bits in length.
c. Operation 1522 computes a ciphertext C[i] dependent on message M[i] and the tag val2. Referencing Encryption Algorithm C, in some specific embodiments, computing C[i] includes at least:
  i. Compute a val$_2$" which is a derived from val2, but is b bits in length. For details of this computation, reference is made to lines 6d-6e of Encryption Algorithm A. In these computations, m is equal to w/b. One purpose of these computations is to convert from val2 with a w-b bit length to a value with a b-bit length (so it can be XOR'd with M[i] which is b bits in length).
  ii. Compute val3:=val$_2$"⊕M[i]. val3 is also b bits in length. Subsequently, both val2 and val3 are parsed into their individual bits. For details reference is made to lines 6g-6h of Encryption Algorithm A.
  iii. Compute DSS as equal to the interleaved bits of val2 and val3. That is DSS:=val$_2$[1]∥val$_3$[1]∥val$_2$[2]∥val$_3$[2]∥ . . . ∥val$_2$[b]∥val$_3$[b].
  iv. Compute KSS:=PRNG(r1∥(ctr+i), w), which gives KSS a length of w bits. This computation also makes KSS dependent upon the index value i, which is the index value associated with M[i].
  v. Compute C[i]:=DSS⊕KSS. This computation computes the ciphertext for block i. Unlike in method 1100, which uses CBC mode, there is no temp variable that is set to equal C[i]. In counter mode, the ciphertext C[i] for M[i] is not dependent on a ciphertext for the previous message block, e.g. C[i-1] for M[i-1].
d. Operation 1524 updates i incrementing by one. Control then returns to operation 1518 and the loop then repeats until in operation 1518, i is greater than len. When i is greater than len, the loop terminates and control moves to operation 1526.

Operation 1526 computes the value for the last block of ciphertext C[len]. Referencing encryption algorithm C, in some specific embodiments, computing C[len] includes at least computing C[len]:=C[len]⊕PRNG(r1∥(ctr+len+1), w). Operation 1526 is unchanged from operation 1126 in method 1100. Reference is therefore made to that discussion.

Control moves to operation 1528 which calculates the ciphertext by concatenating the ciphertext blocks C[1], C[2], . . . C[len].

Control moves to operation 1530 which updates the counter ctr. In some embodiments consistent with Encryption Algorithm C, ctr is updated as follows: ctr:=ctr+len+2.

Control then moves to operation 1532 which outputs C and ctr as the outputs of the method 1500. Control then moves to Stop operation 1534.

The above method 1500 is subject to a variety of implementations. For example, in some implementations it is desired to disable one or more of authentication, verification or encryption. In those embodiments one or more flags may be used to enable or disable at least one of authentication, verification, or encryption.

Figure 16:
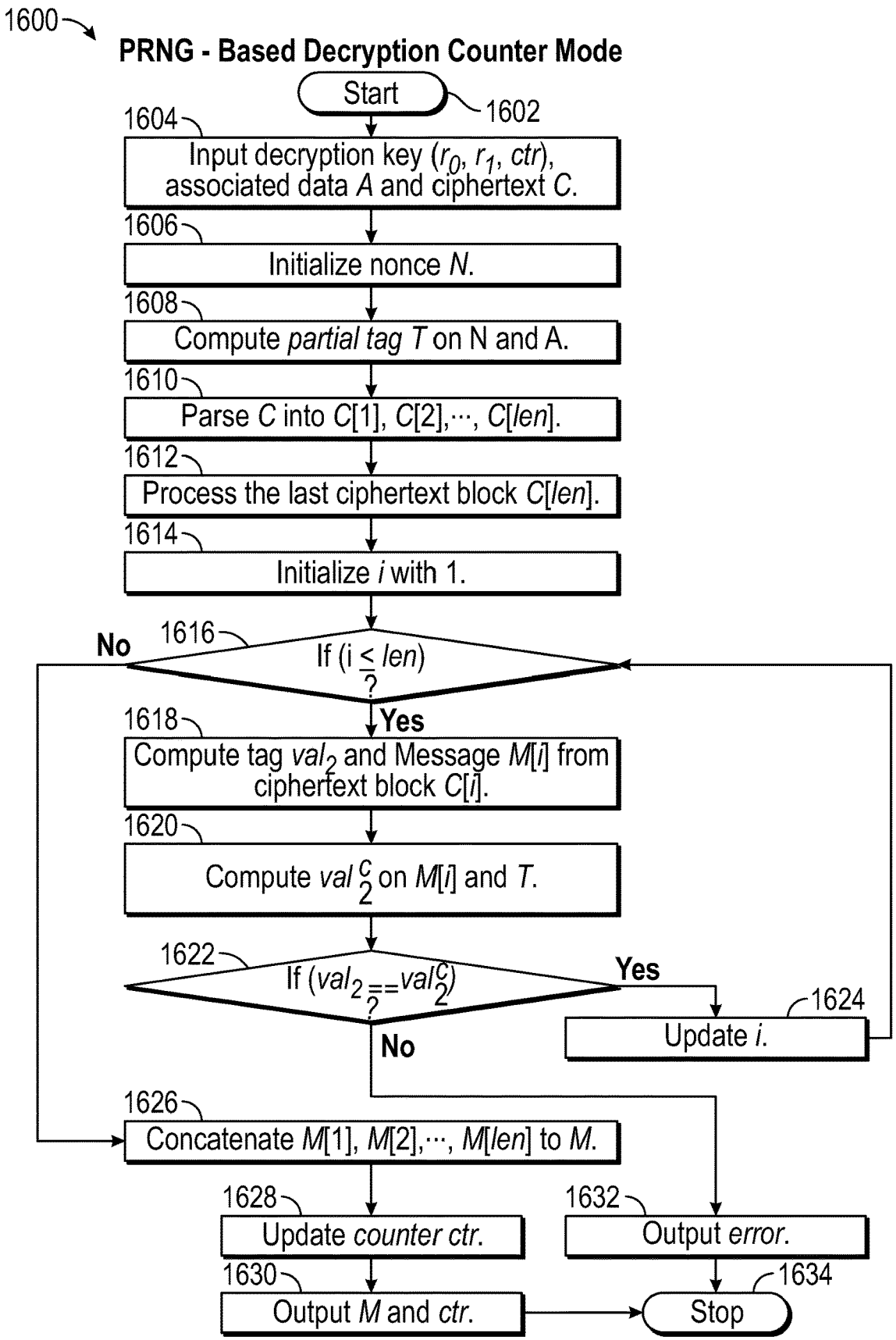
FIG. 16 is a flow chart illustrating an exemplary method of PRNG-based decryption using counter mode, showing tag-based verification, consistent with some embodiments.

Referencing FIG. 16, a PRNG-based method 1600 is decryption using counter mode is described. Method 1600 decrypts the ciphertext C output by method 1500. The discussion of method 1600 will be in tandem with decryption algorithm D.

---

DECRYPTION ALGORITHM D
Dec(($r_0$, $r_1$, ctr), A, C)

1. Compute nonce as N := PRNG ($r_1$ ∥ ctr, b) †.
2. Compute partial tag on associated data A as:
  a. Parse A[1] ∥ A[2] ∥ ⋯ ∥ A[len'] := A.
  b. Assign T := N.
  c. For i := 1,2, ⋯ , len'
   i. Compute T := PRNG (T ∥ A[i], b).
3. Parse C[1] ∥ C[2] ∥ ⋯ ∥ C[len] := C.
4. Compute C[len] := C[len] ⊕ PRNG($r_1$ ∥ (ctr + len + 1), w).
5. For i := 1,2, ⋯ , len
  a. Compute KSS := PRNG($r_1$ ∥ (ctr + i), w).
  b. Compute DSS := C[i] ⊕ KSS.

DECRYPTION ALGORITHM D
Dec(($r_0$, $r_1$, ctr), A, C)

c. Parse $val_2[1] \| val_3[1] \| val_2[2] \| val_3[2] \| \cdots \| val_2[b] \| val_3[b] :=$ DSS.
d. Compute $val_2 := val_2[1] \| val_2[2] \| \cdots \| val_2[b]$.
e. Compute $val_3 := val_3[1] \| val_3[2] \| \cdots \| val_3[b]$.
f. For $j := 0, 1, \cdots, b - 1$
  i. Compute $val_2'[bit_j] := val_2[bit_{(m-1)j}] \oplus val_2[bit_{(m-1)j+1}] \oplus \cdots \oplus val_2[bit_{(m-1)j+(m-2)}]$
g. Compute $val_2'' := val_2'[bit_0] \| val_2'[bit_1] \| \cdots \| val_2'[bit_{b-1}]$.
h. Compute $M[i] := val_2'' \oplus val_3$.
i. Compute $val_2^c := PRNG\ (r_0 \| (M[i] \oplus N) \| T, w - b)$.
j. If $(val_2^c \neq val_2)$
  i. Return Error.
6. Compute message $M := M[1] \| M[2] \| \cdots \| M[len]$.
7. Update counter ctr := ctr + len + 2.
8. Return M and ctr.

†: Nonce can also be randomized as:
h. Compute rb := N & 0x01. (For the first value, N := PRNG ($r_0$, b))
a. Compute idx := idx + 1. (For the first value, idx := 0)
b. Compute N := PRNG ($r_{rb} \|$ idx, b).

♠: For some Integer s, variable $val_1$ can also be computed using some operation □ as:
$val_1 := t_1 \oplus (t_2 \square\ s) \oplus \cdots \oplus (t_m \square\ s(m - 1))$ Method 1600 assumes that both of key generation methods 700 and 800 have been performed. Method 1600 further assumes that method 1500 has been performed by a first chiplet. In some embodiments, method 1600 is performed by a second chiplet that received the inputs from the first chiplet.

Again referencing FIG. 16 and method 1600, after a start operation 1602, control moves to operation 1604 which receives as input the decryption key (r0, r1, ctr), associated data A, and the ciphertext C to be decrypted.

Control moves to 1606 which initializes nonce N. This operation 1606 is unchanged from operation 1110 of method 1100. Reference is made to the discussion of operation 1110.

Control moves to operation 1608 which computes a partial tag T on N and A. This operation is unchanged from operation 1112 of method 1100. Reference is made to the discussion of operation 1112.

Control moves to operation 1610 which parses C into ciphertext blocks C[1], C[2], ..., C[len], where len is the total number of ciphertext blocks. The parameter w, discussed above, governs the size of the ciphertext blocks.

Control moves to operation 1612 which processes the last ciphertext block C[len]. Operation 1612 is unchanged versus operation 1212 of method 1200. Reference is therefore made to the discussion of operation 1212.

Control moves to operation 1614 which initializes a counter variable i to 1. Unlike method 1200 and Decryption Algorithm B, method 1600 does not use a temp variable.

A loop is executed that includes the following operations:
a. Operation 1616 determines if the variable i is less than or equal to the parameter len, the number of ciphertext blocks to be decrypted. If i is greater than len, then the loop is exited and control moves to operation 1626 below. Otherwise, control moves to operation 1618.
b. Operation 1618 computes a value val2 and message block M[i]. Val2 functions both as a tag for verifying the decryption and as an intermediate value for computing M[i]. Referencing decryption algorithm D, in some specific embodiments, computing val2 and M[i] includes at least:
  i. Compute $KSS := PRNG((r1\|ctr+i), w)$. That is KSS is set to the output of PRNG with PRNG seeded by r1 concatenated with the sum of ctr and i, the index of the current ciphertext block being decrypted. The w parameter directs that KSS be w bits in length.
  ii. Compute $DSS := C[i] \oplus KSS$. That is DSS is set to the value of the current ciphertext block C[i] XOR'd with KSS. In Encryption Algorithm C, C[i] was computed as $C[i] := DSS \oplus KSS$. The current computation at least partly reverses that previous computation to obtain DSS.
  iii. Extract val2 and val3 from DSS. In the embodiments of Encryption Algorithm C, DSS was computed by an alternation of the bits of val2 and val3 (See line 5g of Encryption Algorithm C). Now, in Decryption Algorithm D, the alternating bits of val2 and val3 are extracted from DSS. These are used to reconstitute val2 and val3. Below, val2 is used to verify the decryption.
  iv. $val_2''$ is computed from val2. In this computation 1-bit values are utilized in a series of computations to eventually derive $val_2''$. For details, reference is made to lines 5f-5g of Decryption Algorithm D.
  v. Compute $M[i] := val_2'' \oplus val3$. This computes M[i], decrypted from C[i].
c. Operation 1620 computes $val_2^c$ which is used for a verification in operation 1622 below. That is, below, a verification of the decryption of C[i] is performed using both val2 as extracted from DSS and a computed $val_2^c$, which should be equal to val2. This begins in operation 1620 which computes $val_2^c := PRNG(r0\|(M[i] \oplus N)\|T, w-b)$. $Val_2^c$ is a computed tag that is computed by PRNG with a seed that includes r0 concatenated with M[i] XOR'd with Nonce N concatenated with partial tag T. The length of $val_2^c$ is w-b. The computation of $val_2^c$ uses PRNG with the same seed as was used in Encryption Algorithm C (line 5a) to compute val2. Therefore the val2 extracted from DSS should match the computed $val_2^c$.
d. Operation 1622 determines whether val2 is equal to $val_2^c$. That is, tags are used to verify the decryption. If the verification fails, then in operation 1632 an error is returned and control moves to stop operation 1634 and method 1600 is aborted. Thus, if verification of the first block of ciphertext fails, then decryption of the ciphertext, including all the remaining blocks of ciphertext is avoided.
e. If the verification succeeds, then in operation 1624, counter variable i is incremented and control returns to operation 1616.

Once the loop terminates, control moves to operation 1626, which concatenates M[1], M[2] ... M[len] to obtain M.

Control moves to operation 1628 updates counter ctr (e.g. ctr:=ctr+len+2) and to operation 1630 outputs M and ctr before control moves to stop operation 1634.

The above method 1600 is an exemplary embodiment. Various implementations are possible. For example, in another implementation, flags are provided to enable/disable authentication/verification and to enable/disable encryption.

Various example modes of communication between a chiplet-1 (e.g. a first chiplet) and a chiplet-2 (e.g. a second chiplet) are now discussed with reference to exemplary sequences. A sequence of communication between chiplet-1 and chiplet-2 may include multiple messages. Usually, communications are bi-directional. If both of the chiplets may send data only sequentially, one-after-the-other, then the communication is half-duplex. If both of the chiplets may send data concurrently, then the communication is full-duplex.

For simplicity, in some exemplary sequences described below only one chiplet (for example chiplet-1) is sending messages to the other chiplet (for example chiplet-2). However, this feature is not intended to be limiting. Those skilled in the art will recognize that the exemplary sequences described can be extended to bi-directional communication without undue experimentation.

In the example communication sequences described below, the messages $M_1, M_2, \ldots M_i$ (of lengths $n_1, n_2, \ldots n_i$) are encrypted and sent by chiplet-1 to chiplet-2 in sequence. The counter variable ctr is synchronized with the following procedures:

a. The variable ctr is initialized to identical value in both chiplet-1 and chiplet-2.
 b. The ctr is updated on the sender side (chiplet-1) just after encryption of a message.
 c. The ctr is updated on the receiver side (chiplet-2) only after successful decryption and verification of received ciphertext. (The ciphertext is resent if verification fails).

Each of the example communication sequences shown below begins with chiplet-1 and chiplet-2 authenticating themselves to each other. There are a variety of techniques for chiplets authenticating themselves to one another. Some authentication techniques use the existing Public Key Infrastructure (PKI) with the Digital Signature Algorithm (DSA), others deploy a blockchain-based mechanism. A discussion on chiplet authentication techniques is beyond the scope of this document.

Figure 17:
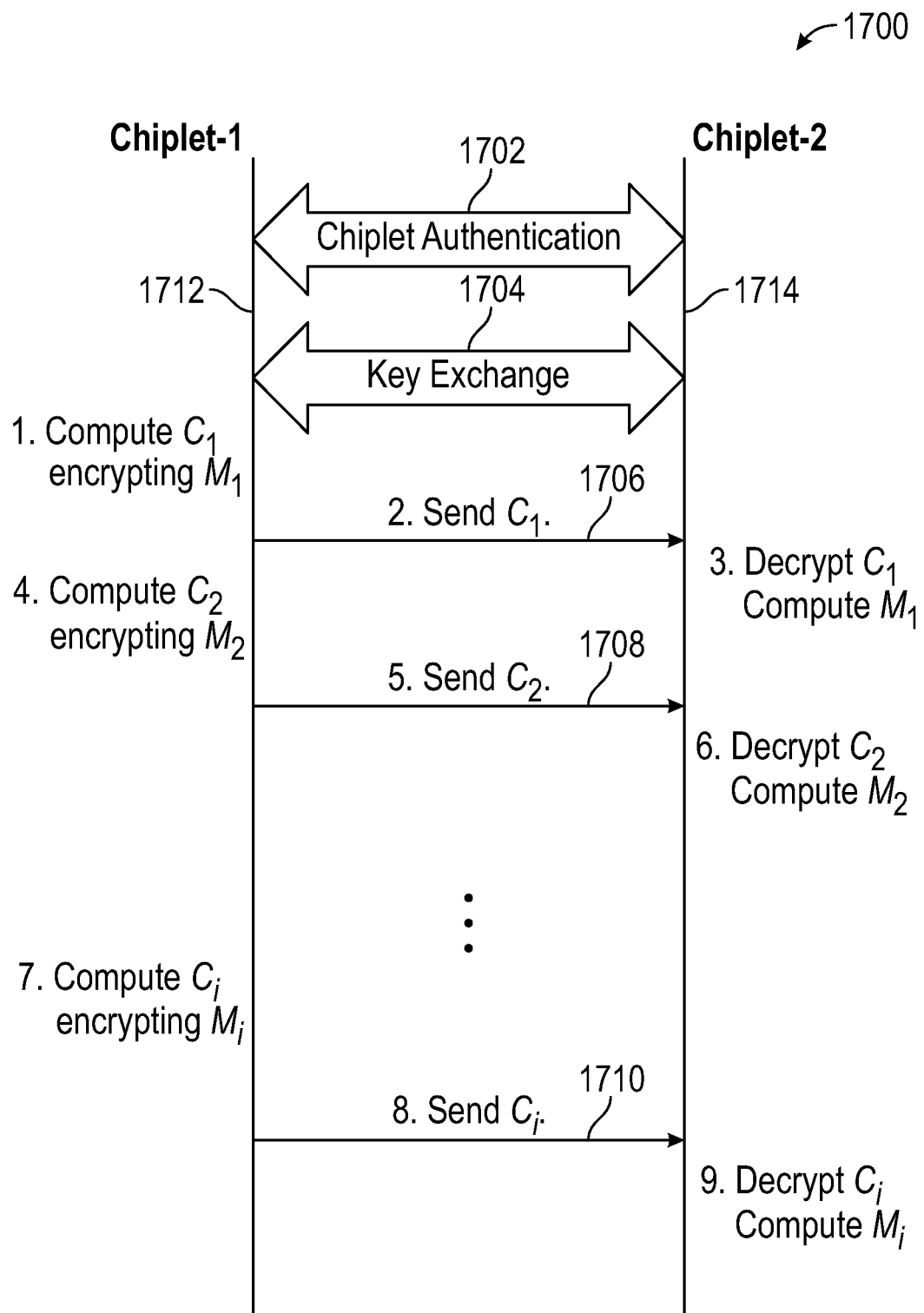
FIG. 17 is a sequence diagram showing an exemplary sequence of transmissions between two chiplets, consistent with some embodiments.

Referencing FIG. 17, communication sequence 1700 begins with chiplet authentication 1702 between chiplet-1 1712 and chiplet-2 1714. A key exchange 1704 is then performed between chiplet-1 and chiplet-2. In some embodiments, the key exchange 1704 is performed by executing a Key Exchange Protocol consistent with methods 700 and 800 of FIGS. 7 and 8, respectively.

The communication sequence 1700 proceeds to step 1 with chiplet-1 encrypting M1 by computing ciphertext C1. In some embodiments, chiplet-1 performs the encryption by executing an encryption function such as method 1100 or method 1500.

In step 2, chiplet-1 transmits the ciphertext C1 via transmission 1706 to chiplet-2. In step 3, chiplet-2 decrypts ciphertext C1 and computes plaintext M1. In some embodiments, chiplet-2 performs the decryption by executing a decryption function such as method 1200 or method 1600.

The communication sequence 1700 continues with chiplet-1, in step 4, encrypting a second message M2 by computing ciphertext C2. In step 5, chiplet-1 transmits ciphertext C2 to chiplet-2 via transmission 1708. In step 6, chiplet-2 decrypts ciphertext C2 and computes message M2.

In step 7, chiplet-1 encrypts message $M_i$ by computing ciphertext $C_i$. In step 8 chiplet-1 transmits ciphertext $C_i$ to chiplet-2 via transmission 1710. In step 9, chiplet-2 decrypts $C_i$ to compute $M_i$.

The discussion below proceeds to discuss a chiplet and a communication sequence for unoptimized basic half-duplex mode of communication. Basic half-duplex mode of communication is a known mode of communication that is incorporated into embodiments herein, as discussed below.

In basic half-duplex mode of communication only one chiplet at a time (e.g. chiplet-1) may transmit data. The other chiplet (e.g. chiplet-2) must wait to transmit until the data transmitted from chiplet-1 is all received and decrypted successfully. The value of a counter ctr is the same for each chiplet and is the same for both transmitting and receiving.

There are four types of control signals which allow smooth transmission of data in the transmission channel or bus:

a. The SND signal: A chiplet sends the SND signal when the chiplet seeks to send data. When a chiplet receives the SND signal, it stops all its transmission-related activities and begins to wait for the data from the other chiplet. At the receiver's side, the waiting period is predefined. If the receiver does not receive any data within the predefined period, the SND signal is dropped. If the SND signal is dropped, the sender then needs to re-send the SND signal before starting to send data.
 b. The ACK signal: A chiplet sends ACK when the chiplet has successfully decrypted, and verified the transmitted data. When a chiplet receives an ACK signal, it is confirmation that its previously sent data has been decrypted and verified successfully. If a chiplet has not received an ACK signal within a predefined period of time and if the SND signal has not expired, the chiplet resends the data. If a chiplet has not received an ACK signal within the predefined period of time and if the SND signal has expired, then the chiplet will resend the SND signal and then resend the data.
 c. The NACK signal: A chiplet sends the NACK signal when the chiplet has received the data but has not successfully decrypted and verified the data. When a chiplet receives the NACK signal, it resends the data. The NACK signal is evidence of error at a higher-layer of a network stack or of an attack by an adversary. If the number of NACK signals exceeds a threshold, a session may be terminated and a new session be established.
 d. The SND-ACK signal: This signal is a combination of the SND and ACK signals. A chiplet sends the SND-ACK signal when the chiplet has successfully decrypted and verified data and then seeks to send data. When a chiplet receives an SND-ACK signal, it is confirmed that its previously sent data has been successfully decrypted and verified and that the chiplet must wait for the other chiplet to send data. The SND-ACK signal provides a fair opportunity for a receiving chiplet to send data. It also ensures that one chiplet does not hold or occupy a communication channel for too long.

Figure 18:
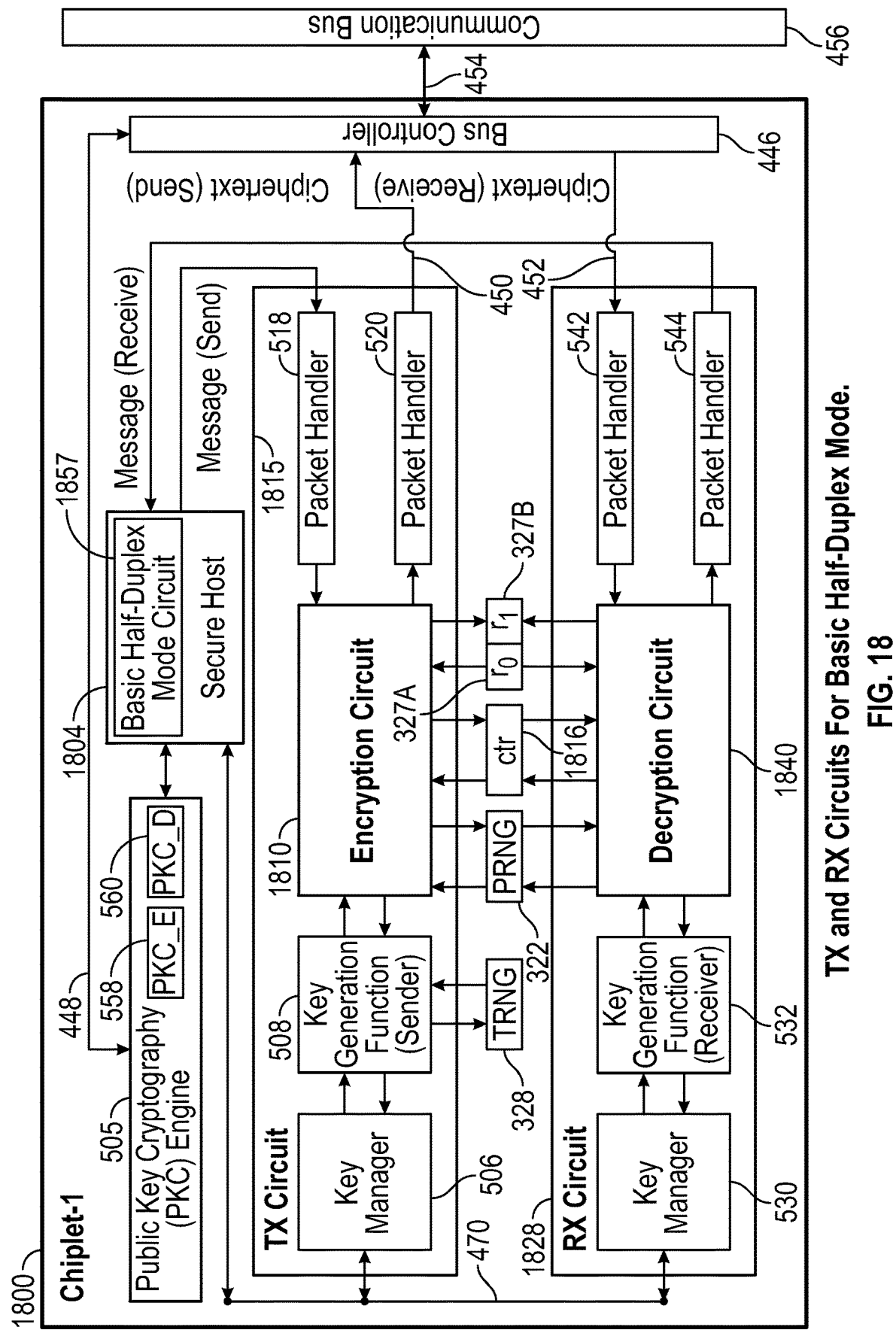
FIG. 18 is a simplified block diagram of a chiplet configured for a basic half-duplex mode of communication, consistent with some embodiments.

Referencing FIG. 18, a chiplet 1800 is configured for encryption and decryption, for example via methods 1100 and 1200, and for basic (e.g. unoptimized) half-duplex mode of communication. Except where discussed below, chiplet 1800 is at least similar to chiplet 500 of FIG. 5. Elements present in chiplet 500 that are not changed in chiplet 1800 are not further discussed. Instead, for these unchanged elements, this document relies on the discussion relative to chiplet 500. The same applies below regarding drawings of additional chiplets (i.e. chiplets 2000, 2200, 2400). For each of these additional chiplets, only new elements or changed elements are discussed. And reliance is placed on previous discussions regarding unchanged elements of chiplets.

Chiplet 1800 includes a secure host 1804 that includes a basic half-duplex mode circuit 1857 that configures secure host 1804 for issuing instructions, commands, and data for causing chiplet 1800 to communicate via basic half-duplex mode of communication. In some embodiments, basic half-duplex mode circuit 1857 is a memory bearing executable instructions for causing chiplet 1800 to communicate via basic half-duplex mode. In some other embodiments, basic half-duplex mode circuit 1857 is hard-wired logic. And in yet some other embodiments, basic half-duplex mode circuit 1857 includes both a memory with executable instructions and hard-wired logic. In some embodiments, basic half-duplex mode circuit 1857 includes at least the equivalent functionality of executable instructions 529 of FIG. 5 that when executed cause a chiplet, such as for example, chiplet 500 to perform any of the key generation, encryption and decryption methods described with reference to FIGS. 7-16.

The chiplet 1800 includes a TX circuit 1815 (a transmission circuit). TX circuit 1815 includes Encryption Circuit 1810. In contrast to the chiplet 500 of FIG. 5, Encryption Circuit 1810 does not include, but is instead communicably linked with an r0 327A, r1 327B, and a counter in the form of ctr 1816. Access to the foregoing elements is shared between Encryption Circuit 1810 and Decryption Circuit 1840 (discussed below).

Chiplet 1800 includes an RX circuit 1828 (a receiving circuit). RX circuit 1828 includes a Decryption Circuit 1840. In contrast to Decryption Circuit 540 of FIG. 5, Decryption Circuit 1840 does not include but is instead communicably linked with r0 327A, r1 327B, and a counter in the form of ctr 1816. The foregoing elements are shared between Decryption Circuit 1840 and Encryption Circuit 1810. A shared r0 327A, r1 327B and ctr 1816 offer the advantage of saving a huge memory space, which otherwise would be double, as shown in FIG. 5. The shared memory could be, for example, one or more SRAM's (not shown).

Figure 19:
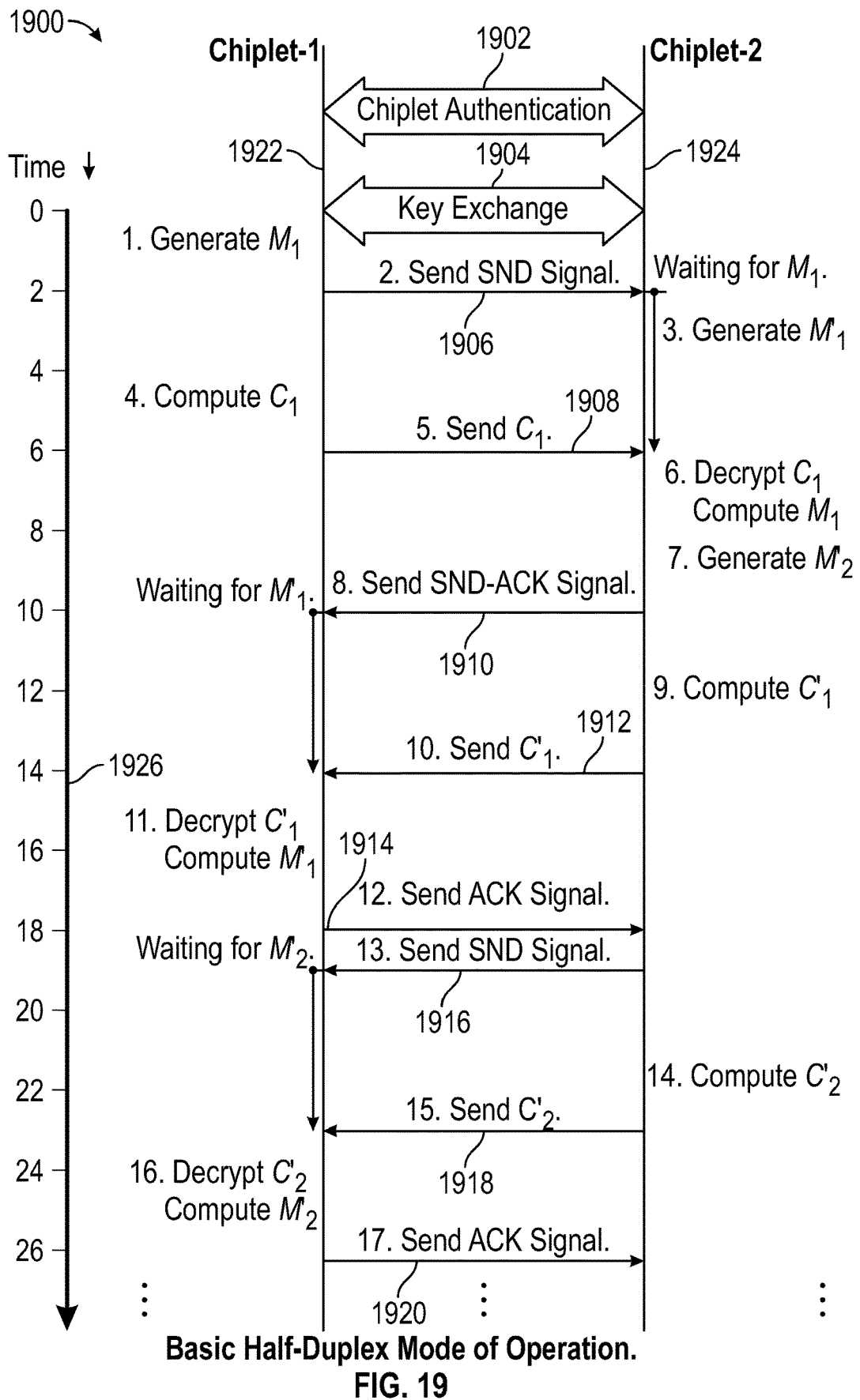
FIG. 19 is a sequence diagram showing an exemplary sequence of transmissions between two chiplets, consistent with some embodiments, showing a basic half-duplex mode of communication.

Referencing FIG. 19, a communication sequence 1900 illustrates an example of basic half-duplex mode of communication. Time proceeds as shown by timeline 1926. Sequence 1900 begins with chiplet authentication 1902 between chiplet-1 (1922) and chiplet-2 (1924). After chiplet authentication 1902, chiplet-1 and chiplet-2 perform a key exchange 1904.

At step 1, chiplet-1 generates a message M1 and checks whether chiplet-2 has sent an SND signal. After determining that chiplet-2 has not sent an SND signal, at step 2, chiplet-1 sends an SND signal to chiplet-2 via transmission 1906.

At step 3, chiplet-2 is waiting for $M_1$ and also generates a message $M'_1$.

At step 4, chiplet-1 completes the encryption of $M_1$ by computing ciphertext $C_1$. In some embodiments, chiplet-1 performs the encryption by executing an encryption function such as method 1100 of FIG. 11. In step 5, chiplet-1 transmits $C_1$ to chiplet-2 via transmission 1908.

In step 6, chiplet-2 decrypts $C_1$ and thereby generates $M_1$. In some embodiments, chiplet-2 performs the decryption by executing a decryption function such as method 1200 of FIG. 12.

In step 7, chiplet-2 generates a message $M'_2$. And in step 8, chiplet-2 sends an SND-ACK signal to chiplet-1 via transmission 1910. This signal confirms decryption and verification of $M_1$ and places chiplet-1 in a waiting mode. Chiplet-1 is waiting for $M'_1$.

In step 9, chiplet-2 completes the encryption of $M'_1$ by computing ciphertext $C'_1$ and in step 10 sends $C'_1$ to chiplet-1 via transmission 1912.

At step 11, chiplet-1 decrypts $C'_1$ and thereby computes $M'_1$. At step 12, Chiplet-1 sends an ACK signal to chiplet-2 via transmission 1914. This signal confirms decryption and verification of $M'_1$ and also signals to chiplet-2 that chiplet-1 does not have a message to send.

At step 13, chiplet-2 sends an SND signal to chiplet-1 via transmission 1916. Chiplet-1 begins waiting for $M'_2$. At step 14, chiplet-2 encrypts $M'_2$ by computing the ciphertext $C'_2$. In step 15, chiplet-2 sends $C'_2$ to chiplet-1 via transmission 1918.

In step 16, chiplet-1 decrypts $C'_2$ to compute $M'_2$. At step 17, chiplet-1, having successfully decrypted and verified $M'_2$ sends an ACK signal via transmission 1920. The ACK signal confirms successful decryption and verification of $M'_2$ and also signals that chiplet-1 does not have a message to send.

Advantages of the basic half-duplex mode of communication are the need to store only one counter and the simplicity of Chiplet 1800 of FIG. 18. Disadvantages include low channel utilization and secure time-stamping of the control signals is required to resolve conflicts.

The discussion below proceeds to discuss a chiplet and a communication sequence for unoptimized full-duplex mode of communication. Full-duplex mode of communication is a known mode of communication that is incorporated into embodiments herein, as discussed below.

In full-duplex mode of communication both chiplets can send data simultaneously. The encryption/decryption process and the transmission of data are not dependent on another chiplet. A chiplet has two counters, ctr and ctr': one for sending messages and one for receiving messages. The session key K is the same for both sending and receiving.

Figure 20:
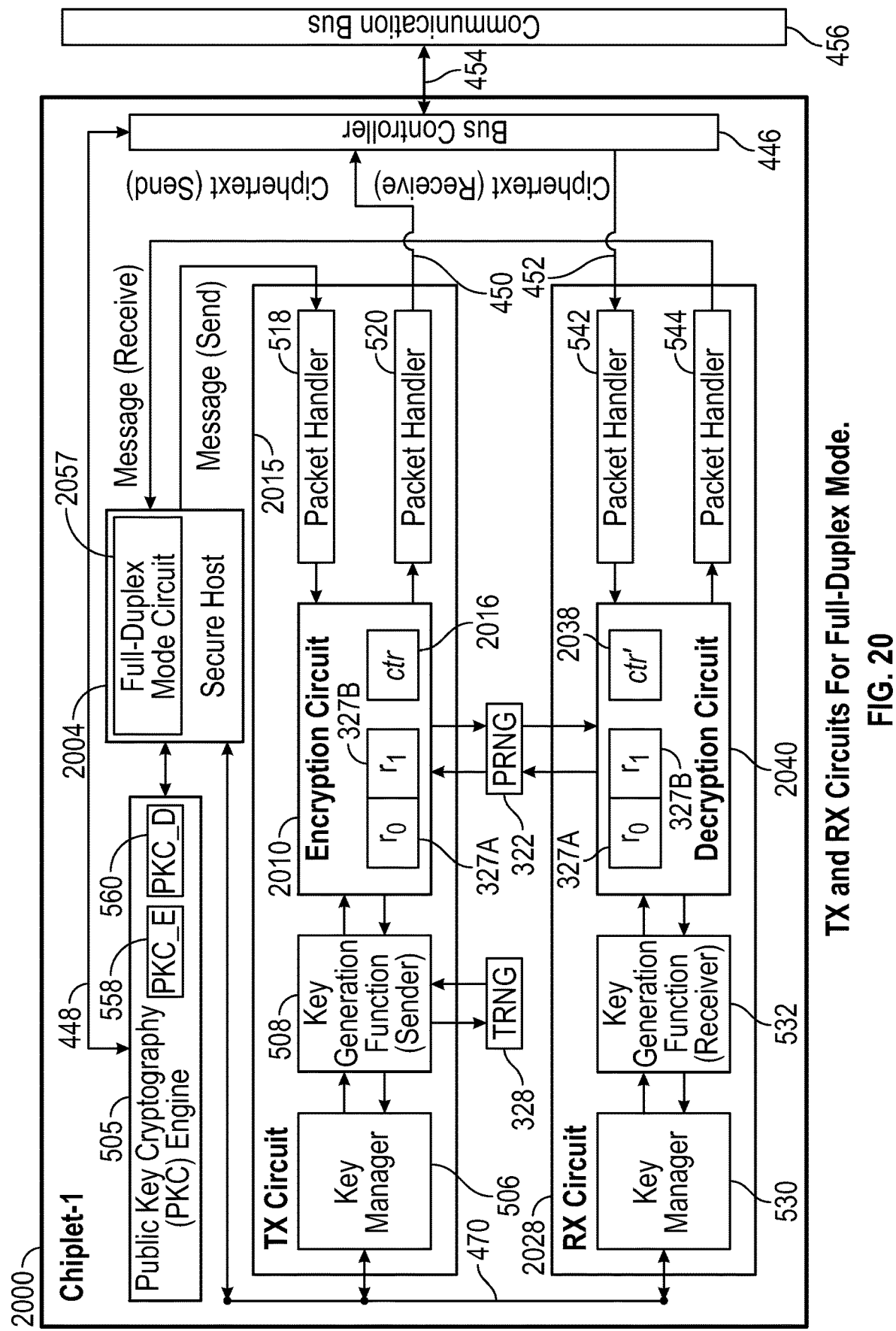
FIG. 20 is a simplified block diagram of a chiplet configured for a full-duplex mode of communication, consistent with some embodiments.

Referencing FIG. 20, a chiplet 2000 is configured for encryption and decryption, for example via methods 1100 and 1200, and for full-duplex mode of communication. Unlike chiplet 1800 of FIG. 18, this chiplet 2000 has a counter ctr 2016 for transmission and another counter ctr' 2038 for receiving.

Chiplet 2000 includes a secure host 2004 that includes a full-duplex mode circuit 2057 that configures secure host 2004 for issuing instructions, commands, and data for causing chiplet 2000 to communicate via full-duplex mode of communication. In some embodiments, full-duplex mode circuit 2057 is a memory bearing executable instructions for causing chiplet 2000 to communicate via full-duplex mode. In some other embodiments, full-duplex mode circuit 2057 is hard-wired logic. And in yet some other embodiments, full-duplex mode circuit 2057 includes both a memory with executable instructions and hard-wired logic. In some embodiments, full-duplex mode circuit 2057 includes at least the equivalent functionality of executable instructions 529 of FIG. 5 that when executed cause a chiplet, such as for example, chiplet 500 to perform any of the key generation, encryption and decryption methods described with reference to FIGS. 7-16.

The chiplet 2000 includes a TX circuit 2015 (a transmission circuit). TX circuit 2015 includes encryption circuit 2010 which includes a counter ctr 2016 dedicated to the TX circuit 2015. That is, ctr 2016 is not shared with RX circuit 2028 (below).

Chiplet 2000 includes an RX circuit 2028 (a receiving circuit). RX circuit 2028 includes decryption circuit 2040 which includes a counter ctr' 2038 dedicated to the RX circuit 2028. That is, ctr' 2038 is not shared with TX circuit 2015. The separate counters ctr 2016 and ctr' 2038 at least partially configure chiplet 2000 for full-duplex mode.

Figure 21:
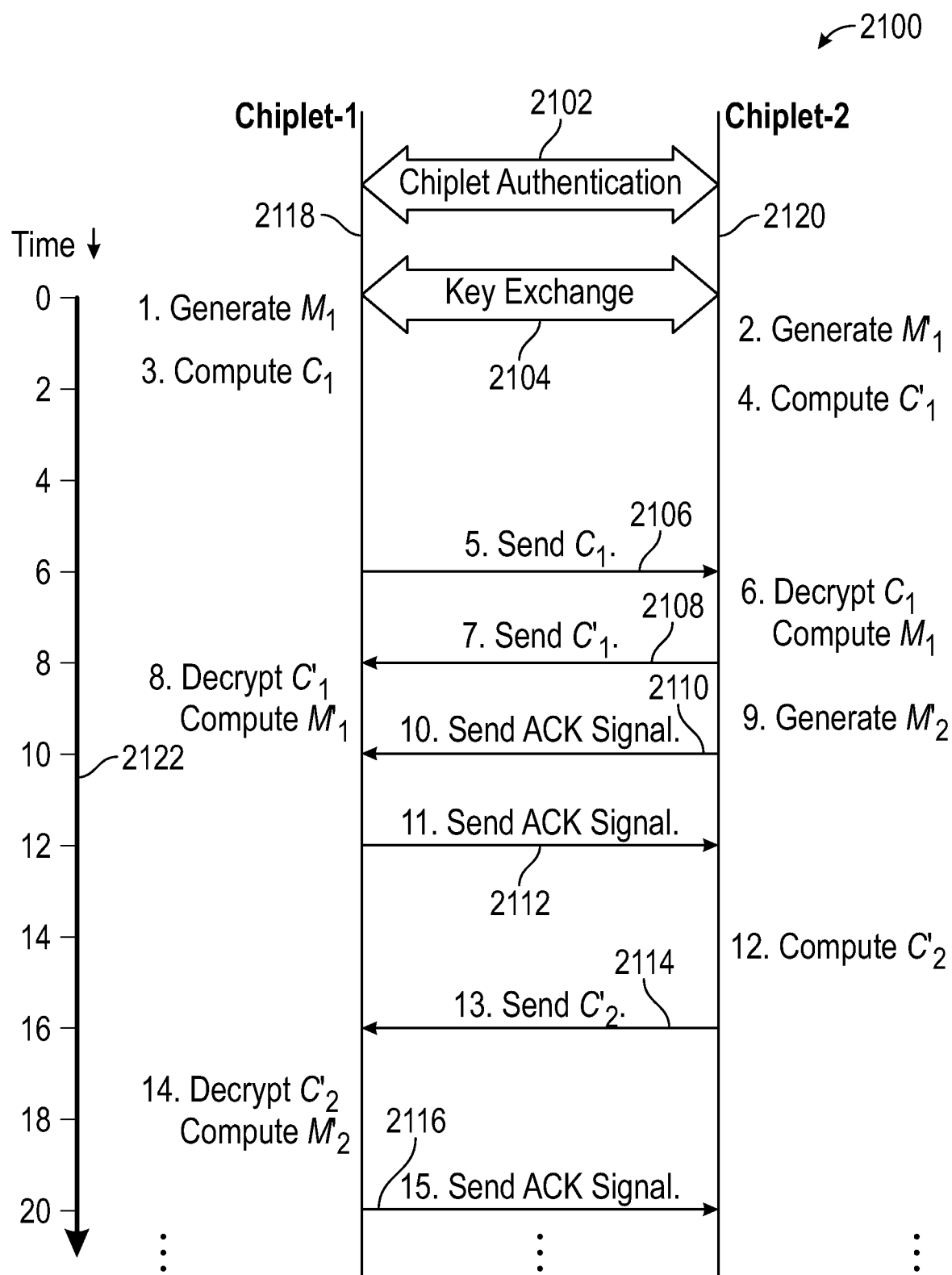
FIG. 21 is a sequence diagram showing an exemplary sequence of transmissions between two chiplets, consistent with some embodiments, showing a full-duplex mode of communication.

Referencing FIG. 21, a communication sequence 2100 illustrates full-duplex mode of communication between chiplet-1 (2118) and chiplet-2 (2120). In some embodiments, chiplet-1 is chiplet 2000 above and stores: a) A session key K that equals r0∥r1, b) a counter ctr for sending data, and c) a counter ctr' for receiving data.

In those embodiments, chiplet-2 stores a) the same session key K that equals r0∥r1, b) the counter ctr but for receiving data, and c) the counter ctr' but for sending data. Thus, in chiplet-2 the role of the counters is reversed compared to their role in chiplet-1.

The number of control signals for full-duplex mode is simplified and includes two control signals:
  a. The ACK signal: A chiplet sends the ACK signal to indicate that it has successfully decrypted and verified the transmitted data. When a chiplet receives the ACK signal, it is confirmed that its previously sent data has been decrypted and verified successfully. If a chiplet does not receive an ACK signal within a predefined period of time after sending data, the data is resent.
  b. The NACK signal: A chiplet sends the NACK signal when the chiplet has received the data but has not successfully decrypted and verified the data. When a chiplet receives the NACK signal, it resends the data. The NACK signal is evidence of error at a higher-layer of a network stack or of an attack by an adversary. If the number of NACK signals exceeds a threshold, a session may be terminated and a new session be established.

The direction of time for communication sequence 2100 is shown by timeline 2122. Communication sequence 2100 begins with chiplet authentication 2102 between chiplet-1 (2118) and chiplet-2 (2120). After chiplet authentication, chiplet-1 and chiplet-2 perform a key exchange 2104. In some embodiments, chiplet-1 and chiplet-2 perform the key exchange by executing a Key Exchange Protocol consistent with methods 700 and 800 of FIGS. 7 and 8, respectively.

At step 1, chiplet-1 generates a message $M_1$. Meanwhile, at step 2, chiplet-2 generates message $M'_1$.

At step 3, chiplet-1 encrypts message $M_1$ by computing ciphertext $C_1$. In parallel, at step 4, chiplet-2 encrypts message $M'_1$ by computing ciphertext $C'_1$.

At step 5, chiplet-1 transmits $C_1$ to chiplet-2 via transmission 2106. At step 6, chiplet-2 decrypts $C_1$ to obtain $M_1$. At step 7, chiplet-2 transmits $C'_1$ to chiplet-1 via transmission 2108.

At step 8, chiplet-1 decrypts $C'_1$ to compute $M'_1$. At step 9, chiplet-2 generates $M'_2$, but chiplet-2 has not received an ACK for $M'_1$ so it awaits taking action on $M'_2$. At step 10 chiplet-2 sends an ACK signal to chiplet-1 via transmission 2110, signaling that chiplet-2 has decrypted and verified $M_1$. At step 11, chiplet-1 sends an ACK signal to chiplet-2 via transmission 2112, signaling that chiplet-1 has decrypted and verified $M'_1$.

At step 12 chiplet-2 encrypts message $M'_2$ by computing ciphertext $C'_2$. And at step 13 chiplet-2 transmits $C'_2$ to chiplet-1 via transmission 2114.

At step 14 chiplet-1 decrypts $C'_2$ to compute $M'_2$ and at step 15 chiplet-1 sends an ACK signal to chiplet-2 via transmission 2116, signaling that chiplet-2 has decrypted and verified $M'_2$.

The discussion below proceeds to discuss a chiplet and a communication sequence for a new communication mode, no-delay half-duplex mode. In no-delay half-duplex mode, a chiplet may, while waiting for a message after receiving an SND signal, encrypt its own message using a different counter. And while a chiplet is decrypting received data, it can transmit its own encrypted data over the channel, improving the channel utilization.

Figure 22:
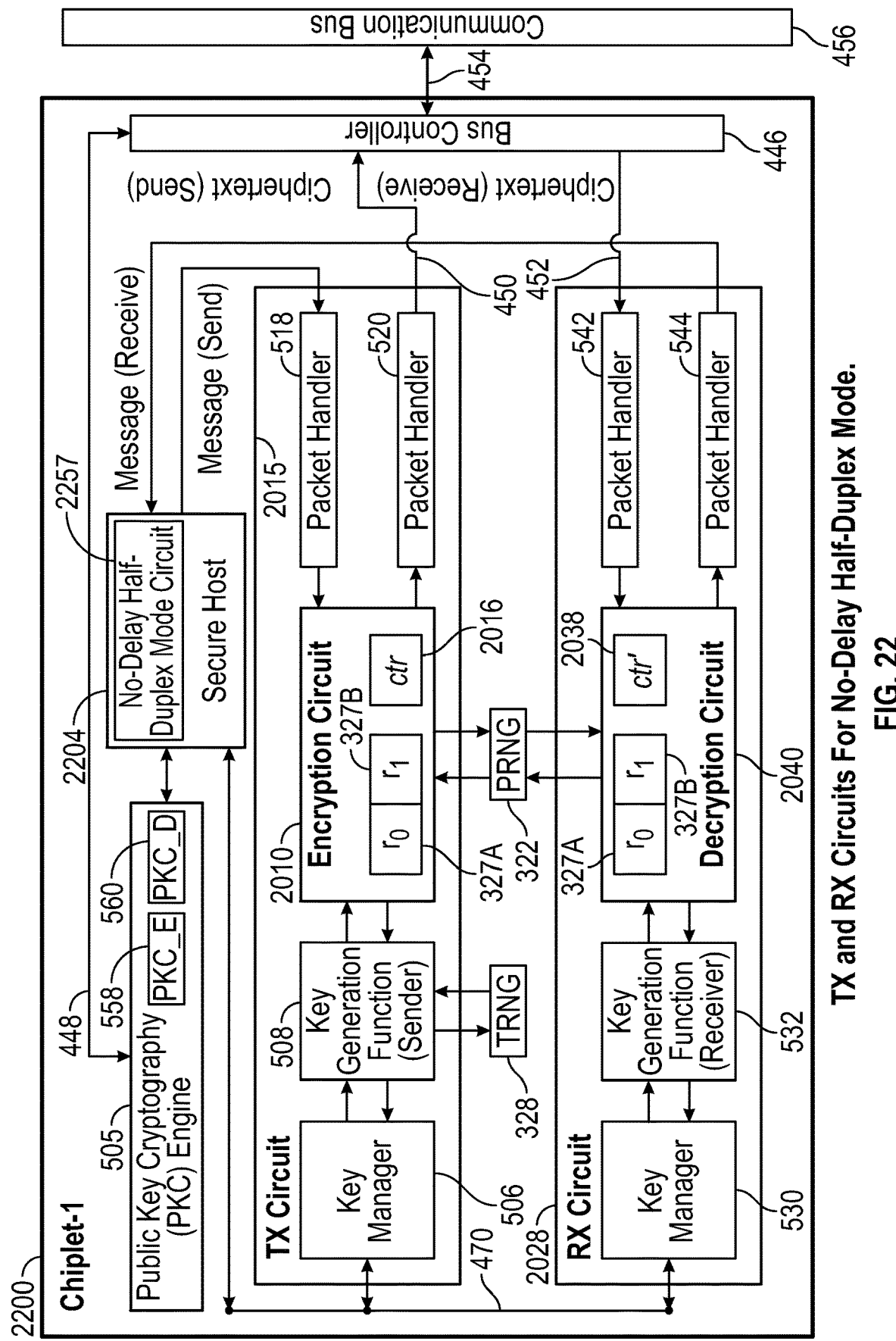
FIG. 22 is a simplified block diagram of a chiplet configured for a no-delay half-duplex mode of communication, consistent with some embodiments.

Referencing FIG. 22, a chiplet 2200 is configured for encryption and decryption, for example via methods 1100 and 1200, and for communication via no-delay half-duplex mode. The no-delay half-duplex mode is enabled at least in part by no-delay half duplex mode circuit 2257 and by having two counters, a counter ctr 2016 for transmission and another counter ctr' 2038 for receiving.

Chiplet 2200 includes a secure host 2204 that includes a no-delay half-duplex mode circuit 2257 that configures secure host 2204 for issuing instructions, commands, and data for causing chiplet 2200 to communicate via no-delay half-duplex mode of communication. In some embodiments, no-delay half-duplex mode circuit 2257 is a memory bearing executable instructions for causing chiplet 2200 to communicate via no-delay half-duplex mode. In some other embodiments, no-delay half-duplex mode circuit 2257 is hard-wired logic. And in yet some other embodiments, no-delay half-duplex mode circuit 2257 includes both a memory with executable instructions and hard-wired logic. In some embodiments, no-delay half-duplex mode circuit 2257 includes at least the equivalent functionality of executable instructions 529 of FIG. 5 that when executed cause a chiplet, such as for example, chiplet 500 to perform any of the key generation, encryption and decryption methods described with reference to FIGS. 7-16.

As described above regarding chiplet 2000, Chiplet 2200 includes a TX circuit 2015 with Encryption Circuit 2010 which includes a counter ctr 2016 dedicated to the TX circuit 2015. And, as does chiplet 2000, chiplet 2200 includes an RX circuit 2028 which includes decryption Circuit 2040 which includes a counter ctr' 2038 dedicated to the RX circuit 2028.

In chiplet 2000, the counters ctr 2016 and ctr' 2038 were used for full-duplex mode, but in chiplet 2200 they are configured to be used for no-delay half-duplex mode at least partly by no-delay half-duplex mode circuit 2257.

Figure 23:
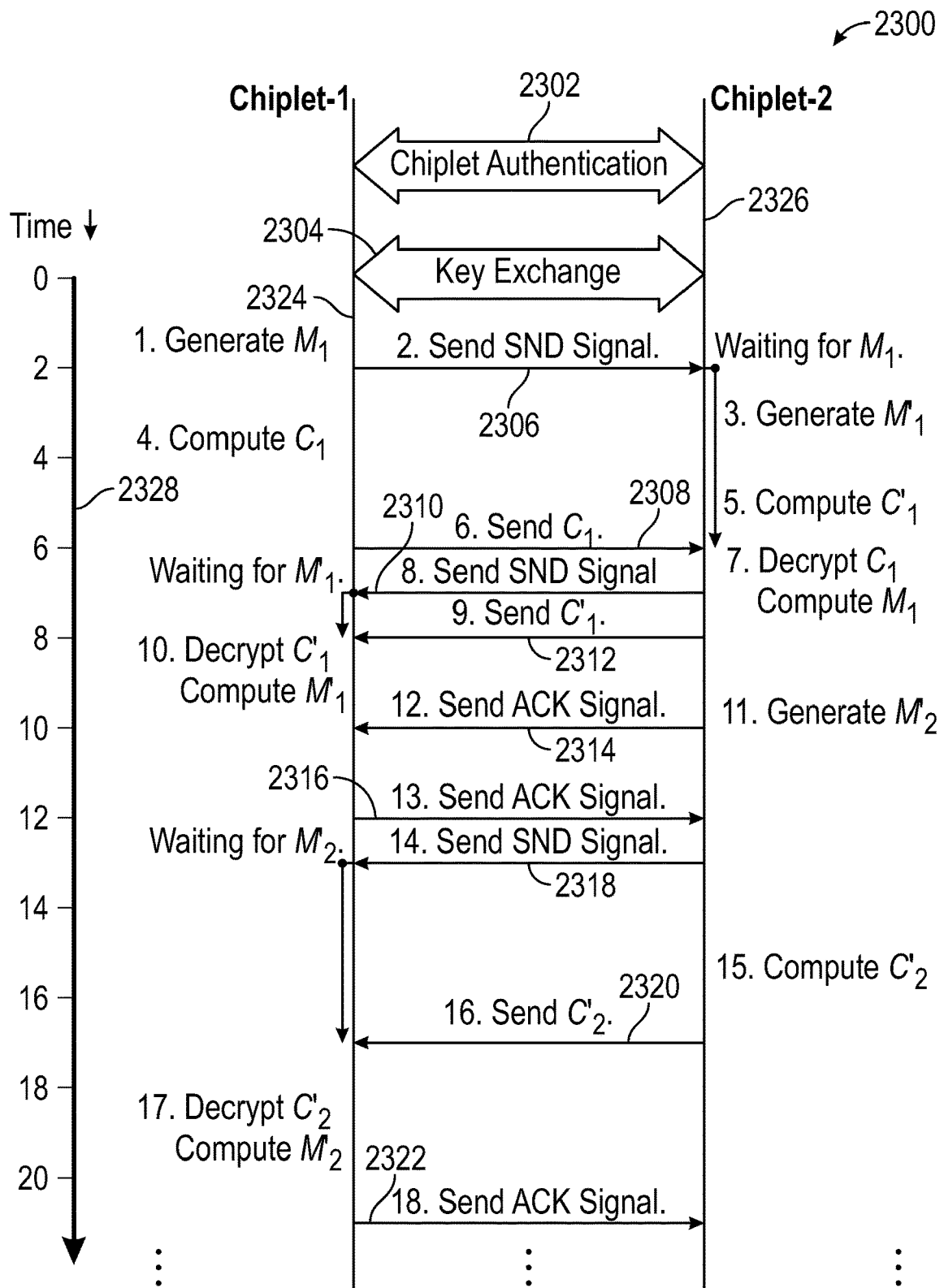
FIG. 23 is a sequence diagram showing an exemplary sequence of transmissions between two chiplets, consistent with some embodiments, showing a no-delay half-mode of communication.

Referencing FIG. 23, a communication sequence 2300 illustrates no-delay half-duplex mode of communication between chiplet-1 (2324) and chiplet-2 (2326). In some embodiments, chiplet-1 is chiplet 2200 above and stores: a) A session key K that equals r0∥r1, b) a counter ctr for sending data, and c) a counter ctr' for receiving data.

In those embodiments, chiplet-2 stores a) the same session key K that equals r0∥r1, b) the counter ctr but for receiving data, and c) the counter ctr' but for sending data. Thus, in chiplet-2 the role of the counters is reversed compared to their role in chiplet-1.

With no-delay half-duplex mode there is a risk of collision of counters ctr and ctr'. It is possible that after encryption of M[i] and M[i'] message blocks on both chiplets, that the counters may collide such that (ctr+i)=(ctr'+i'). This collision may leak some partial information, which may allow for several kinds of attacks. Therefore, the collision is highly undesirable.

A risk of collision is present when |ctr−ctr'|<ref_rate, where ref_rate is the refresh rate of the session key. The risk may be mitigated by choosing ctr and ctr' differently, for example by choosing ctr probabilistically and choosing ctr' deterministically. For example, during the execution of the sender's and the receiver's Key Generation Functions the counter ctr' can be computed as ctr':=ctr+$2^{b/2}$. The following are some other options for avoiding collisions:
  a. Assigning ctr' a random value. For example, ctr':=PRNG($r_1$∥$2^{b/2}$, b)
  b. Using an initial value IV. For example, ctr∥ctr':=IV
  c. Using the two PRNG's. For example, ctr:=PRNG(r1, b) and ctr':=PRNG(r0, b).
  d. Using a single PRNG. For example, ctr:=PRNG(PRNG(r1∥0, w)∥0, b) and ctr': =PRNG(PRNG(r1∥0, w)∥1, b)

With no-delay half-duplex mode, the control signals are the same control signals as for basic half-duplex mode (SND, ACK, NACK, SND-ACK). In some embodiments, the above control signals are timestamped to resolve conflicts.

Referencing FIG. 23, the direction of time for communication sequence 2300 is shown by timeline 2328. Communication sequence 2300 begins with chiplet authentication 2302 between chiplet-1 (2324) and chiplet-2 (2326). After chiplet authentication, chiplet-1 and chiplet-2 perform a key exchange 2304. In some embodiments, chiplet-1 and chiplet-2 perform the key exchange 2304 by executing a Key Exchange Protocol consistent with methods 700 and 800 of FIGS. 7 and 8, respectively.

At step 1, chiplet-1 generates a message $M_1$. Chiplet-1 then checks if chiplet-2 has sent an SND signal. At step 2, after determining that chiplet-2 has not sent an SND signal, chiplet-1 sends an SND signal to chiplet-2 via transmission 2306.

At step 3, chiplet-2 is waiting for $M_1$ but nevertheless generates message $M'_1$. But because chiplet-1 has sent an SND signal, chiplet-2 does not send its own SND signal.

At step 4, chiplet-1 encrypts $M_1$ by computing ciphertext $C_1$.

At step 5, chiplet-2 is still waiting for $M_1$, but under no-delay half-duplex mode, nevertheless encrypts $M'_1$ by computing ciphertext $C'_1$.

At step 6, via transmission 2308, chiplet-1 transmits $C_1$ to chiplet-2 which is waiting for $M_1$ because of the SND signal from chiplet-1.

At step 7, chiplet-2 decrypts $C_1$ to compute $M_1$. And in step 8, sends an SND signal to chiplet-1 via transmission 2310. Chiplet-1 is now waiting for $M'_1$. And in step 9, chiplet-2 transmits $C'_1$ to chiplet-1 via transmission 2312.

In step 10, chiplet-1 decrypts $C'_1$ to compute $M'_1$.

In step 11, chiplet-2 generates message $M'_2$. And in step 12, chiplet-2 sends an ACK signal to chiplet-1 via transmission 2314. This ACK signal acknowledges that chiplet-2 has decrypted and verified $M_1$.

In step 13, chiplet-1 sends an ACK signal to chiplet-2 via transmission 2316. The ACK signal acknowledges that chiplet-1 has decrypted and verified $M'_1$.

At step 14, chiplet-2 sends an SND signal to chiplet-1 via transmission 2318. Chiplet-1 is now waiting for $M'_2$. At step 15, chiplet-2 encrypts $M'_2$ by computing $C'_2$. And at step 16, chiplet-2 sends $C'_2$ to chiplet-1 (and chiplet-1 stops waiting) via transmission 2320.

Chiplet-1, in step 17, decrypts $C'_2$ to compute $M'_2$. And in step 18, chiplet-1 sends an ACK signal to chiplet-2 via transmission 2322. The ACK signal acknowledges that chiplet-1 has decrypted and verified $M'_2$.

The no-delay half-duplex mode has advantages and disadvantages. Advantages include a high utilization rate of the channel compared with basic half-duplex mode, smaller waiting times, and timeliness of data transmissions. Disadvantages include extra logic (e.g. no-delay half-duplex mode circuit 2257), a requirement to store an additional counter (as compared with one counter for basic half-duplex mode), and a requirement, in some embodiments, to time-stamp control signals to resolve conflicts.

The discussion below proceeds to discuss a chiplet 2400 configured for a two-key encryption mode. Chiplet 2400 provides high security for, in some embodiments, at least one of basic half-duplex mode or full-duplex mode, but is configured with two encryption keys for greater security. The operation of communication sequences is, in some embodiments, at least one of sequence 1900 for half-duplex mode, 2100 for full-duplex mode, or 2300 for no-delay half-duplex mode.

Two-key encryption mode utilizes two session keys: K and K'. The session key K is used for communication from a first chiplet, chiplet-1, to a second chiplet, chiplet-2. And session key K' is used for communication from chiplet-2 to chiplet-1.

In some embodiments, chiplet-1 is chiplet 2100 above and stores the following for transmitting circuit: a) random or pseudo-random numbers r0 and r1 and b) a counter ctr for sending data. The chiplet-1 also stores the following for receiving circuit: a) a different set of random or pseudo-random numbers r0' (2427A) and r1' (2427B) and c) a different counter ctr' for receiving data.

In those embodiments, chiplet-2 stores the following for transmitting circuit: a) random or pseudo-random numbers r0' and r1' and b) a counter ctr' for sending data. The chiplet-2 also stores the following for receiving circuit: a) random or pseudo-random numbers r0 and r1 and b) a counter ctr for receiving data. Thus, in chiplet-2, the role of random or pseudo-random numbers and the counters are reversed compared to their role in chiplet-1.

Referencing FIG. 24, a chiplet 2400 includes a secure host 2404 that includes a half-duplex/full-duplex modes circuit 2457 that configures secure host 2404 for issuing instructions, commands, and data for causing chiplet 2400 to communicate via at least one of half-duplex or full-duplex mode while in two-key encryption mode. In some embodiments, half-duplex/full-duplex modes circuit 2457 is a memory bearing executable instructions for causing chiplet 2400 to communicate via at least one of half-duplex or full-duplex mode while in two-key encryption mode. In some other embodiments, half-duplex/full-duplex modes circuit 2457 is hard-wired logic. And in yet some other embodiments, half-duplex/full-duplex modes circuit 2457 includes both a memory with executable instructions and hard-wired logic. In some embodiments, half-duplex/full-duplex modes circuit 2457 includes at least the equivalent functionality of executable instructions 529 of FIG. 5 that when executed cause a chiplet, such as for example, chiplet 500 to perform any of the key generation, encryption and decryption methods described with reference to FIGS. 7-16.

Chiplet 2400 includes a TX circuit 2415 with an encryption circuit 2410 that stores r0, r1 and counter ctr 2416 for communications to a second chiplet. The foregoing are for the use of TX circuit 2415 and are not shared with RX circuit 2428 (discussed below). A session key K (r0∥r1) is shared to the second chiplet via key exchange protocols. In some embodiments, the key exchange is performed by executing a Key Exchange Protocol consistent with methods 700 and 800 of FIGS. 7 and 8, respectively.

Chiplet 2400 further includes an RX circuit 2428 with a decryption circuit 2440 that stores two different random or pseudo-random keys r0' and r1' and a different counter ctr' 2438. In one embodiment, the values of r0' and r1' are extracted by chiplet 2400 (for example this may be at least partly performed by key generation function (receiver) 532) from a different session key K' (r0'∥r1') generated by a second chiplet. After this, the second chiplet utilizes random numbers r0' and r1' to generate the different session key K' (e.g. where K':=r0'∥r1'). The session key K' is shared by the second chiplet to chiplet 2400 via the key exchange performed between second chiplet and the chiplet 2400. In some embodiments, the key exchange is performed by executing a Key Exchange Protocol consistent with methods 700 and 800 of FIGS. 7 and 8, respectively. The foregoing are for the use of RX circuit 2428 and are not shared with TX circuit 2415.

An additional communication mode is high-volume data encryption mode, a mode that utilizes data compression. High-volume data encryption mode operates in any of the above communication modes, including for example half-duplex or full-duplex. It is utilized where a high data transfer rate is desired. There are at least the following two modes of implementing high-volume data encryption mode.

Method 1: Uses loss-less compression and decompression functions. The following are applicable:
a. Method 1 uses a compression function Comp: $\{0,1\}^q \mapsto \{0,1\}^b$ in the transmission circuit.
b. Method 1 uses a decompression function Decomp: $\{0,1\}^b \mapsto \{0,1\}^q$ in the receiving circuit.
c. At the Sender's side, the steps are:
  i. Receive a message block $M_q$ of q bits.
  ii. Compress $M_q$ into a b-bit message block: $M_b := \text{Comp}(M_q)$.
  iii. Encrypt $M_b$ to generate a w-bit ciphertext block: $C_w := \text{Enc}(M_b)$.
  iv. Send w-bit ciphertext block $C_w$ to the Receiver.

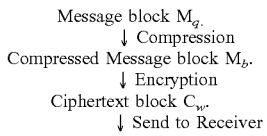

Message block $M_q$.
↓ Compression
Compressed Message block $M_b$.
↓ Encryption
Ciphertext block $C_w$.
↓ Send to Receiver d. At the Receiver's side, the steps are:
  i. Receive w-bit ciphertext block $C_w$ from Sender;.
  ii. Decrypt w-bit ciphertext block $C_w$ to generate a compressed b-bit message block: $M_b := \text{Dec}(C_w)$.
  iii. Decompress $M_b$ to a q-bit message block: $M_q := \text{Decomp}(M_b)$.
  iv. Accept $M_q$.

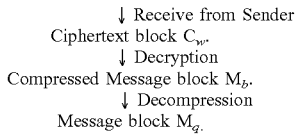

↓ Receive from Sender
Ciphertext block $C_w$.
↓ Decryption
Compressed Message block $M_b$.
↓ Decompression
Message block $M_q$.

Method 2: Uses a lossy compression and decompression with error correction. The following are applicable:
a. Method-2 uses a compression function Comp: $\{0,1\}^w \mapsto \{0,1\}^q$ in the transmission circuit.
b. Method-2 uses a decompression function Decomp: $\{0,1\}^q \mapsto \{0,1\}^w$ along with error correction in the receiving circuit.
c. At the Sender's side, the steps are:
  i. Receive a message block $M_b$ of b bits.
  ii. Encrypt $M_b$ to generate a w-bit ciphertext block $C_w$: $C_w := \text{Enc}(M_b)$.
  iii. Compress $C_w$ into a compressed q-bit ciphertext block $C_q$: $C_q := \text{Comp}(C_w)$.
  iv. Send compressed q-bit ciphertext block $C_q$ to the Receiver.

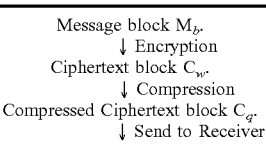

Message block $M_b$.
↓ Encryption
Ciphertext block $C_w$.
↓ Compression
Compressed Ciphertext block $C_q$.
↓ Send to Receiver d. At the Receiver's side, the steps are:
  i. Receive compressed q-bit ciphertext block $C_q$ from Sender.
  ii. Decompress $C_q$ to obtain a w-bit uncompressed ciphertext block $C_w'$: $C_w' := \text{Decomp}(C_q)$.
  iii. Correct error in $C_w'$ to obtain $C_w$.
  iv. Decrypt $C_w$ to obtain b-bit message block $M_b$: $M_b := \text{Dec}(C_w)$.
  v. Accept $M_b$.

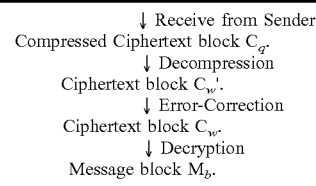

↓ Receive from Sender
Compressed Ciphertext block $C_q$.
↓ Decompression
Ciphertext block $C_w'$.
↓ Error-Correction
Ciphertext block $C_w$.
↓ Decryption
Message block $M_b$.

The use of compression and decompression has advantages and disadvantages. An advantage is increased performance (e.g. high data transfer rate). A disadvantage is an increased computation cost due to executing compression and decompression functions.

Turning to FIG. 25, table 2500 shows experimental results resulting from performance testing between (1) an Advanced Encryption Algorithm with Galois/Counter Mode (AES-GCM) and (2) a PRNG-based integrated development environment (PRNG-based IDE). Table 2500 shows certain parameters: (1) message block size of 128 bits, (2) associated data block size of 128 bits, (3) an output size of one ciphertext block and one tag block (C+T bits) of 128+128 bits, (4) key size of 128 bits for AES-GCM and of 256 bits for PRNG-based IDE, and (5) security bit size of 64 bits for AES-GCM and 128 bits for PRNG-based IDE.

There were 5 implementations of PRNG-based IDE that were executed against AES-GCM. These were serial, 16-bit parallel, 32-bit parallel, 64-bit parallel, and 128-bit parallel. For sake of brevity, reference is made to the chart itself for the performance of the 16-bit parallel, 32-bit parallel, and 64-bit parallel implementations. The performance of the 128-bit parallel implementation is discussed below.

Turning to a comparison of AES-GCM versus the 128-bit parallel PRNG-based IDE implementation, it is noted that on its test run AES-GCM required a "very high" number of operations versus "medium" number of operations required by 128-bit parallel PRNG-based IDE. More specifically, AES-GCM required approximately 50 times more operations than the 128-bit parallel implementation of PRNG-based IDE.

Regarding clock cycles, on its test run (based on a simulation) AES-GCM required 160 clock cycles versus 10 clock cycles required by 128-bit parallel PRNG-based IDE. That means AES-GCM required 16 times more clock cycles than the 128-bit parallel implementation of PRNG-based IDE.

Regarding the area required to print a required circuit on a chip (based on a simulation), a chip to implement AES-GCM required approximately 1,400 nanometers squared ($nm^2$) versus approximately 640 $nm^2$ required by a chip implementing 128-bit parallel PRNG-based IDE. That means AES-GCM required at least 2.1 times more chip area than the 128-bit parallel implementation of PRNG-based IDE.

It will be understood by those skilled in the art that the terminology used in this specification and in the claims is "open" in the sense that the terminology is open to additional elements not enumerated. For example, the word "includes" should be interpreted to mean "including at least" and so on. Even if "includes at least" is used sometimes and "includes" is used other times, the meaning is the same: includes at least. In addition, articles such as "a" or "the" should be interpreted as not referring to a specific number, such as one, unless explicitly indicated. At times a convention of "at least one of A, B, or C" is used, the intent is that this language includes any combination of A, B, C, including, without limitation, any of A alone, B alone, C alone, A and B, B and C, A and C, all of A, B, and C or any combination of the foregoing, such as for example AABBC, or ABBBCC. The same is indicated by the conventions "one of more of A, B, or C" and "and/or".

Claim elements may appear in certain sequences. However, these sequences of claim elements should not be considered limiting unless the context requires otherwise. Claim elements may be capable of being ordered in different sequences and some cases operations recited by claims may be performed concurrently.

In addition, references to circuits, such as for example TX circuit, RX circuit, encryption circuit, or decryption circuit, refer to circuitry for causing a chiplet to perform their respective functions. In some embodiments, these circuits are implemented as sub-chiplets, In some embodiments, these circuits have internal logic. In some embodiments, these circuits include a link to secure host for processing and are associated with executable instructions stored in memory (e.g. a machine-readable medium). These executable instructions (e.g. executable code, applications, etc.) when executed would cause secure host to perform the respective functions. In some embodiments, these circuits instead contain or are configured to access hard-wired logic. And some embodiments contain a combination of executable instructions and hard-wired logic. In some embodiments, these circuits may be part of a processing device, such as a CPU, a processor, a controller, a field-programmable gate array, or hard-wired logic. These circuits may contain memory, may be configured to access stored memory, may be configured to access remote memory, or may not contain or access memory, dependent on their function.

Various functional logic blocks, such as for example, a TRNG engine may, in some embodiments, be implemented as circuits. And the above discussion of circuits would be fully applicable.

Although embodiments have been described in detail, it should be understood that various changes, substitutions, and alterations could be made hereto without departing from the spirit and scope of the invention as defined by the appended claims and equivalents thereof.

We claim:

1. A cryptographic method performed with one or more chiplets of a first group of two or more chiplets, the method comprising;
   parsing at least a message into one or more groups of ordered message blocks including at least a first group of two or more ordered message blocks, the first group of message blocks associated with at least a first group of index values indicative of one or more positions of individual message blocks of the first group of blocks relative to one another;
   generating, in parallel with the first group of chiplets, two or more substitution values for the first group of ordered message blocks, a given substitution value of the two or more substitution values being generated to be associated with a given message block of the first group of ordered message blocks, the given substitution value being generated at least in part with an activation of a pseudo-random number generator seeded with a seed generated at least in part with (i) a first random or pseudo-random number and (ii) one or more numerical values associated with content of the given message block;
   generating, in parallel, two or more sequencing values for the first group of ordered message blocks, a given sequencing value of the two or more sequencing values being generated to be associated with the given message block and being generated at least in part with an activation of a pseudo-random number generator seeded with a seed generated at least in part with (i) a second random or pseudo-random number and (ii) a given index value that is one of the first group of index values and that is associated with the given message block;
   generating, in parallel, a first group of ciphertext blocks for the first group of message blocks based at least in part on two or more XOR operations, a given XOR operation of the two or more XOR operations including at least a first operand derived at least in part from the given substitution value and a second operand derived at least in part from the given sequencing value;
   concatenating at least the first group of ciphertext blocks to form at least a portion of a ciphertext; and
   transmitting the at least a portion of ciphertext to a second chiplet.

2. The method of claim 1, further comprising:
   generating at least one tag.

3. The method of claim 2, further comprising receiving associated data as input, the associated data being metadata associated with the message; and
   wherein the generating at least one tag includes at least generating a first tag at least in part from the associated data.

4. The method of claim 2, wherein the generating at least one tag includes at least generating a second tag at least in part from the given message block.

5. The method of claim 4, wherein the second tag is generated as an intermediate value between the given message block and the given substitution value.

6. The cryptographic method of claim 1, further comprising:
   generating the at least the first random or pseudo-random number and the second random or pseudo-random number;
   concatenating the first random or pseudo-random number and the second random or pseudo-random number to form a session key; and
   wherein the transmitting the at least a portion of ciphertext to a second chiplet further includes at least transmitting at least the session key to the second chiplet with at least a portion of ciphertext.

7. The cryptographic method of claim 6, further comprising encrypting another message, including at least determining whether to renew the session key based at least in part on one or more counter values.

8. The cryptographic method of claim 1, wherein the generating, in parallel with the first group of chiplets, two or more substitution values for the first group of ordered message blocks, a given substitution value of the two or more substitution values being generated to be associated with a given message block of the first group of ordered message blocks, the given substitution value being generated at least in part with an activation of a pseudo-random number generator seeded with a seed generated at least in part with (i) a first random or pseudo-random number and (ii) one or more numerical values associated with content of the given message block comprises:

wherein the seed is generated at least in part with (i) the first random or pseudo-random number, with (ii) a result of an XOR operation in which a first operand includes of one or more numerical values associated with content of the given message block and in which a second operand includes a value derived at least in part from a nonce, and with (iii) a tag.

9. The cryptographic method of claim 1, wherein the generating, in parallel, two or more sequencing values for the first group of ordered message blocks, a given sequencing value of the two or more sequencing values being generated to be associated with the given message block and being generated at least in part with an activation of a pseudo-random number generator seeded with a seed generated at least in part with (i) a second random or pseudo-random number and (ii) a given index value that is one of the first group of index values and that is associated with the given message block comprises:

wherein the seed is generated at least in part with (i) the second random or pseudo-random number and with (ii) a sum resulting from an addition operation in which a first operand includes an index value associated with the given message block and in which a second operand includes a counter value.

10. The cryptographic method of claim 1, wherein the transmitting the at least a portion of ciphertext to a second chiplet comprises:

at least one of:
transmitting in a no-delay half-duplex mode in which the first chiplet encrypts a message block of the one or more message blocks while waiting for a message from the second chiplet;
transmitting in a two-key encryption mode in which a first security configuration is used for transmitting from the first chiplet to the second chiplet and a second security configuration is used for transmitting from the second chiplet to the first chiplet;
transmitting in a high performance mode that utilize data compression and data decompression.

11. A cryptographic method performed with one or more chiplets of a first group of two or more chiplets, the method comprising;

parsing at least a ciphertext into one or more groups of ciphertext blocks including at least a first group of two or more ciphertext blocks, the first group of ciphertext blocks associated with at least a first group of index values indicative of one or more positions of individual ciphertext blocks of the first group of ciphertext blocks relative to one another;
generating, in parallel, two or more sequencing values for the first group of two or more ciphertext blocks, a given sequencing value of the two or more sequencing values being generated to be associated with a given ciphertext block of the first group of two or more ciphertext blocks, the generating of the given sequencing value including at least an activation of a pseudo-random number generator seeded with a seed generated at least in part with (i) a random or pseudo-random number and with at least (ii) a given index value of the first group of index values, the given index value being associated with the given ciphertext block;
generating, in parallel, two or more substitution values, at least in part, with at least two or more XOR operations, a given substitution value of the two or more substitution values being generated by a given XOR operation of the two or more XOR operations being performed with a first operand of at least the given ciphertext block and a second operand of the given sequencing value;
generating, in parallel, a first group of message blocks decrypted from the first group of cipher blocks based at least in part on the two or more substitution values; and
concatenating at least the first group of message blocks to form at least a portion of a message.

12. The cryptographic method of claim 11, further comprising;

extracting a tag from the given substitution value;
attempting to verify the tag by comparing the tag to a computed tag; and
if the attempt to verify the tag fails, aborting the decryption of the ciphertext.

13. The cryptographic method of claim 12, further comprising:

receiving associated data with the ciphertext;
computing at least a partial tag on at least the associated data; and
computing the computed tag based at least in part on the partial tag and on message data.

14. The cryptographic method of claim 11, further comprising:

receiving the ciphertext, a session key and a counter;
extracting at least the random or pseudo-random number from the session key; and
generating a counter value from the counter.

15. The cryptographic method of claim 11, wherein the generating, in parallel, two or more sequencing values for the first group of two or more ciphertext blocks, a given sequencing value of the two or more sequencing values being generated to be associated with a given ciphertext block of the first group of two or more ciphertext blocks, the generating of the given sequencing value including at least an activation of a pseudo-random number generator seeded with a seed generated at least in part with (i) a random or pseudo-random number and with at least (ii) a given index value of the first group of index values, the given index value being associated with the given ciphertext block comprises:

generating the seed at least in part with (i) the random or pseudo-random number, (ii) the given index value, and (iii) a counter value.

16. The method of claim 15, wherein the generating the seed at least in part with (i) the random or pseudo-random number, (ii) the given index value, and (iii) a counter value comprises:

generating the seed at least in part with (i) the random or pseudo-random number concatenated with (ii) a sum from addition of the given index value, and the counter value.

17. The cryptographic method of claim 11, wherein the generating, in parallel, two or more substitution values with at least two or more XOR operations, a given substitution value of the two or more substitution values being generated by a given XOR operation of the two or more XOR operations being performed with a first operand of at least the given ciphertext block and a second operand of the given sequencing value comprises:

wherein the given XOR operation at least partly reverses an earlier XOR operation performed at a first chiplet in which the first operand was the given substitution value and the second operation was given sequencing value and in which the output of the earlier XOR operation was the given ciphertext block.

18. The cryptographic method of claim 11, wherein the generating, in parallel, a first group of message blocks decrypted from the first group of cipher blocks based at least in part on the two or more substitution values comprises:
generating a given message block of the first group of message blocks at least in part by performing at least an XOR operation with operands derived at least in part from the given substitution value.

19. A computational system including at least a first chiplet, the first chiplet including at least:
one or more processing devices; and
one or more machine-readable media bearing one or more executable instructions that configure the one or more processing devices to cause the first chiplet to perform at least the following steps:
(1) parsing at least a message into one or more ordered message blocks, the one or more ordered message blocks associated with one or more index values indicative of one or more positions of individual message blocks of one or more message blocks relative to one another;
(2) generating one or more substitution values for the one or more ordered message blocks, a given substitution value of the one or more substitution values being generated to be associated with a given message block of the one or more ordered message blocks, the given substitution value being generated at least in part with an activation of a pseudo-random number generator seeded with a seed generated at least in part with (i) a first random or pseudo-random number and (ii) one or more numerical values associated with content of the given message block;
(3) generating one or more sequencing values for the one or more ordered message blocks, a given sequencing value of the one or more sequencing values being generated to be associated with the given message block and being generated at least in part with an activation of a pseudo-random number generator seeded with a seed generated at least in part with (i) a second random or pseudo-random number and (ii) a given index value that is one of the one or more index values and that is associated with the given message block;
(4) generating one or more ciphertext blocks corresponding to the one or more ordered message blocks based at least in part on one or more XOR operations, a given XOR operation of the one or more XOR operations including at least a first operand derived at least in part from the given substitution value and a second operand derived at least in part from the given sequencing value;
concatenating at least the one or more ciphertext blocks to form at least a ciphertext; and
transmitting the ciphertext to a second chiplet.

20. The computational system of claim 19, wherein the computation system further includes at least the second chiplet, the second chiplet including at least:
one or more second processing devices; and
one or more second machine-readable media bearing one or more executable instructions that configure the one or more second processing devices to cause the first chiplet to perform at least the following steps:
(1) parsing at least a ciphertext into one or more ordered ciphertext blocks, the one or more ordered ciphertext blocks associated with at least one or more index values indicative of one or more positions of individual ciphertext blocks of the one or more ciphertext blocks relative to one another;
(2) generating one or more sequencing values for the one or more ordered ciphertext blocks, a given sequencing value of the one or more sequencing values being generated to be associated with a given ciphertext block of the one or more ordered ciphertext blocks, the generating of the given sequencing value including at least an activation of a pseudo-random number generator seeded with a seed generated at least in part with (i) a random or pseudo-random number and with at least (ii) a given index value of the one or more index values, the given index value being associated with the given ciphertext block;
(3) generating one or more substitution values, at least in part, with at least one or more XOR operations, a given substitution value of the one or more substitution values being generated by a given XOR operation of the one or more XOR operations being performed with a first operand of at least the given ciphertext block and a second operand of the given sequencing value;
(4) generating one or more ordered message blocks decrypted from the one or more ordered ciphertext blocks based at least in part on the one or more substitution values; and
(5) concatenating at least the first group of message blocks to form at least a portion of a message.

* * * * *